(12) United States Patent
Yao et al.

(10) Patent No.: US 12,262,380 B2
(45) Date of Patent: Mar. 25, 2025

(54) COMMUNICATIONS METHOD AND DEVICE

(71) Applicant: Huawei Technologies Co., Ltd., Shenzhen (CN)

(72) Inventors: Chuting Yao, Beijing (CN); Yanzhao He, Shenzhen (CN); Yiru Kuang, Beijing (CN); Haibo Xu, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 407 days.

(21) Appl. No.: 17/605,894

(22) PCT Filed: Apr. 17, 2020

(86) PCT No.: PCT/CN2020/085232
§ 371 (c)(1),
(2) Date: Oct. 22, 2021

(87) PCT Pub. No.: WO2020/216133
PCT Pub. Date: Oct. 29, 2020

(65) Prior Publication Data
US 2022/0124697 A1  Apr. 21, 2022

(30) Foreign Application Priority Data
Apr. 23, 2019 (CN) .......................... 201910327423.7

(51) Int. Cl.
*H04W 72/20* (2023.01)
(52) U.S. Cl.
CPC .................................. *H04W 72/20* (2023.01)

(58) Field of Classification Search
CPC . H04W 36/0069; H04W 88/06; H04W 76/15; H04W 72/04; H04W 72/1215;
(Continued)

(56) References Cited

U.S. PATENT DOCUMENTS 10,785,817 B2 * 9/2020 Palat ................... H04W 76/15
2015/0373523 A1 * 12/2015 Jeong ................. H04L 41/5029
455/406

(Continued)

FOREIGN PATENT DOCUMENTS

CN  105101472 A  11/2015
CN  109246824 A   1/2019
(Continued)

OTHER PUBLICATIONS

Apple, "Enhancement on SCell Activation and Deactivation", 3GPP TSG-RAN WG2 Meeting #105bis, R2-1903609, Ki'an, China, Apr. 8-12, 2019, 4 pages.
(Continued)

*Primary Examiner* — Mahran Y Abu Roumi
(74) *Attorney, Agent, or Firm* — Slater Matsil, LLP

(57) ABSTRACT

A method includes: determining, by a terminal device, that assistance information of the terminal device can be sent to a first network device through a signaling radio bearer (SRB) 3, wherein the terminal device is connected to at least two network devices, and the first network device is a secondary network device in the at least two network devices; and sending, by the terminal device, the assistance information to the first network device through the SRB3, wherein the assistance information is used to indicate a configuration expected by the terminal device or service information of the terminal device.

17 Claims, 18 Drawing Sheets

(58) Field of Classification Search
CPC ........ H04W 24/10; H04L 5/00; H04L 5/0053; H04B 15/00
See application file for complete search history.

(56) References Cited

U.S. PATENT DOCUMENTS

| | | | |
|---|---|---|---|
| 2017/0196008 A1* | 7/2017 | Wang | H04W 72/0446 |
| 2017/0230917 A1* | 8/2017 | Ouchi | H04L 5/0055 |
| 2019/0053292 A1* | 2/2019 | Ali | H04W 88/06 |
| 2020/0008113 A1* | 1/2020 | Chen | H04W 36/0038 |
| 2021/0067299 A1* | 3/2021 | Wu | H04B 15/00 |
| 2022/0014953 A1* | 1/2022 | Teyeb | H04W 24/10 |
| 2022/0132615 A1* | 4/2022 | Sharma | H04W 48/20 |

FOREIGN PATENT DOCUMENTS

| | | |
|---|---|---|
| CN | 109246833 A | 1/2019 |
| CN | 113826431 A | 12/2021 |
| EP | 3897058 A1 | 10/2021 |
| WO | 2015199319 A1 | 12/2015 |
| WO | 2018056623 A1 | 3/2018 |
| WO | 2018130115 A1 | 7/2018 |
| WO | 2019059673 A1 | 3/2019 |

OTHER PUBLICATIONS

Huawei et al., "37.340 Draft CR for addressing overheating issue in EN-DC scenario-Option 2", 3GPP TSG-RAN2 Meeting #107bis, R2-1913693, Chongqing, China, Oct. 14-18, 2019, 7 pages.
Vivo, "Discussion on the IDC report of NR frequency in EN-DC", 3GPP TSG-RAN WG2 Meeting #102, R2-1807634, revision of R2-1804601, Busan, Korea, May 21-25, 2018, 7 pages.
Huawei et al., "UE reporting assistance information to gNB", 3GPP TSG RAN WG1 Ad-Hoc Meeting 1901, R1-1901243, Taipei, Jan. 21-25, 2019, 5 pages.
3GPP TS 37.340 V15.5.0 (Mar. 2019), 3rd Generation Partnership Project; Technical Specification Group Radio Access Network; Evolved Universal Terrestrial Radio Access (E-UTRA) and NR; Multi-connectivity; Stage 2 (Release 15), 68 pages.
Vivo, "Consideration on RAN1 recommendation for power saving study", 3GPP TSG RAN WG1 Meeting #96bis, R1-1904106, Xi'an, China, Apr. 8-12, 2019, 7 pages.
Qualcomm Inc., "UE Assistance Information for power saving", 3GPP TSG-RAN WG2 Meeting #105bis, R2-1903053, Xi'an, China, Apr. 8-12, 2019, 3 pages.
Huawei et al., "Discussion on TA group management", 3GPP TSG-RAN WG2 Meeting #74, R2-113285, Barcelona, Spain, May 9-13, 2011, 4 pages.
Nokia et al., "Assistance information for NR overheating", 3GPP TSG-RAN WG2 Meeting #104, R2-1816537, Spokane, WA, US, Nov. 12-16, 2018, 3 pages.
Intel Corp., "Discussion on non-TM10 Homogenous Network CRS-IM RX", 3GPP TSG RAN4 Meeting #76, R4-154142, Beijing, China, Aug. 24-28, 2015, 6 pages.
Nokia et al., "Assistance information for NR overheating", 3GPP TSG-RAN WG2 Meeting #104, R2-1816537, Spokane, WA, USA, Nov. 12-16, 2018, 3 pages.
3GPP TS 38.331 V15.5.1 (Apr. 2019), 3rd Generation Partnership Project; Technical Specification Group Radio Access Network; NR; Radio Resource Control (RRC) protocol specification (Release 15), 491 pages.
Ericsson, "Extension of overheating indication parameters", 3GPP TSG-RAN WG2 #104, R2-1817930, Spokane, WA, US, Nov. 12-16, 2018, 2 pages.
Huawei et al., "Coordination for overheating in MR-DC scenario", 3GPP TSG-RAN2 Meeting#105bis, R2-1904936, (Revision of R2-1901681), Xi'an, China, Apr. 8-12, 2019, 3 pages.
Qualcomm Inc., "Extending LTE Overheating mechanism to NR", 3GPP TSG-RAN WG2 #101, R2-1803617, Athens, Greece, Feb. 26-Mar. 2, 2018, 4 pages.
Huawei et al., "UE reporting assistance information to gNB", 3GPP TSG RAN WG1 Ad-Hoc Meeting 1901, R1-1901243, Jan. 21-25, 2019, 5 Pages, Taipei.
Vivo., "UE assistant information", 3GPP TSG RAN WG1 #96bis, R1-1904120, Apr. 8-12, 2019, 3 Pages, Xi'an, China.
Huawei et al., "CR on UE overheating support for NGEN-DC", 3GPP TSG-RAN2 Meeting#105, R2-1901680, Feb. 25-Mar. 1, 2019, 5 Pages, Athens, Greece.

* cited by examiner

COMMUNICATIONS METHOD AND DEVICE

CROSS-REFERENCE TO RELATED APPLICATIONS

This application is a national stage of International Application No. PCT/CN2020/085232, filed Apr. 17, 2020, which claims priority to Chinese Patent Application No. 201910327423.7, filed Apr. 23, 2019. Both of the aforementioned applications are hereby incorporated by reference in their entireties.

TECHNICAL FIELD

This application relates to the field of communications technologies, and in particular, to a communications method and device.

BACKGROUND

In an evolved universal terrestrial radio access and new radio dual connectivity (E-UTRA NR dual connectivity, EN-DC) architecture, a long term evolution (long term evolution, LTE) eNodeB serving as a master base station may deliver a configuration to a terminal device through a signaling radio bearer (signaling radio bearer, SRB) 1. For example, the LTE eNB configures the terminal device to report assistance information of the terminal device, to help the LTE eNB learn of a status of the terminal device based on the assistance information of the terminal device, and help the LTE eNB better schedule the terminal device. The assistance information of the terminal device includes, for example, overheating (overheating) information of the terminal device. The overheating information includes, for example, a quantity of uplink and downlink secondary cells of the terminal device that the terminal device tends to reduce, or an uplink and downlink capability set preferred by the terminal device.

Currently, the terminal device can send the assistance information of the terminal device to only the LTE eNB serving as the master base station, and the LTE eNB may make a decision after receiving the assistance information of the terminal device. For example, if the terminal device sends the overheating information to the LTE eNB, a decision that may be made by the LTE eNB is to indicate the terminal device to release a connection between the terminal device and a new radio (new radio, NR) gNB used as a secondary base station, so that the terminal device changes to work in a single-connection structure.

After working in the single-connection structure, the terminal device can receive data from only the LTE eNB, and cannot receive data from the NR gNB. Consequently, performance of the terminal device deteriorates significantly.

SUMMARY

Embodiments of this application provide a communications method and device, to improve transmission performance of a terminal device.

According to a first aspect, a first communications method is provided. The method includes: A terminal device determines that assistance information of the terminal device can be sent to a first network device through an SRB3, where the terminal device is connected to at least two network devices, and the first network device is a secondary network device in the at least two network devices; and the terminal device sends the assistance information to the first network device through the SRB3, where the assistance information is used to indicate a configuration expected by the terminal device or service information of the terminal device.

The method may be performed by a first communications apparatus. The first communications apparatus may be a communications device, or a communications apparatus that can support a function required by the communications device to implement the method, for example, a chip system. For example, the communications device is the terminal device.

In this embodiment of this application, the terminal device can send, through the SRB3, the assistance information of the terminal device to the first network device serving as the secondary network device. For example, the assistance information may include overheating information of the terminal device. In this case, the secondary network device can also obtain the overheating information of the terminal device, so that the secondary network device can perform corresponding configuration on the terminal device, and the terminal device does not need to release a connection between the terminal device and the secondary network device. This helps improve transmission performance of the terminal device.

With reference to the first aspect, in a first possible implementation of the first aspect, that a terminal device determines that assistance information of the terminal device can be sent to a first network device through an SRB3 includes: The terminal device receives first configuration information from the first network device or the second network device; and the terminal device determines, based on the first configuration information, that the terminal device can send the assistance information to the first network device through the SRB3, where the second network device is a master network device in the at least two network devices.

The terminal device can determine, based on a configuration of a network device, whether the assistance information can be sent to the first network device through the SRB3. The first configuration information may be sent to the terminal device by the first network device or the second network device. This is relatively flexible.

With reference to the first possible implementation of the first aspect, in a second possible implementation of the first aspect, the first configuration information further includes first time information. The method further includes: The terminal device determines, based on the first time information, that the terminal device can send the assistance information to the first network device through the SRB3 within a time range corresponding to the first time information; or the terminal device determines, based on the first time information, that the terminal device no longer sends assistance information to the first network device within the first time after sending the assistance information to the first network device.

The first time information may be used to indicate that the terminal device can send the assistance information to the first network device through the SRB3 within the time range indicated by the first time information. It means that the first time information implicitly indicates that the terminal device cannot send the assistance information to the first network device through the SRB3 beyond the time range indicated by the first time information. This is equivalent to adding a time limit for sending the assistance information by the terminal device through the SRB3, and the terminal device can send the assistance information to the first network device through the SRB3 only within a specified period of time.

This manner is convenient for management performed by the second network device. Alternatively, the first time information may be used to indicate that after sending the assistance information to the first network device through the SRB3, the terminal device cannot send the assistance information to the first network device through the SRB3 within a time range indicated by the first time information. It means that the first time information implicitly indicates that after sending the assistance information to the first network device through the SRB3, the terminal device can send the assistance information to the first network device again through the SRB3 beyond the time range indicated by the first time information. In this manner, the terminal device can be prevented from frequently sending the assistance information to the first network device, and load of the first network device can be reduced. The first time information is, for example, information about a timer, information about a first moment, or information about first duration. An implementation of the first time information is not limited.

With reference to any one of the first aspect, or the first possible implementation of the first aspect and the second possible implementation of the first aspect, in a third possible implementation of the first aspect, the first configuration information further includes information about at least one parameter corresponding to the assistance information, and the method further includes: The terminal device determines that a value of the at least one parameter can be sent to the first network device through the SRB3.

It is equivalent to that the network device can notify the terminal device of a parameter required by the network device, so that the terminal device can report a value of the parameter required by the network device, so that the report by the terminal device better meets a requirement of the network device.

With reference to any one of the first aspect, or the first possible implementation of the first aspect to the third possible implementation of the first aspect, in a fourth possible implementation of the first aspect, the assistance information is information related to the first network device, or the assistance information includes the information related to the first network device and information related to the second network device.

The assistance information sent by the terminal device may include only the information related to the first network device. This is equivalent to that the terminal device may send only the information related to the first network device to the first network device, so that the first network device can directly make a decision based on the information. For example, a quantity of secondary cells in the assistance information sent by the terminal device may include only a quantity of secondary cells corresponding to the first network device, and does not include a quantity of secondary cells corresponding to the second network device. In this way, the first network device does not need to negotiate with the second network device, but may directly make a corresponding decision based on the assistance information of the terminal device. Alternatively, the assistance information sent by the terminal device may include both the information related to the first network device and the information related to the second network device. This is equivalent to that the terminal device may send the assistance information related to the two network devices to the first network device. For example, the first network device may send the information related to the second network device to the second network device, so that interactions between the terminal device and the network device can be reduced.

With reference to any one of the first aspect, or the first possible implementation of the first aspect to the fourth possible implementation of the first aspect, in a fifth possible implementation of the first aspect, after the sending, by the terminal device, the assistance information to the first network device through the SRB3, the method further includes: The terminal device receives adjustment information from the first network device through the SRB3, where the adjustment information is used to adjust a configuration of the terminal device.

After receiving the assistance information, the first network device may determine, based on the assistance information, the configuration expected by the terminal device, and the first network device can adjust some configurations of the terminal device, for example, adjust an air interface configuration, so that the configuration of the terminal device can meet the expectation of the terminal device. In this case, the first network device may send the adjustment information to the terminal device, and the adjustment information is used to adjust the configuration of the terminal device, so that the terminal device can adjust the corresponding configuration after receiving the adjustment information. It can be learned that in this embodiment of this application, the terminal device may send the corresponding assistance information to the first network device through the SRB3, so that the first network device can adjust the corresponding configuration for the terminal device.

With reference to any one of the first aspect, or the first possible implementation of the first aspect to the fifth possible implementation of the first aspect, in a sixth possible implementation of the first aspect, the assistance information includes one or any combination of the following:
  a quantity of MIMO layers of the terminal device;
  a quantity of secondary cells corresponding to the terminal device;
  a quantity of antenna ports of the terminal device;
  an aggregated bandwidth of a secondary cell group corresponding to the terminal device;
  a bandwidth of each secondary cell corresponding to the terminal device;
  a maximum bandwidth supported by the terminal device;
  a C-DRX configuration or parameter expected by the terminal device;
  a BWP configuration or parameter expected by the terminal device;
  an application type of the terminal device;
  a size of a data packet transmitted by the terminal device;
  a scheduling mode expected by the terminal device;
  a search space expected by the terminal device;
  a scheduling format expected by the terminal device; or
  a slot format expected by the terminal device.

Certainly, in addition to at least one of the foregoing items, the assistance information may further include other information. Alternatively, the assistance information may include none of the foregoing items, but include other information. This is not specifically limited.

With reference to any one of the first aspect, or the first possible implementation of the first aspect to the sixth possible implementation of the first aspect, in a seventh possible implementation of the first aspect, the method further includes: The terminal device sends capability information of the terminal device to the second network device, where the capability information includes first sub-capability information corresponding to the first network device, the first sub-capability information is transparently transmitted to the first network device by using the second network device, the capability information further includes second sub-capability information corresponding to the second network device and third sub-capability information corresponding to the first network device and the second network device, and the second network device is the master network device in the at least two network devices.

The terminal device may send the capability information of the terminal device to the second network device, and the second network device may send the capability information corresponding to the first network device to the first network device, so that the first network device can also obtain the capability information of the terminal device. For example, the first network device is an LTE network device, and the second network device is an NR network device. In this case, the NR network device can support some new capabilities that cannot be supported by the LTE network device. Because versions of terminal devices continuously evolve, a terminal device of a later version can also support these new capabilities. However, it is currently stipulated that the terminal device can send the assistance information to only a master network device, and cannot send the assistance information to a secondary network device. Because an LTE system does not support these capabilities, the LTE system does not provide a message used by the terminal device to send these new capabilities. Therefore, the terminal device cannot send information about these new capabilities to the LTE network device. This is equivalent to that the terminal device cannot send the information about the new capabilities to any connected network device. In view of this, in this embodiment of this application, the terminal device may send all capability information of the terminal device to the second network device. For example, the terminal device may send the capability information of the terminal device to the second network device by using a message format provided by the second network device. The second network device may then send the capability information (for example, the first sub-capability information and the third sub-capability information) corresponding to the first network device to the first network device. For example, the second network device probably cannot identify the first sub-capability information. In this case, the second network device may transparently transmit the first sub-capability information to the first network device without identifying the first sub-capability information, and the first sub-capability information may include information about some new capabilities. In the manner provided in this embodiment of this application, the first network device can obtain information about some new capabilities supported by the terminal device, so that the terminal device can be better scheduled.

With reference to any one of the first aspect, or the first possible implementation of the first aspect to the seventh possible implementation of the first aspect, in an eighth possible implementation of the first aspect, the method further includes: The terminal device sends a request message to the second network device, where the request message is used to request to set up the SRB3 used for communication between the terminal device and the first network device, and the second network device is the master network device in the at least two network devices; and the terminal device receives a first message from the second network device, where the first message is used to set up the SRB3 for the terminal device or used to configure the SRB3 for the terminal device.

If the SRB3 has not been set up between the terminal device and the first network device in advance, the terminal device may request the second network device to set up the SRB3 for communication between the terminal device and the first network device. In this embodiment of this application, the terminal device can actively request to set up the SRB3, and does not need to passively wait for the second network device to set up the SRB3. Therefore, the terminal device has relatively strong initiative.

According to a second aspect, a second communications method is provided. The method includes: A first network device receives assistance information of a terminal device, where the assistance information is used to indicate a configuration expected by the terminal device or service information of the terminal device, the terminal device is connected to at least two network devices, and the first network device is a secondary network device in the at least two network devices.

The method may be performed by a second communications apparatus. The second communications apparatus may be a communications device, or a communications apparatus that can support a function required by the communications device to implement the method, for example, a chip system. For example, the communications device is a network device. For example, the network device is the first network device.

In this embodiment of this application, the first network device serving as the secondary network device can also obtain the assistance information of the terminal device, so that the first network device can perform corresponding configuration on the terminal device. For example, the assistance information includes overheating information of the terminal device. In this case, the first network device can also obtain the overheating information of the terminal device, so that the first network device can perform corresponding configuration on the terminal device, and the terminal device does not need to release the first network device. This helps improve transmission performance of the terminal device.

With reference to the second aspect, in a first possible implementation of the second aspect, the method further includes: The first network device determines adjustment information based on the assistance information, and sends the adjustment information to the terminal device through an SRB3, where the adjustment information is used to adjust a configuration of the terminal device or the service information of the terminal device.

After obtaining the assistance information of the terminal device, the first network device may determine the adjustment information based on the assistance information, to adjust the configuration of the terminal device, the service information of the terminal device, or the like, so that the configuration of the terminal device, the service information of the terminal device, or the like can meet a requirement of the terminal device as much as possible.

With reference to the second aspect or the first possible implementation of the second aspect, in a second possible implementation of the second aspect, that a first network device receives assistance information of a terminal device includes: The first network device receives the assistance information from the terminal device through the SRB3; or the first network device receives the assistance information from a second network device, where the second network device is a master network device in the at least two network devices.

The terminal device may directly send the assistance information to the first network device through the SRB3; or the terminal device may send the assistance information to the second network device, and then the second network device sends information related to the first network device in the assistance information to the first network device. It can be learned that a manner of sending the assistance information by the terminal device is relatively flexible.

With reference to any one of the second aspect, or the first possible implementation of the second aspect and the second possible implementation of the second aspect, in a third possible implementation of the second aspect, the method further includes: The first network device sends first configuration information to the terminal device, where the first configuration information is used to indicate that the terminal device can send the assistance information of the terminal device to the first network device through the SRB3.

For example, before obtaining the assistance information, the first network device may first send the first configuration information to the terminal device, to indicate that the terminal device can send the assistance information to the first network device through the SRB3. After receiving the first configuration information, the terminal device may send the assistance information to the first network device through the SRB3. Through the advance indication, the terminal device can determine a corresponding behavior.

With reference to any one of the second aspect, or the first possible implementation of the second aspect to the third possible implementation of the second aspect, in a fourth possible implementation of the second aspect, the assistance information is the information related to the first network device, or the assistance information includes the information related to the first network device and information related to the second network device.

It means that the terminal device may send only the information related to the first network device in the assistance information to the first network device. For example, the terminal device may send the information related to the second network device in the assistance information to the second network device. In other words, the terminal device may send corresponding assistance information to different network devices respectively. In this way, after receiving the corresponding assistance information, the network devices can separately make a decision. Alternatively, the terminal device may send all the assistance information to the first network device (or the second network device), and then the first network device (or the second network device) sends the information related to the second network device (or the first network device) to the second network device. In this way, interaction between the terminal device and the network device can be reduced.

With reference to the fourth possible implementation of the second aspect, in a fifth possible implementation of the second aspect, the assistance information includes the information related to the first network device and the information related to the second network device, and the method further includes: The first network device sends the information related to the second network device included in the assistance information to the second network device.

Alternatively, the terminal device may send all the assistance information to the first network device, and then the first network device sends the information related to the second network device to the second network device. In this way, interaction between the terminal device and the network device can be reduced.

With reference to the third possible implementation of the second aspect, in a sixth possible implementation of the second aspect, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

With reference to the third possible implementation of the second aspect or the sixth possible implementation of the second aspect, in a seventh possible implementation of the second aspect, the first configuration information further includes information about at least one parameter corresponding to the assistance information, and the information is used to indicate the terminal device to send a value of the at least one parameter when sending the assistance information of the terminal device to the first network device.

With reference to any one of the second aspect, or the first possible implementation of the second aspect to the seventh possible implementation of the second aspect, in an eighth possible implementation of the second aspect, the assistance information includes one or any combination of the following:

a quantity of MIMO layers of the terminal device;
a quantity of secondary cells corresponding to the terminal device;
a quantity of antenna ports of the terminal device;
an aggregated bandwidth of a secondary cell group corresponding to the terminal device;
a bandwidth of each secondary cell corresponding to the terminal device;
a maximum bandwidth supported by the terminal device;
a C-DRX configuration or parameter expected by the terminal device;
a BWP configuration or parameter expected by the terminal device;
an application type of the terminal device;
a size of a data packet transmitted by the terminal device;
a scheduling mode expected by the terminal device;
a search space expected by the terminal device;
a scheduling format expected by the terminal device; or
a slot format expected by the terminal device.

With reference to any one of the second aspect, or the first possible implementation of the second aspect to the eighth possible implementation of the second aspect, in a ninth possible implementation of the second aspect, the method further includes: The first network device receives capability information of the terminal device from the second network device, where the capability information of the terminal device includes first sub-capability information corresponding to the first network device and third sub-capability information corresponding to the first network device and the second network device, and the second network device is the master network device in the at least two network devices.

The terminal device may send the capability information of the terminal device to the second network device, and the second network device may send the capability information corresponding to the first network device to the first network device, so that the first network device can also obtain the capability information of the terminal device, and can correspondingly determine whether the terminal device can support some new capabilities. For example, the second network device probably cannot identify the first sub-capability information. In this case, the second network device may transparently transmit the first sub-capability information to the first network device without identifying the first sub-capability information.

With reference to the ninth possible implementation of the second aspect, in a tenth possible implementation of the second aspect, the method further includes: The first network device sends a request message to the second network device, where the request message is used to request to set up the SRB3 used for communication between the first network device and the terminal device; and the first network device receives a first message from the second network device, where the first message is used to set up the SRB3 for the first network device.

If the SRB3 has not been set up between the terminal device and the first network device in advance, the first network device may request the second network device to set up the SRB3 for communication between the terminal device and the first network device. In this embodiment of this application, the first network device can actively request to set up the SRB3, and does not need to passively wait for the second network device to set up the SRB3. Therefore, the terminal device has relatively strong initiative. In addition, if the SRB3 has not been set up between the terminal device and the first network device in advance, the terminal device may initiate a request to the second network device, or the first network device may initiate a request to the second network device. This is relatively flexible.

With reference to any one of the second aspect, or the first possible implementation of the second aspect to the tenth possible implementation of the second aspect, in an eleventh possible implementation of the second aspect, the method further includes: The first network device receives a request message from the second network device, where the request message is used to request the first network device to serve as a secondary network device of the second network device, and the second network device is the master network device in the at least two network devices; the first network device sends a response message to the second network device, where the response message is used to indicate that the first network device agrees that the first network device serves as the secondary network device of the second network device; and the first network device receives second configuration information from the second network device, where the second configuration information is used to configure the first network device as the secondary network device of the second network device.

If the second network device considers that the first network device may be used as the secondary network device, the second network device may request the first network device, so as to form a dual-connectivity structure.

For technical effects brought by some implementations of the second aspect, refer to the descriptions of the technical effects in the first aspect or the corresponding implementations of the first aspect. Details are not described herein again.

According to a third aspect, a third communications method is provided. The method includes: A second network device determines that a terminal device can send assistance information of the terminal device to a first network device through an SRB3, where the terminal device is connected to at least two network devices, the first network device is a secondary network device in the at least two network devices, and the second network device is a master network device in the at least two network devices; and the second network device sends first configuration information to the terminal device, where the first configuration information is used to indicate that the terminal device can send the assistance information to the first network device through the SRB3.

The method may be performed by a third communications apparatus. The third communications apparatus may be a communications device, or a communications apparatus that can support a function required by the communications device to implement the method, for example, a chip system. For example, the communications device is a network device. For example, the network device is the second network device.

If the second network device determines that the terminal device can send the assistance information of the terminal device to the first network device through the SRB3, the second network device may send the first configuration information to the terminal device, so that the terminal device can determine that the terminal device can send the assistance information to the first network device through the SRB3. In this manner, the terminal device can determine a corresponding behavior.

With reference to the third aspect, in a first possible implementation of the third aspect, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

With reference to the third aspect or the first possible implementation of the third aspect, in a second possible implementation of the third aspect, the first configuration information further includes information about at least one parameter corresponding to the assistance information, and the information is used to indicate the terminal device to specifically send a value of the at least one parameter when sending the assistance information to the first network device through the SRB3.

With reference to any one of the third aspect, or the first possible implementation of the third aspect and the second possible implementation of the third aspect, in a third possible implementation of the third aspect, after the second network device sends the first configuration information to the terminal device, the method further includes: The second network device receives the assistance information, where the assistance information is information related to the second network device, or the assistance information includes information related to the first network device and the information related to the second network device.

The terminal device may send only the information related to the second network device in the assistance information to the second network device. For example, the terminal device may also send only the information related to the first network device in the assistance information to the first network device. In other words, the terminal device may send assistance information corresponding to different network devices to the corresponding network devices respectively. In this way, the network device can directly make a decision based on the received assistance information, and does not need to distinguish whether there is other information corresponding to another network device. Alternatively, the terminal device may send all the assistance information to the second network device, so that interaction between the terminal device and the network device can be reduced.

With reference to the third possible implementation of the third aspect, in a fourth possible implementation of the third aspect, the assistance information includes the information related to the first network device and the information related to the second network device, and the method further includes: The second network device sends the information related to the first network device included in the assistance information to the first network device.

If the terminal device sends both the information related to the first network device and the information related to the second network device to the second network device, the second network device may further send the information related to the first network device to the first network device, so that the first network device can also obtain the assistance information of the terminal device.

With reference to any one of the third aspect, or the first possible implementation of the third aspect to the fourth possible implementation of the third aspect, in a fifth possible implementation of the third aspect, the assistance information includes one or any combination of the following:
- a quantity of MIMO layers of the terminal device;
- a quantity of secondary cells corresponding to the terminal device;
- a quantity of antenna ports of the terminal device;
- an aggregated bandwidth of a secondary cell group corresponding to the terminal device;
- a bandwidth of each secondary cell corresponding to the terminal device;
- a maximum bandwidth supported by the terminal device;
- a C-DRX configuration or parameter expected by the terminal device;
- a BWP configuration or parameter expected by the terminal device;
- an application type of the terminal device;
- a size of a data packet transmitted by the terminal device;
- a scheduling mode expected by the terminal device;
- a search space expected by the terminal device;
- a scheduling format expected by the terminal device; or
- a slot format expected by the terminal device.

With reference to any one of the third aspect, or the first possible implementation of the third aspect to the fifth possible implementation of the third aspect, in a sixth possible implementation of the third aspect, the method further includes: The second network device receives a request message, where the request message is used to request to set up the SRB3 used for communication between the first network device and the terminal device; and the second network device sends a first message, where the first message is used to set up the SRB3, or is used to indicate to reject setup of the SRB3.

If the SRB3 has not been set up between the terminal device and the first network device in advance, the first network device may request the second network device to set up the SRB3 for communication between the terminal device and the first network device. In this embodiment of this application, the first network device can actively request to set up the SRB3, and does not need to passively wait for the second network device to set up the SRB3. Therefore, the terminal device has relatively strong initiative. In addition, if the SRB3 has not been set up between the terminal device and the first network device in advance, the terminal device may initiate a request to the second network device, or the first network device may initiate a request to the second network device. In other words, the request message received by the second network device may be from the terminal device, or may be from the first network device. This is relatively flexible.

With reference to any one of the third aspect, or the first possible implementation of the third aspect to the sixth possible implementation of the third aspect, in a seventh possible implementation of the third aspect, before the determining, by a second network device, that a terminal device can send assistance information of the terminal device to a first network device through an SRB3, the method further includes: The second network device receives capability information of the terminal device from the terminal device, where the capability information includes first sub-capability information corresponding to the first network device, second sub-capability information corresponding to the second network device, and third sub-capability information corresponding to the first network device and the second network device.

With reference to any one of the third aspect, or the first possible implementation of the third aspect to the sixth possible implementation of the third aspect, in a seventh possible implementation of the third aspect, the determining, by a second network device, that a terminal device can send assistance information of the terminal device to a first network device through an SRB3 includes: The second network device determines, based on the capability information, that the terminal device can send the assistance information of the terminal device to the first network device through the SRB3.

For example, the second network device may determine, based on the capability information of the terminal device, whether the terminal device can send the assistance information to the first network device through the SRB3. Alternatively, the second network device may determine, based on another factor, whether the terminal device can send the assistance information to the first network device through the SRB3. For example, the second network device may periodically configure the terminal device to send the assistance information to the first network device through the SRB3. This is not specifically limited.

For technical effects brought by some implementations of the third aspect, refer to the descriptions of the technical effects in the first aspect, the corresponding implementations of the first aspect, the second aspect, or the corresponding implementations of the second aspect. Details are not described herein again.

According to a fourth aspect, a fourth communications method is provided. The method includes: A terminal device sends a request message to a second network device, where the request message is used to request to set up an SRB3 used for communication between the terminal device and a first network device, the terminal device is connected to at least two network devices, the first network device is a secondary network device in the at least two network devices, and the second network device is a master network device in the at least two network devices; the terminal device receives a first message from the second network device; and the terminal device sets up, based on the first message, the SRB3 used to communicate with the first network device, or configures, based on the first message, the SRB3 used to communicate with the first network device, or determines, based on the first message, that the SRB3 cannot be set up.

The method may be performed by a fourth communications apparatus. The fourth communications apparatus may be a communications device, or a communications apparatus that can support a function required by the communications device to implement the method, for example, a chip system. For example, the communications device is the terminal device.

In this embodiment of this application, the terminal device or the first network device can actively request to set up the SRB3, so as to set up the SRB3 when corresponding information needs to be transmitted, instead of passively waiting for the second network device to actively set up the SRB3. Therefore, the terminal device has relatively strong initiative.

With reference to the fourth aspect, in a first possible implementation of the fourth aspect, the method further includes: The terminal device sends capability information of the terminal device to the second network device, where the capability information includes first sub-capability information corresponding to the first network device, the first sub-capability information is transparently transmitted to the first network device by using the second network device, the capability information further includes second sub-capability information corresponding to the second network device and third sub-capability information corresponding to the first network device and the second network device.

With reference to the fourth aspect or the first possible implementation of the fourth aspect, in a second possible implementation of the fourth aspect, after the terminal device sets up, based on the first message, the SRB3 used to communicate with the first network device, the method further includes: The terminal device receives first configuration information from the first network device or the second network device; and the terminal device determines, based on the first configuration information, that the terminal device can send assistance information of the terminal device to the first network device through the SRB3, where the assistance information is used to indicate a configuration expected by the terminal device or service information of the terminal device.

With reference to the second possible implementation of the fourth aspect, in a third possible implementation of the fourth aspect, after the terminal device determines, based on the first configuration information, that the terminal device can send the assistance information of the terminal device to the first network device through the SRB3, the method further includes: The terminal device sends the assistance information to the first network device through the SRB3; or the terminal device sends the assistance information to the second network device, where the assistance information includes information corresponding to the first network device, and the information corresponding to the first network device is transparently transmitted to the first network device by using the second network device.

With reference to the third possible implementation of the fourth aspect, in a fourth possible implementation of the fourth aspect, the assistance information is information related to the first network device, or the assistance information includes the information related to the first network device and information related to the second network device.

With reference to the second possible implementation of the fourth aspect, in a fifth possible implementation of the fourth aspect, after the terminal device determines, based on the first configuration information, that the terminal device can send the assistance information of the terminal device to the first network device through the SRB3, the method further includes: The terminal device sends the information related to the second network device in the assistance information to the second network device; or sends the information related to the first network device in the assistance information to the first network device through the SRB3; or sends the information related to the second network device in the assistance information to the second network device, and sends the information related to the first network device in the assistance information to the first network device through the SRB3.

With reference to any one of the second possible implementation of the fourth aspect to the fifth possible implementation of the fourth aspect, in a sixth possible implementation of the second aspect, the first configuration information further includes information about at least one parameter corresponding to the assistance information, and the information is used to indicate the terminal device to send a value of the at least one parameter when sending the assistance information to the first network device.

With reference to any one of the second possible implementation of the fourth aspect to the sixth possible implementation of the fourth aspect, in a seventh possible implementation of the fourth aspect, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

With reference to any one of the second possible implementation of the fourth aspect to the seventh possible implementation of the fourth aspect, in an eighth possible implementation of the fourth aspect, the assistance information includes one or any combination of the following:

a quantity of MIMO layers of the terminal device;
    a quantity of secondary cells corresponding to the terminal device;
    a quantity of antenna ports of the terminal device;
    an aggregated bandwidth of a secondary cell group corresponding to the terminal device;
    a bandwidth of each secondary cell corresponding to the terminal device;
    a maximum bandwidth supported by the terminal device;
    a C-DRX configuration or parameter expected by the terminal device;
    a BWP configuration or parameter expected by the terminal device;
    an application type of the terminal device;
    a size of a data packet transmitted by the terminal device;
    a scheduling mode expected by the terminal device;
    a search space expected by the terminal device;
    a scheduling format expected by the terminal device; or
    a slot format expected by the terminal device.

With reference to the third possible implementation of the fourth aspect, in a ninth possible implementation of the fourth aspect, after the terminal device sends the assistance information to the first network device through the SRB3, the method further includes: The terminal device receives adjustment information from the first network device through the SRB3, where the adjustment information is used to adjust a configuration of the terminal device.

With reference to the fourth aspect, in a tenth possible implementation of the fourth aspect, the first message further carries second time information. That the terminal device determines, based on the first message, that the SRB3 cannot be set up further includes: The terminal device determines, based on the second time information carried in the first message, that the terminal device cannot request, within a time range corresponding to the second time information, to set up the SRB3.

If the second network device rejects setup of the SRB3, the second network device may use the first message to carry the second time information, to indicate that the terminal device cannot request to set up the SRB3 within the time range corresponding to the second time information. In this manner, the terminal device can be prevented, as much as possible, from frequently requesting to set up the SRB3, so as to reduce load of the second network device.

For technical effects brought by some implementations of the fourth aspect, refer to the descriptions of the effects in the first aspect, the corresponding implementations of the first aspect, the second aspect, the corresponding implementations of the second aspect, the third aspect, or the corresponding implementations of the third aspect.

According to a fifth aspect, a fifth communications method is provided. The method includes: A first network device sends a request message to a second network device, where the request message is used to request to set up an SRB3 used for communication between a terminal device and the first network device, the terminal device is connected to at least two network devices, the first network device is a secondary network device in the at least two network devices, and the second network device is a master network device in the at least two network devices; the first network device receives a first message from the second network device; and the first network device sets up, based on the first message, the SRB3 used to communicate with the terminal device, or configures, based on the first message, the SRB3 used for communication between the terminal device and the first network device, or determines, based on the first message, that the SRB3 cannot be set up.

The method may be performed by a fifth communications apparatus. The fifth communications apparatus may be a communications device, or a communications apparatus that can support a function required by the communications device to implement the method, for example, a chip system. For example, the communications device is a network device. For example, the network device is the first network device.

In this embodiment of this application, the terminal device or the first network device can actively request to set up the SRB3, so as to set up the SRB3 when corresponding information needs to be transmitted, instead of passively waiting for the second network device to actively set up the SRB3. Therefore, the terminal device has relatively strong initiative.

With reference to the fifth aspect, in a first possible implementation of the fifth aspect, the method further includes: The first network device receives capability information of the terminal device from the second network device, where the capability information of the terminal device includes first sub-capability information corresponding to the first network device and third sub-capability information corresponding to the first network device and the second network device, and the second network device is the master network device in the at least two network devices.

With reference to the fifth aspect or the first possible implementation of the fifth aspect, in a second possible implementation of the fifth aspect, after the first network device sets up, based on the first message, the SRB3 used to communicate with the terminal device, the method further includes: The first network device sends first configuration information to the terminal device, where the first configuration information is used to indicate that the terminal device can send assistance information of the terminal device to the first network device through the SRB3, and the assistance information is used to indicate a configuration expected by the terminal device or service information of the terminal device.

With reference to the second possible implementation of the fifth aspect, in a third possible implementation of the fifth aspect, after the first network device sends the first configuration information to the terminal device, the method further includes: The first network device receives the assistance information from the terminal device through the SRB3.

With reference to the third possible implementation of the fifth aspect, in a fourth possible implementation of the fifth aspect, the assistance information includes information related to the first network device.

With reference to any one of the second possible implementation of the fifth aspect to the fourth possible implementation of the fifth aspect, in a fifth possible implementation of the fifth aspect, the first configuration information further includes information about at least one parameter corresponding to the assistance information, and the information is used to indicate the terminal device to send a value of the at least one parameter when sending the assistance information to the first network device.

With reference to any one of the second possible implementation of the fifth aspect to the fifth possible implementation of the fifth aspect, in a sixth possible implementation of the fifth aspect, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

With reference to any one of the second possible implementation of the fifth aspect to the sixth possible implementation of the fifth aspect, in a seventh possible implementation of the fifth aspect, the assistance information includes one or any combination of the following:
  a quantity of MIMO layers of the terminal device;
  a quantity of secondary cells corresponding to the terminal device;
  a quantity of antenna ports of the terminal device;
  an aggregated bandwidth of a secondary cell group corresponding to the terminal device;
  a bandwidth of each secondary cell corresponding to the terminal device;
  a maximum bandwidth supported by the terminal device;
  a C-DRX configuration or parameter expected by the terminal device;
  a BWP configuration or parameter expected by the terminal device;
  an application type of the terminal device;
  a size of a data packet transmitted by the terminal device;
  a scheduling mode expected by the terminal device;
  a search space expected by the terminal device;
  a scheduling format expected by the terminal device; or
  a slot format expected by the terminal device.

With reference to the third possible implementation of the fifth aspect, in an eighth possible implementation of the fifth aspect, after the first network device receives the assistance information from the terminal device through the SRB3, the method further includes: The first network device determines adjustment information based on the assistance information, where the adjustment information is used to adjust an air interface parameter of the terminal device or the service information of the terminal device; and the first network device sends the adjustment information to the terminal device through the SRB3.

For technical effects brought by some implementations of the fifth aspect, refer to the descriptions of the effects in the first aspect, the corresponding implementations of the first aspect, the second aspect, the corresponding implementations of the second aspect, the third aspect, the corresponding implementations of the third aspect, the fourth aspect, or the corresponding implementations of the fourth aspect.

According to a sixth aspect, a sixth communications method is provided. The method includes: A second network device receives a request message, where the request message is used to request to set up an SRB3 used for communication between a first network device and a terminal device; and the second network device sends a first message, where the first message is used to set up the SRB3, or used to configure the SRB3, or used to indicate that setup of the SRB3 is rejected.

The method may be performed by a sixth communications apparatus. The sixth communications apparatus may be a communications device, or a communications apparatus that can support a function required by the communications device to implement the method, for example, a chip system. For example, the communications device is a network device. For example, the network device is the second network device.

In this embodiment of this application, the terminal device or the first network device can actively request to set up the SRB3, so as to set up the SRB3 when corresponding information needs to be transmitted, instead of passively waiting for the second network device to actively set up the SRB3. Therefore, the terminal device has relatively strong initiative. In other words, the request message received by the second network device may be from the terminal device, or may be from the first network device. This is relatively flexible.

With reference to the sixth aspect, in a first possible implementation of the sixth aspect, the method further includes: The second network device receives capability information of the terminal device from the terminal device, where the capability information includes first sub-capability information corresponding to the first network device, second sub-capability information corresponding to the second network device, and third sub-capability information corresponding to the first network device and the second network device.

With reference to the first possible implementation of the sixth aspect, in a second possible implementation of the sixth aspect, the method further includes: The second network device sends the first sub-capability information to the first network device.

With reference to any one of the sixth aspect, or the first possible implementation of the sixth aspect and the second possible implementation of the sixth aspect, in a third possible implementation of the sixth aspect, the first message is used to set up the SRB3 or used to configure the SRB3. The method further includes: The second network device sends first configuration information to the terminal device, where the first configuration information is used to indicate that the terminal device can send the assistance information to the first network device through the SRB3, and the assistance information is used to indicate a configuration expected by the terminal device or service information of the terminal device.

With reference to the third possible implementation of the sixth aspect, in a fourth possible implementation of the sixth aspect, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

With reference to the third possible implementation of the sixth aspect or the fourth possible implementation of the sixth aspect, in a fifth possible implementation of the sixth aspect, the first configuration information further includes information about at least one parameter corresponding to the assistance information, and the information is used to indicate the terminal device to specifically send a value of the at least one parameter when sending the assistance information to the first network device through the SRB3.

With reference to any one of the third possible implementation of the sixth aspect to the fifth possible implementation of the sixth aspect, in a sixth possible implementation of the sixth aspect, after the second network device sends the first configuration information to the terminal device, the method further includes: The second network device receives the assistance information, where the assistance information is information related to the second network device, or the assistance information includes information related to the first network device and the information related to the second network device.

With reference to the sixth possible implementation of the sixth aspect, in a seventh possible implementation of the sixth aspect, the assistance information includes the information related to the first network device and the information related to the second network device, and the method further includes: The second network device sends the information related to the first network device included in the assistance information to the first network device.

With reference to any one of the sixth aspect, or the first possible implementation of the sixth aspect to the seventh possible implementation of the sixth aspect, in an eighth possible implementation of the sixth aspect, the assistance information includes one or any combination of the following:
  a quantity of MIMO layers of the terminal device;
  a quantity of secondary cells corresponding to the terminal device;
  a quantity of antenna ports of the terminal device;
  an aggregated bandwidth of a secondary cell group corresponding to the terminal device;
  a bandwidth of each secondary cell corresponding to the terminal device;
  a maximum bandwidth supported by the terminal device;
  a C-DRX configuration or parameter expected by the terminal device;
  a BWP configuration or parameter expected by the terminal device;
  an application type of the terminal device;
  a size of a data packet transmitted by the terminal device;
  a scheduling mode expected by the terminal device;
  a search space expected by the terminal device;
  a scheduling format expected by the terminal device; or
  a slot format expected by the terminal device.

For technical effects brought by some implementations of the sixth aspect, refer to the descriptions of the effects in the first aspect, the corresponding implementations of the first aspect, the second aspect, the corresponding implementations of the second aspect, the third aspect, the corresponding implementations of the third aspect, the fourth aspect, the corresponding implementations of the fourth aspect, the fifth aspect, or the corresponding implementations of the fifth aspect.

According to a seventh aspect, a first type of communications apparatus is provided. For example, the communications apparatus is the first communications apparatus described above. The communications apparatus is configured to perform the method according to any one of the first aspect or the possible implementations of the first aspect. Specifically, the communications apparatus may include modules configured to perform the method according to any one of the first aspect or the possible implementations of the first aspect. For example, the communications apparatus includes a processing module and a transceiver module. For example, the communications apparatus is a terminal device.

The processing module is configured to determine that assistance information of the communications apparatus can be sent to a first network device through an SRB3, where the communications apparatus is connected to at least two network devices, and the first network device is a secondary network device in the at least two network devices.

The transceiver module is configured to send the assistance information to the first network device through the SRB3, where the assistance information is used to indicate a configuration expected by the communications apparatus or service information of the terminal device.

With reference to the seventh aspect, in a first possible implementation of the seventh aspect, the processing module is configured to determine, in the following manner, that the assistance information of the terminal device can be sent to the first network device through the SRB3:
obtaining first configuration information that is received by the transceiver module and that is from the first network device or a second network device; and
determining, based on the first configuration information, that the communications apparatus can send the assistance information to the first network device through the SRB3, where the second network device is a master network device in the at least two network devices.

With reference to the first possible implementation of the seventh aspect, in a second possible implementation of the seventh aspect, the first configuration information further includes first time information, and the processing module is further configured to:
determine, based on the first time information, that the communications apparatus can send the assistance information to the first network device through the SRB3 within a time range corresponding to the first time information; or
determine, based on the first time information, that the communications apparatus no longer sends assistance information to the first network device within the first time after sending the assistance information to the first network device.

With reference to any one of the seventh aspect, or the first possible implementation of the seventh aspect and the second possible implementation of the seventh aspect, in a third possible implementation of the seventh aspect, the first configuration information further includes information about at least one parameter corresponding to the assistance information, and the processing module is further configured to determine that a value of the at least one parameter can be sent to the first network device through the SRB3.

With reference to any one of the seventh aspect, or the first possible implementation of the seventh aspect to the third possible implementation of the seventh aspect, in a fourth possible implementation of the seventh aspect, the assistance information is information related to the first network device, or the assistance information includes the information related to the first network device and information related to the second network device.

With reference to any one of the seventh aspect, or the first possible implementation of the seventh aspect to the fourth possible implementation of the seventh aspect, in a fifth possible implementation of the seventh aspect, the transceiver module is further configured to: after sending the assistance information to the first network device through the SRB3, receive adjustment information from the first network device through the SRB3, where the adjustment information is used to adjust a configuration of the communications apparatus.

With reference to any one of the seventh aspect, or the first possible implementation of the seventh aspect to the fifth possible implementation of the seventh aspect, in a sixth possible implementation of the seventh aspect, the assistance information includes one or any combination of the following:
a quantity of MIMO layers of the communications apparatus;
a quantity of secondary cells corresponding to the communications apparatus;
a quantity of antenna ports of the communications apparatus;
an aggregated bandwidth of a secondary cell group corresponding to the communications apparatus;
a bandwidth of each secondary cell corresponding to the communications apparatus;
a maximum bandwidth supported by the communications apparatus;
a C-DRX configuration or parameter expected by the communications apparatus;
a BWP configuration or parameter expected by the communications apparatus;
an application type of the communications apparatus;
a size of a data packet transmitted by the communications apparatus;
a scheduling mode expected by the communications apparatus;
a search space expected by the communications apparatus;
a scheduling format expected by the communications apparatus; or
a slot format expected by the communications apparatus.

With reference to any one of the seventh aspect, or the first possible implementation of the seventh aspect to the sixth possible implementation of the seventh aspect, in a seventh possible implementation of the seventh aspect, the transceiver module is further configured to send capability information of the communications apparatus to the second network device, where the capability information includes first sub-capability information corresponding to the first network device, the first sub-capability information is transparently transmitted to the first network device by using the second network device, the capability information further includes second sub-capability information corresponding to the second network device and third sub-capability information corresponding to the first network device and the second network device, and the second network device is the master network device in the at least two network devices.

With reference to any one of the seventh aspect, or the first possible implementation of the seventh aspect to the seventh possible implementation of the seventh aspect, in an eighth possible implementation of the seventh aspect, the transceiver module is further configured to:
send a request message to the second network device, where the request message is used to request to set up the SRB3 used for communication between the communications apparatus and the first network device, and the second network device is the master network device in the at least two network devices; and receive a first message from the second network device, where the first message is used to set up the SRB3 for the communications apparatus or used to configure the SRB3 for the terminal device.

For technical effects of the seventh aspect or the possible implementations of the seventh aspect, refer to the descriptions of the effects of the first aspect or the possible implementations of the first aspect.

According to an eighth aspect, a second type of communications apparatus is provided. For example, the communications apparatus is the second communications apparatus described above. The communications apparatus is configured to perform the method according to any one of the second aspect or the possible implementations of the second aspect. Specifically, the communications apparatus may include modules configured to perform the method according to any one of the second aspect or the possible implementations of the second aspect. For example, the communications apparatus includes a processing module and a transceiver module. For example, the communications apparatus is a network device. For example, the network device is the first network device.

The transceiver module is configured to receive assistance information of a terminal device, where the assistance information is used to indicate a configuration expected by the terminal device or service information of the terminal device, the terminal device is connected to at least two network devices, and the communications apparatus is a secondary network device in the at least two network devices.

With reference to the eighth aspect, in a first possible implementation of the eighth aspect, the processing module is configured to determine adjustment information based on the assistance information, where the adjustment information is used to adjust a configuration of the terminal device or the service information of the terminal device; and the transceiver module is further configured to send the adjustment information to the terminal device through an SRB3.

With reference to the eighth aspect or the first possible implementation of the eighth aspect, in a second possible implementation of the eighth aspect, the transceiver module is configured to receive the assistance information of the terminal device in the following manner:

receiving the assistance information from the terminal device through the SRB3; or receiving the assistance information from a second network device, where the second network device is a master network device in the at least two network devices.

With reference to any one of the eighth aspect, or the first possible implementation of the eighth aspect and the second possible implementation of the eighth aspect, in a third possible implementation of the eighth aspect, the transceiver module is further configured to send first configuration information to the terminal device, where the first configuration information is used to indicate that the terminal device can send the assistance information of the terminal device to the communications apparatus through the SRB3.

With reference to any one of the eighth aspect, or the first possible implementation of the eighth aspect to the third possible implementation of the eighth aspect, in a fourth possible implementation of the eighth aspect, the assistance information is information related to the first network device, or the assistance information includes the information related to the first network device and information related to the second network device.

With reference to the fourth possible implementation of the eighth aspect, in a fifth possible implementation of the eighth aspect, the assistance information includes the information related to the first network device and the information related to the second network device. The transceiver module is further configured to send the information related to the second network device included in the assistance information to the second network device.

With reference to the third possible implementation of the eighth aspect, in a sixth possible implementation of the eighth aspect, the first configuration information further includes first time information, used to indicate that the terminal device can send the assistance information to the communications apparatus through the SRB3 within a time range corresponding to the first time information; or used to indicate the terminal device not to send assistance information to the communications apparatus within the first time after sending the assistance information to the communications apparatus.

With reference to the third possible implementation of the eighth aspect or the sixth possible implementation of the eighth aspect, in a seventh possible implementation of the eighth aspect, the first configuration information further includes information about at least one parameter corresponding to the assistance information, and the information is used to indicate the terminal device to send a value of the at least one parameter when sending the assistance information of the terminal device to the communications apparatus.

With reference to any one of the eighth aspect, or the first possible implementation of the eighth aspect to the seventh possible implementation of the eighth aspect, in an eighth possible implementation of the eighth aspect, the assistance information includes one or any combination of the following:

a quantity of MIMO layers of the terminal device;
a quantity of secondary cells corresponding to the terminal device;
a quantity of antenna ports of the terminal device;
an aggregated bandwidth of a secondary cell group corresponding to the terminal device;
a bandwidth of each secondary cell corresponding to the terminal device;
a maximum bandwidth supported by the terminal device;
a C-DRX configuration or parameter expected by the terminal device;
a BWP configuration or parameter expected by the terminal device;
an application type of the terminal device;
a size of a data packet transmitted by the terminal device;
a scheduling mode expected by the terminal device;
a search space expected by the terminal device;
a scheduling format expected by the terminal device; or
a slot format expected by the terminal device.

With reference to any one of the eighth aspect, or the first possible implementation of the eighth aspect to the eighth possible implementation of the eighth aspect, in a ninth possible implementation of the eighth aspect, the transceiver module is further configured to receive capability information of the terminal device from the second network device, where the capability information of the terminal device includes first sub-capability information corresponding to the communications apparatus and third sub-capability information corresponding to the communications apparatus and the second network device, and the second network device is the master network device in the at least two network devices.

With reference to the ninth possible implementation of the eighth aspect, in a tenth possible implementation of the eighth aspect, the transceiver unit is further configured to:
  send a request message to the second network device, where the request message is used to request to set up the SRB3 used for communication between the communications apparatus and the terminal device; and
  receive a first message from the second network device, where the first message is used to set up the SRB3 for the communications apparatus.

With reference to any one of the eighth aspect, or the first possible implementation of the eighth aspect to the tenth possible implementation of the eighth aspect, in an eleventh possible implementation of the eighth aspect, the transceiver module is further configured to:
  receive a request message from the second network device, where the request message is used to request the communications apparatus to serve as a secondary network device of the second network device, and the second network device is the master network device in the at least two network devices;
  send a response message to the second network device, where the response message is used to indicate that the communications apparatus agrees that the communications apparatus serves as the secondary network device of the second network device; and
  receive second configuration information from the second network device, where the second configuration information is used to configure the communications apparatus as the secondary network device of the second network device.

For technical effects of the eighth aspect or the possible implementations of the eighth aspect, refer to the descriptions of the effects of the second aspect or the possible implementations of the second aspect.

According to a ninth aspect, a third type of communications apparatus is provided. For example, the communications apparatus is the third communications apparatus described above. The communications apparatus is configured to perform the method in any one of the third aspect or the possible implementations of the third aspect. Specifically, the communications apparatus may include modules configured to perform the method in any one of the third aspect or the possible implementations of the third aspect. For example, the communications apparatus includes a processing module and a transceiver module. For example, the communications apparatus is a network device. For example, the network device is a second network device.

The processing module is configured to determine that a terminal device can send assistance information of the terminal device to a first network device through an SRB3, where the terminal device is connected to at least two network devices, the first network device is a secondary network device in the at least two network devices, and the communications apparatus is a master network device in the at least two network devices.

The transceiver module is configured to send first configuration information to the terminal device, where the first configuration information is used to indicate that the terminal device can send the assistance information to the first network device through the SRB3.

With reference to the ninth aspect, in a first possible implementation of the ninth aspect, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

With reference to the ninth aspect or the first possible implementation of the ninth aspect, in a second possible implementation of the ninth aspect, the first configuration information further includes information about at least one parameter corresponding to the assistance information, and the information is used to indicate the terminal device to specifically send a value of the at least one parameter when sending the assistance information to the first network device through the SRB3.

With reference to any one of the ninth aspect, or the first possible implementation of the ninth aspect and the second possible implementation of the ninth aspect, in a third possible implementation of the ninth aspect, the transceiver module is further configured to: after sending the first configuration information to the terminal device, receive the assistance information, where the assistance information is information related to the communications apparatus, or the assistance information includes information related to the first network device and the information related to the communications apparatus.

With reference to the third possible implementation of the ninth aspect, in a fourth possible implementation of the ninth aspect, the assistance information includes the information related to the first network device and the information related to the communications apparatus. The transceiver module is further configured to send the information related to the first network device included in the assistance information to the first network device.

With reference to any one of the ninth aspect, or the first possible implementation of the ninth aspect to the fourth possible implementation of the ninth aspect, in a fifth possible implementation of the ninth aspect, the assistance information includes one or any combination of the following:
  a quantity of MIMO layers of the terminal device;
  a quantity of secondary cells corresponding to the terminal device;
  a quantity of antenna ports of the terminal device;
  an aggregated bandwidth of a secondary cell group corresponding to the terminal device;
  a bandwidth of each secondary cell corresponding to the terminal device;
  a maximum bandwidth supported by the terminal device;
  a C-DRX configuration or parameter expected by the terminal device;
  a BWP configuration or parameter expected by the terminal device;
  an application type of the terminal device;
  a size of a data packet transmitted by the terminal device;
  a scheduling mode expected by the terminal device;
  a search space expected by the terminal device;
  a scheduling format expected by the terminal device; or
  a slot format expected by the terminal device.

With reference to any one of the ninth aspect or the first possible implementation of the ninth aspect to the fifth possible implementation of the ninth aspect, in a sixth possible implementation of the ninth aspect, the transceiver module is further configured to:

receive a request message, where the request message is used to request to set up the SRB3 used for communication between the first network device and the terminal device; and send a first message, where the first message is used to set up the SRB3, or is used to indicate to reject setup of the SRB3.

With reference to any one of the ninth aspect, or the first possible implementation of the ninth aspect to the sixth possible implementation of the ninth aspect, in a seventh possible implementation of the ninth aspect, the transceiver module is further configured to: before the processing module determines that the terminal device can send the assistance information of the terminal device to the first network device through the SRB3, receive capability information of the terminal device from the terminal device, where the capability information includes first sub-capability information corresponding to the first network device, second sub-capability information corresponding to the second network device, and third sub-capability information corresponding to the first network device and the second network device.

With reference to any one of the ninth aspect, or the first possible implementation of the ninth aspect to the sixth possible implementation of the ninth aspect, in a seventh possible implementation of the ninth aspect, the processing module is configured to determine, in the following manner, that the terminal device can send the assistance information of the terminal device to the first network device through the SRB3: determining, based on the capability information, that the terminal device can send the assistance information of the terminal device to the first network device through the SRB3.

For technical effects of the ninth aspect or the possible implementations of the ninth aspect, refer to the descriptions of the effects of the third aspect or the possible implementations of the third aspect.

According to a tenth aspect, a fourth type of communications apparatus is provided. For example, the communications apparatus is the fourth communications apparatus described above. The communications apparatus is configured to perform the method in any one of the fourth aspect or the possible implementations of the fourth aspect. Specifically, the communications apparatus may include modules configured to perform the method in any one of the fourth aspect or the possible implementations of the fourth aspect. For example, the communications apparatus includes a processing module and a transceiver module. For example, the communications apparatus is a terminal device.

The transceiver module is configured to send a request message to a second network device, where the request message is used to request to set up an SRB3 used for communication between the communications apparatus and a first network device, the communications apparatus is connected to at least two network devices, the first network device is a secondary network device in the at least two network devices, and the second network device is a master network device in the at least two network devices.

The transceiver module is further configured to receive a first message from the second network device.

The processing module is configured to set up, based on the first message, the SRB3 used to communicate with the first network device, or configure, based on the first message, the SRB3 used to communicate with the first network device, or determine, based on the first message, that the SRB3 cannot be set up.

With reference to the tenth aspect, in a first possible implementation of the tenth aspect, the transceiver module is further configured to send capability information of the communications apparatus to the second network device, where the capability information includes first sub-capability information corresponding to the first network device, the first sub-capability information is transparently transmitted to the first network device by using the second network device, the capability information further includes second sub-capability information corresponding to the second network device and third sub-capability information corresponding to the first network device and the second network device.

With reference to the tenth aspect or the first possible implementation of the tenth aspect, in a second possible implementation of the tenth aspect, the transceiver module is further configured to: after the processing module sets up, based on the first message, the SRB3 used to communicate with the first network device, receive first configuration information from the first network device or the second network device; and the processing module is further configured to determine, based on the first configuration information, that the communications apparatus can send assistance information of the communications apparatus to the first network device through the SRB3, where the assistance information is used to indicate a configuration expected by the communications apparatus or service information of the communications apparatus.

With reference to the second possible implementation of the tenth aspect, in a third possible implementation of the tenth aspect, after the processing module determines, based on the first configuration information, that the terminal device can send the assistance information of the terminal device to the first network device through the SRB3, the transceiver module is further configured to:

send the assistance information to the first network device through the SRB3; or send the assistance information to the second network device, where the assistance information includes information corresponding to the first network device, and the information corresponding to the first network device is transparently transmitted to the first network device by using the second network device.

With reference to the third possible implementation of the tenth aspect, in a fourth possible implementation of the tenth aspect, the assistance information is information related to the first network device, or the assistance information includes the information related to the first network device and information related to the second network device.

With reference to the second possible implementation of the tenth aspect, in a fifth possible implementation of the tenth aspect, after the processing module determines, based on the first configuration information, that the communications apparatus can send the assistance information of the communications apparatus to the first network device through the SRB3, the transceiver module is further configured to:

send the information related to the second network device in the assistance information to the second network device; or send the information related to the first network device in the assistance information to the first network device through the SRB3; or send the information related to the second network device in the assistance information to the second network device, and send the information related to the first network device in the assistance information to the first network device through the SRB3.

With reference to any one of the second possible implementation of the tenth aspect to the fifth possible implementation of the tenth aspect, in a sixth possible implementation of the tenth aspect, the first configuration information further includes information about at least one parameter corresponding to the assistance information, and the information is used to indicate the communications apparatus to send a value of the at least one parameter when sending the assistance information to the first network device.

With reference to any one of the second possible implementation of the tenth aspect to the sixth possible implementation of the tenth aspect, in a seventh possible implementation of the tenth aspect, the first configuration information further includes first time information, used to indicate that the communications apparatus can send the assistance information to the first network device through the SRB3 within a time range corresponding to the first time information; or used to indicate the communications apparatus not to send assistance information to the first network device within the first time after sending the assistance information to the first network device.

With reference to any one of the second possible implementation of the tenth aspect to the seventh possible implementation of the tenth aspect, in an eighth possible implementation of the tenth aspect, the assistance information includes one or any combination of the following:
  a quantity of MIMO layers of the communications apparatus;
  a quantity of secondary cells corresponding to the communications apparatus;
  a quantity of antenna ports of the communications apparatus;
  an aggregated bandwidth of a secondary cell group corresponding to the communications apparatus;
  a bandwidth of each secondary cell corresponding to the communications apparatus;
  a maximum bandwidth supported by the communications apparatus;
  a C-DRX configuration or parameter expected by the communications apparatus;
  a BWP configuration or parameter expected by the communications apparatus;
  an application type of the communications apparatus;
  a size of a data packet transmitted by the communications apparatus;
  a scheduling mode expected by the communications apparatus;
  a search space expected by the communications apparatus;
  a scheduling format expected by the communications apparatus; or
  a slot format expected by the communications apparatus.

With reference to the third possible implementation of the tenth aspect, in a ninth possible implementation of the tenth aspect, the transceiver module is further configured to: after sending the assistance information to the first network device through the SRB3, receive adjustment information from the first network device through the SRB3, where the adjustment information is used to adjust a configuration of the communications apparatus.

With reference to the tenth aspect, in a tenth possible implementation of the tenth aspect, the first message further carries second time information. The processing module is configured to determine, in the following manner based on the first message, that the SRB3 cannot be set up: The processing module determines, based on the second time information carried in the first message, that the processing module cannot request, within a time range corresponding to the second time information, to set up the SRB3.

For technical effects of the tenth aspect or the possible implementations of the tenth aspect, refer to the descriptions of the effects of the fourth aspect or the possible implementations of the fourth aspect.

According to an eleventh aspect, a fifth type of communications apparatus is provided. For example, the communications apparatus is the fifth communications apparatus described above. The communications apparatus is configured to perform the method according to any one of the fifth aspect or the possible implementations of the fifth aspect. Specifically, the communication apparatus may include modules configured to perform the method according to any one of the fifth aspect or the possible implementations of the fifth aspect, for example, include a processing module and a transceiver module. For example, the communications apparatus is a network device. For example, the network device is a first network device.

The transceiver module is configured to send a request message to a second network device, where the request message is used to request to set up an SRB3 used for communication between the communications apparatus and a terminal device, the terminal device is connected to at least two network devices, the communications apparatus is a secondary network device in the at least two network devices, and the second network device is a master network device in the at least two network devices.

The transceiver module is further configured to receive a first message from the second network device.

The processing module is configured to set up, based on the first message, the SRB3 used to communicate with the terminal device, or configure, based on the first message, the SRB3 used for communication between the terminal device and the first network device, or determine, based on the first message, that the SRB3 cannot be set up.

With reference to the eleventh aspect, in a first possible implementation of the eleventh aspect, the transceiver module is further configured to receive capability information of the terminal device from the second network device, where the capability information of the terminal device includes first sub-capability information corresponding to the first network device and third sub-capability information corresponding to the first network device and the second network device, and the second network device is the master network device in the at least two network devices.

With reference to the eleventh aspect or the first possible implementation of the eleventh aspect, in a second possible implementation of the eleventh aspect, the transceiver module is further configured to: after the processing module sets up, based on the first message, the SRB3 used to communicate with the terminal device, send first configuration information to the terminal device, where the first configuration information is used to indicate that the terminal device can send assistance information of the terminal device to the communications apparatus through the SRB3, and the assistance information is used to indicate a configuration expected by the terminal device or service information of the terminal device.

With reference to the second possible implementation of the eleventh aspect, in a third possible implementation of the eleventh aspect, the transceiver module is further configured to: after sending the first configuration information to the terminal device, receive the assistance information from the terminal device through the SRB3.

With reference to the third possible implementation of the eleventh aspect, in a fourth possible implementation of the eleventh aspect, the assistance information includes information related to the first network device.

With reference to any one of the second possible implementation of the eleventh aspect to the fourth possible implementation of the eleventh aspect, in a fifth possible implementation of the eleventh aspect, the first configuration information further includes information about at least one parameter corresponding to the assistance information, and the information is used to indicate the terminal device to send a value of the at least one parameter when sending the assistance information to the communications apparatus.

With reference to any one of the second possible implementation of the eleventh aspect to the fifth possible implementation of the eleventh aspect, in a sixth possible implementation of the eleventh aspect, the first configuration information further includes first time information, used to indicate that the terminal device can send the assistance information to the communications apparatus through the SRB3 within a time range corresponding to the first time information; or used to indicate the terminal device not to send assistance information to the communications apparatus within the first time after sending the assistance information to the communications apparatus.

With reference to any one of the second possible implementation of the eleventh aspect to the sixth possible implementation of the eleventh aspect, in a seventh possible implementation of the eleventh aspect, the assistance information includes one or any combination of the following:
- a quantity of MIMO layers of the terminal device;
- a quantity of secondary cells corresponding to the terminal device;
- a quantity of antenna ports of the terminal device;
- an aggregated bandwidth of a secondary cell group corresponding to the terminal device;
- a bandwidth of each secondary cell corresponding to the terminal device;
- a maximum bandwidth supported by the terminal device;
- a C-DRX configuration or parameter expected by the terminal device;
- a BWP configuration or parameter expected by the terminal device;
- an application type of the terminal device;
- a size of a data packet transmitted by the terminal device;
- a scheduling mode expected by the terminal device;
- a search space expected by the terminal device;
- a scheduling format expected by the terminal device; or
- a slot format expected by the terminal device.

With reference to the third possible implementation of the eleventh aspect, in an eighth possible implementation of the eleventh aspect,
- the processing module is further configured to: after the transceiver module receives the assistance information from the terminal device through the SRB3, determine adjustment information based on the assistance information, where the adjustment information is used to adjust an air interface parameter of the terminal device or the service information of the terminal device; and
- the transceiver module is further configured to send the adjustment information to the terminal device through the SRB3.

For technical effects of the eleventh aspect or the possible implementations of the eleventh aspect, refer to the descriptions of the effects of the fifth aspect or the possible implementations of the fifth aspect.

According to a twelfth aspect, a sixth type of communications apparatus is provided. For example, the communications apparatus is the sixth communications apparatus described above. The communications apparatus is configured to perform the method according to any one of the sixth aspect or the possible implementations of the sixth aspect. Specifically, the communication apparatus may include modules configured to perform the method according to any one of the sixth aspect or the possible implementations of the sixth aspect, for example, include a processing module and a transceiver module. For example, the communications apparatus is a network device. For example, the network device is a second network device.

The transceiver module is configured to receive a request message, where the request message is used to request to set up an SRB3 used for communication between the first network device and the terminal device.

The processing module is configured to determine to set up the SRB3, or configure the SRB3, or reject setup of the SRB3.

The transceiver module is further configured to send a first message, where the first message is used to set up the SRB3, or used to configure the SRB3, or used to indicate to reject setup of the SRB3.

With reference to the twelfth aspect, in a first possible implementation of the twelfth aspect, the transceiver module is further configured to receive capability information of the terminal device from the terminal device, where the capability information includes first sub-capability information corresponding to the first network device, second sub-capability information corresponding to the second network device, and third sub-capability information corresponding to the first network device and the second network device.

With reference to the first possible implementation of the twelfth aspect, in a second possible implementation of the twelfth aspect, the transceiver module is further configured to send the first sub-capability information to the first network device.

With reference to any one of the twelfth aspect, or the first possible implementation of the twelfth aspect and the second possible implementation of the twelfth aspect, in a third possible implementation of the twelfth aspect, the first message is used to set up the SRB3 or used to configure the SRB3. The transceiver module is further configured to send first configuration information to the terminal device, where the first configuration information is used to indicate that the terminal device can send the assistance information to the first network device through the SRB3, and the assistance information is used to indicate a configuration expected by the terminal device or service information of the terminal device.

With reference to the third possible implementation of the twelfth aspect, in a fourth possible implementation of the twelfth aspect, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

With reference to the third possible implementation of the twelfth aspect or the fourth possible implementation of the twelfth aspect, in a fifth possible implementation of the twelfth aspect, the first configuration information further includes information about at least one parameter corresponding to the assistance information, and the information is used to indicate the terminal device to specifically send a value of the at least one parameter when sending the assistance information to the first network device through the SRB3.

With reference to any one of the third possible implementation of the twelfth aspect to the fifth possible implementation of the twelfth aspect, in a sixth possible implementation of the twelfth aspect, the transceiver module is further configured to: after sending the first configuration information to the terminal device, receive the assistance information, where the assistance information is information related to the communications apparatus, or the assistance information includes information related to the first network device and the information related to the communications apparatus.

With reference to the sixth possible implementation of the twelfth aspect, in a seventh possible implementation of the twelfth aspect, the assistance information includes the information related to the first network device and the information related to the communications apparatus. The transceiver module is further configured to send the information related to the first network device included in the assistance information to the first network device.

With reference to any one of the twelfth aspect, or the first possible implementation of the twelfth aspect to the seventh possible implementation of the twelfth aspect, in an eighth possible implementation of the twelfth aspect, the assistance information includes one or any combination of the following:
  a quantity of MIMO layers of the terminal device;
  a quantity of secondary cells corresponding to the terminal device;
  a quantity of antenna ports of the terminal device;
  an aggregated bandwidth of a secondary cell group corresponding to the terminal device;
  a bandwidth of each secondary cell corresponding to the terminal device;
  a maximum bandwidth supported by the terminal device;
  a C-DRX configuration or parameter expected by the terminal device;
  a BWP configuration or parameter expected by the terminal device;
  an application type of the terminal device;
  a size of a data packet transmitted by the terminal device;
  a scheduling mode expected by the terminal device;
  a search space expected by the terminal device;
  a scheduling format expected by the terminal device; or
  a slot format expected by the terminal device.

For technical effects of the twelfth aspect or the possible implementations of the twelfth aspect, refer to the descriptions of the effects of the sixth aspect or the possible implementations of the sixth aspect.

According to a thirteenth aspect, a seventh type of communications apparatus is provided. For example, the communications apparatus is the first communications apparatus described above. The communications apparatus includes a processor and a transceiver. The processor and the transceiver are coupled to each other, and are configured to implement the method described in the first aspect or the possible designs of the first aspect. For example, the communications apparatus is a chip disposed in a communications device. For example, the communications device is a terminal device. For example, the transceiver is implemented by using an antenna, a feeder, and a codec that are in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The processor is configured to determine that assistance information of the communications apparatus can be sent to a first network device through an SRB3, where the communications apparatus is connected to at least two network devices, and the first network device is a secondary network device in the at least two network devices.

The transceiver is configured to send the assistance information to the first network device through the SRB3, where the assistance information is used to indicate a configuration expected by the communications apparatus or service information of the terminal device.

With reference to the thirteenth aspect, in a first possible implementation of the thirteenth aspect, the processor is configured to determine, in the following manner, that the assistance information of the terminal device can be sent to the first network device through the SRB3:
  obtaining first configuration information received by the transceiver from the first network device or a second network device; and
  determining, based on the first configuration information, that the communications apparatus can send the assistance information to the first network device through the SRB3, where the second network device is a master network device in the at least two network devices.

With reference to the first possible implementation of the thirteenth aspect, in a second possible implementation of the thirteenth aspect, the first configuration information further includes first time information, and the processor is further configured to:
  determine, based on the first time information, that the communications apparatus can send the assistance information to the first network device through the SRB3 within a time range corresponding to the first time information; or
  determine, based on the first time information, that the communications apparatus no longer sends assistance information to the first network device within the first time after sending the assistance information to the first network device.

With reference to any one of the thirteenth aspect, or the first possible implementation of the thirteenth aspect and the second possible implementation of the thirteenth aspect, in a third possible implementation of the thirteenth aspect, the first configuration information further includes information about at least one parameter corresponding to the assistance information, and the processing module is further configured to determine that a value of the at least one parameter can be sent to the first network device through the SRB3.

With reference to any one of the seventh aspect, or the first possible implementation of the seventh aspect to the third possible implementation of the seventh aspect, in a fourth possible implementation of the seventh aspect, the assistance information is information related to the first network device, or the assistance information includes the information related to the first network device and information related to the second network device.

With reference to any one of the thirteenth aspect, or the first possible implementation of the thirteenth aspect to the fourth possible implementation of the thirteenth aspect, in a fifth possible implementation of the thirteenth aspect, the transceiver is further configured to: after sending the assistance information to the first network device through the SRB3, receive adjustment information from the first network device through the SRB3, where the adjustment information is used to adjust a configuration of the communications apparatus.

With reference to any one of the thirteenth aspect, or the first possible implementation of the thirteenth aspect to the fifth possible implementation of the thirteenth aspect, in a sixth possible implementation of the thirteenth aspect, the assistance information includes one or any combination of the following:
- a quantity of MIMO layers of the communications apparatus;
- a quantity of secondary cells corresponding to the communications apparatus;
- a quantity of antenna ports of the communications apparatus;
- an aggregated bandwidth of a secondary cell group corresponding to the communications apparatus;
- a bandwidth of each secondary cell corresponding to the communications apparatus;
- a maximum bandwidth supported by the communications apparatus;
- a C-DRX configuration or parameter expected by the communications apparatus;
- a BWP configuration or parameter expected by the communications apparatus;
- an application type of the communications apparatus;
- a size of a data packet transmitted by the communications apparatus;
- a scheduling mode expected by the communications apparatus;
- a search space expected by the communications apparatus;
- a scheduling format expected by the communications apparatus; or
- a slot format expected by the communications apparatus.

With reference to any one of the thirteenth aspect, or the first possible implementation of the thirteenth aspect to the sixth possible implementation of the thirteenth aspect, in a seventh possible implementation of the thirteenth aspect, the transceiver is further configured to send capability information of the communications apparatus to the second network device, where the capability information includes first sub-capability information corresponding to the first network device, the first sub-capability information is transparently transmitted to the first network device by using the second network device, the capability information further includes second sub-capability information corresponding to the second network device and third sub-capability information corresponding to the first network device and the second network device, and the second network device is the master network device in the at least two network devices.

With reference to any one of the thirteenth aspect, or the first possible implementation of the thirteenth aspect to the seventh possible implementation of the thirteenth aspect, in an eighth possible implementation of the thirteenth aspect, the transceiver is further configured to:
- send a request message to the second network device, where the request message is used to request to set up the SRB3 used for communication between the communications apparatus and the first network device, and the second network device is the master network device in the at least two network devices; and
- receive a first message from the second network device, where the first message is used to set up the SRB3 for the communications apparatus or used to configure the SRB3 for the terminal device.

For technical effects of the thirteenth aspect or the possible implementations of the thirteenth aspect, refer to the descriptions of the effects of the first aspect or the possible implementations of the first aspect.

According to a fourteenth aspect, an eighth type of communications apparatus is provided. For example, the communications apparatus is the second communications apparatus described above. The communications apparatus includes a processor and a transceiver. The processor and the transceiver are coupled to each other, and are configured to implement the method described in the second aspect or the possible designs of the second aspect. For example, the communications apparatus is a chip disposed in a communications device. For example, the communications device is a network device. For example, the network device is a first network device. For example, the transceiver is implemented by using an antenna, a feeder, and a codec that are in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The transceiver is configured to receive assistance information of a terminal device, where the assistance information is used to indicate a configuration expected by the terminal device or service information of the terminal device, the terminal device is connected to at least two network devices, and the communications apparatus is a secondary network device in the at least two network devices.

With reference to the fourteenth aspect, in a first possible implementation of the fourteenth aspect,
- the processor is configured to determine adjustment information based on the assistance information, where the adjustment information is used to adjust a configuration of the terminal device or the service information of the terminal device; and
- the transceiver is further configured to send the adjustment information to the terminal device through an SRB3.

With reference to the fourteenth aspect or the first possible implementation of the fourteenth aspect, in a second possible implementation of the fourteenth aspect, the transceiver is configured to receive the assistance information of the terminal device in the following manner:
- receiving the assistance information from the terminal device through the SRB3; or
- receiving the assistance information from a second network device, where the second network device is a master network device in the at least two network devices.

With reference to any one of the fourteenth aspect, or the first possible implementation of the fourteenth aspect and the second possible implementation of the fourteenth aspect, in a third possible implementation of the fourteenth aspect, the transceiver is further configured to send first configuration information to the terminal device, where the first configuration information is used to indicate that the terminal device can send the assistance information of the terminal device to the communications apparatus through the SRB3.

With reference to any one of the fourteenth aspect, or the first possible implementation of the fourteenth aspect to the third possible implementation of the fourteenth aspect, in a fourth possible implementation of the fourteenth aspect, the assistance information is information related to the first network device, or the assistance information includes the information related to the first network device and information related to the second network device.

With reference to the fourth possible implementation of the fourteenth aspect, in a fifth possible implementation of the fourteenth aspect, the assistance information includes the information related to the first network device and the information related to the second network device. The transceiver is further configured to send the information related to the second network device included in the assistance information to the second network device.

With reference to the third possible implementation of the fourteenth aspect, in a sixth possible implementation of the fourteenth aspect, the first configuration information further includes first time information, used to indicate that the terminal device can send the assistance information to the communications apparatus through the SRB3 within a time range corresponding to the first time information; or used to indicate the terminal device not to send assistance information to the communications apparatus within the first time after sending the assistance information to the communications apparatus.

With reference to the third possible implementation of the fourteenth aspect or the sixth possible implementation of the fourteenth aspect, in a seventh possible implementation of the fourteenth aspect, the first configuration information further includes information about at least one parameter corresponding to the assistance information, and the information is used to indicate the terminal device to send a value of the at least one parameter when sending the assistance information of the terminal device to the communications apparatus.

With reference to any one of the fourteenth aspect, or the first possible implementation of the fourteenth aspect to the seventh possible implementation of the fourteenth aspect, in an eighth possible implementation of the fourteenth aspect, the assistance information includes one or any combination of the following:
- a quantity of MIMO layers of the terminal device;
- a quantity of secondary cells corresponding to the terminal device;
- a quantity of antenna ports of the terminal device;
- an aggregated bandwidth of a secondary cell group corresponding to the terminal device;
- a bandwidth of each secondary cell corresponding to the terminal device;
- a maximum bandwidth supported by the terminal device;
- a C-DRX configuration or parameter expected by the terminal device;
- a BWP configuration or parameter expected by the terminal device;
- an application type of the terminal device;
- a size of a data packet transmitted by the terminal device;
- a scheduling mode expected by the terminal device;
- a search space expected by the terminal device;
- a scheduling format expected by the terminal device; or
- a slot format expected by the terminal device.

With reference to any one of the fourteenth aspect, or the first possible implementation of the fourteenth aspect to the eighth possible implementation of the fourteenth aspect, in a ninth possible implementation of the fourteenth aspect, the transceiver is further configured to receive capability information of the terminal device from the second network device, where the capability information of the terminal device includes first sub-capability information corresponding to the communications apparatus and third sub-capability information corresponding to the communications apparatus and the second network device, and the second network device is the master network device in the at least two network devices.

With reference to the ninth possible implementation of the fourteenth aspect, in a tenth possible implementation of the fourteenth aspect, the transceiver is further configured to:
send a request message to the second network device, where the request message is used to request to set up the SRB3 used for communication between the communications apparatus and the terminal device; and
receive a first message from the second network device, where the first message is used to set up the SRB3 for the communications apparatus.

With reference to any one of the fourteenth aspect, or the first possible implementation of the fourteenth aspect to the tenth possible implementation of the fourteenth aspect, in an eleventh possible implementation of the fourteenth aspect, the transceiver is further configured to:
receive a request message from the second network device, where the request message is used to request the communications apparatus to serve as a secondary network device of the second network device, and the second network device is the master network device in the at least two network devices;
send a response message to the second network device, where the response message is used to indicate that the communications apparatus agrees that the communications apparatus serves as the secondary network device of the second network device; and
receive second configuration information from the second network device, where the second configuration information is used to configure the communications apparatus as the secondary network device of the second network device.

For technical effects of the fourteenth aspect or the possible implementations of the fourteenth aspect, refer to the descriptions of the effects of the second aspect or the possible implementations of the second aspect.

According to a fifteenth aspect, a ninth type of communications apparatus is provided. For example, the communications apparatus is the third communications apparatus described above. The communications apparatus includes a processor and a transceiver. The processor and the transceiver are coupled to each other, and are configured to implement the method described in the third aspect or the possible designs of the third aspect. For example, the communications apparatus is a chip disposed in a communications device. For example, the communications device is a network device. For example, the network device is a second network device. For example, the transceiver is implemented by using an antenna, a feeder, and a codec that are in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The processor is configured to determine that a terminal device can send assistance information of the terminal device to a first network device through an SRB3, where the terminal device is connected to at least two network devices, the first network device is a secondary network device in the at least two network devices, and the communications apparatus is a master network device in the at least two network devices.

The transceiver is configured to send first configuration information to the terminal device, where the first configuration information is used to indicate that the terminal device can send the assistance information to the first network device through the SRB3.

With reference to the fifteenth aspect, in a first possible implementation of the fifteenth aspect, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

With reference to the fifteenth aspect or the first possible implementation of the fifteenth aspect, in a second possible implementation of the fifteenth aspect, the first configuration information further includes information about at least one parameter corresponding to the assistance information, and the information is used to indicate the terminal device to specifically send a value of the at least one parameter when sending the assistance information to the first network device through the SRB3.

With reference to any one of the fifteenth aspect, or the first possible implementation of the fifteenth aspect and the second possible implementation of the fifteenth aspect, in a third possible implementation of the fifteenth aspect, the transceiver is further configured to: after sending the first configuration information to the terminal device, receive the assistance information, where the assistance information is information related to the communications apparatus, or the assistance information includes information related to the first network device and the information related to the communications apparatus.

With reference to the third possible implementation of the fifteenth aspect, in a fourth possible implementation of the fifteenth aspect, the assistance information includes the information related to the first network device and the information related to the communications apparatus. The transceiver is further configured to send the information related to the first network device included in the assistance information to the first network device.

With reference to any one of the fifteenth aspect, or the first possible implementation of the fifteenth aspect to the fourth possible implementation of the fifteenth aspect, in a fifth possible implementation of the fifteenth aspect, the assistance information includes one or any combination of the following:
  a quantity of MIMO layers of the terminal device;
  a quantity of secondary cells corresponding to the terminal device;
  a quantity of antenna ports of the terminal device;
  an aggregated bandwidth of a secondary cell group corresponding to the terminal device;
  a bandwidth of each secondary cell corresponding to the terminal device;
  a maximum bandwidth supported by the terminal device;
  a C-DRX configuration or parameter expected by the terminal device;
  a BWP configuration or parameter expected by the terminal device;
  an application type of the terminal device;
  a size of a data packet transmitted by the terminal device;
  a scheduling mode expected by the terminal device;
  a search space expected by the terminal device;
  a scheduling format expected by the terminal device; or
  a slot format expected by the terminal device.

With reference to any one of the fifteenth aspect, or the first possible implementation of the fifteenth aspect to the fifth possible implementation of the fifteenth aspect, in a sixth possible implementation of the fifteenth aspect, the transceiver is further configured to:
  receive a request message, where the request message is used to request to set up the SRB3 used for communication between the first network device and the terminal device; and
  send a first message, where the first message is used to set up the SRB3, or is used to indicate to reject setup of the SRB3.

With reference to any one of the fifteenth aspect, or the first possible implementation of the fifteenth aspect to the sixth possible implementation of the fifteenth aspect, in a seventh possible implementation of the fifteenth aspect, the transceiver is further configured to: before the processor determines that the terminal device can send the assistance information of the terminal device to the first network device through the SRB3, receive capability information of the terminal device from the terminal device, where the capability information includes first sub-capability information corresponding to the first network device, second sub-capability information corresponding to the second network device, and third sub-capability information corresponding to the first network device and the second network device.

With reference to any one of the fifteenth aspect, or the first possible implementation of the fifteenth aspect to the sixth possible implementation of the fifteenth aspect, in a seventh possible implementation of the fifteenth aspect, the processor is configured to determine, in the following manner, that the terminal device can send the assistance information of the terminal device to the first network device through the SRB3: determining, based on the capability information, that the terminal device can send the assistance information of the terminal device to the first network device through the SRB3.

For technical effects of the fifteenth aspect or the possible implementations of the fifteenth aspect, refer to the descriptions of the effects of the third aspect or the possible implementations of the third aspect.

According to a sixteenth aspect, a tenth type of communications apparatus is provided. For example, the communications apparatus is the fourth communications apparatus described above. The communications apparatus includes a processor and a transceiver. The processor and the transceiver are coupled to each other, and are configured to implement the method described in the fourth aspect or the possible designs of the fourth aspect. For example, the communications apparatus is a chip disposed in a communications device. For example, the communications device is a terminal device. For example, the transceiver is implemented by using an antenna, a feeder, and a codec that are in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The transceiver is configured to send a request message to a second network device, where the request message is used to request to set up an SRB3 used for communication between the communications apparatus and a first network device, the communications apparatus is connected to at least two network devices, the first network device is a secondary network device in the at least two network devices, and the second network device is a master network device in the at least two network devices.

The transceiver is further configured to receive a first message from the second network device.

The processor is configured to set up, based on the first message, the SRB3 used to communicate with the first network device, or configure, based on the first message, the SRB3 used to communicate with the first network device, or determine, based on the first message, that the SRB3 cannot be set up.

With reference to the sixteenth aspect, in a first possible implementation of the sixteenth aspect, the transceiver is further configured to send capability information of the communications apparatus to the second network device, where the capability information includes first sub-capability information corresponding to the first network device, the first sub-capability information is transparently transmitted to the first network device by using the second network device, the capability information further includes second sub-capability information corresponding to the second network device and third sub-capability information corresponding to the first network device and the second network device.

With reference to the sixteenth aspect or the first possible implementation of the sixteenth aspect, in a second possible implementation of the sixteenth aspect, the transceiver is further configured to: after the processor sets up, based on the first message, the SRB3 used to communicate with the first network device, receive first configuration information from the first network device or the second network device; and the processor is further configured to determine, based on the first configuration information, that the communications apparatus can send assistance information of the communications apparatus to the first network device through the SRB3, where the assistance information is used to indicate a configuration expected by the communications apparatus or service information of the communications apparatus.

With reference to the second possible implementation of the sixteenth aspect, in a third possible implementation of the sixteenth aspect, after the processor determines, based on the first configuration information, that the terminal device can send the assistance information of the terminal device to the first network device through the SRB3, the transceiver is further configured to:

send the assistance information to the first network device through the SRB3; or send the assistance information to the second network device, where the assistance information includes information corresponding to the first network device, and the information corresponding to the first network device is transparently transmitted to the first network device by using the second network device.

With reference to the third possible implementation of the sixteenth aspect, in a fourth possible implementation of the sixteenth aspect, the assistance information is information related to the first network device, or the assistance information includes the information related to the first network device and information related to the second network device.

With reference to the second possible implementation of the sixteenth aspect, in a fifth possible implementation of the sixteenth aspect, after the processor determines, based on the first configuration information, that the communications apparatus can send the assistance information of the communications apparatus to the first network device through the SRB3, the transceiver is further configured to:

send the information related to the second network device in the assistance information to the second network device; or send the information related to the first network device in the assistance information to the first network device through the SRB3; or send the information related to the second network device in the assistance information to the second network device, and send the information related to the first network device in the assistance information to the first network device through the SRB3.

With reference to any one of the second possible implementation of the sixteenth aspect to the fifth possible implementation of the sixteenth aspect, in a sixth possible implementation of the sixteenth aspect, the first configuration information further includes information about at least one parameter corresponding to the assistance information, and the information is used to indicate the communications apparatus to send a value of the at least one parameter when sending the assistance information to the first network device.

With reference to any one of the second possible implementation of the sixteenth aspect to the sixth possible implementation of the sixteenth aspect, in a seventh possible implementation of the sixteenth aspect, the first configuration information further carries first time information, used to indicate that the communications apparatus can send the assistance information to the first network device through the SRB3 within a time range corresponding to the first time information; or used to indicate the communications apparatus not to send assistance information to the first network device within the first time after sending the assistance information to the first network device.

With reference to any one of the second possible implementation of the sixteenth aspect to the seventh possible implementation of the sixteenth aspect, in an eighth possible implementation of the sixteenth aspect, the assistance information includes one or any combination of the following:

a quantity of MIMO layers of the communications apparatus;

a quantity of secondary cells corresponding to the communications apparatus;

a quantity of antenna ports of the communications apparatus;

an aggregated bandwidth of a secondary cell group corresponding to the communications apparatus;

a bandwidth of each secondary cell corresponding to the communications apparatus;

a maximum bandwidth supported by the communications apparatus;

a C-DRX configuration or parameter expected by the communications apparatus;

a BWP configuration or parameter expected by the communications apparatus;

an application type of the communications apparatus;

a size of a data packet transmitted by the communications apparatus;

a scheduling mode expected by the communications apparatus;

a search space expected by the communications apparatus;

a scheduling format expected by the communications apparatus; or a slot format expected by the communications apparatus.

With reference to the third possible implementation of the sixteenth aspect, in a ninth possible implementation of the sixteenth aspect, the transceiver is further configured to: after sending the assistance information to the first network device through the SRB3, receive adjustment information from the first network device through the SRB3, where the adjustment information is used to adjust a configuration of the communications apparatus.

With reference to the sixteenth aspect, in a tenth possible implementation of the sixteenth aspect, the first message further carries second time information. The processor is configured to determine, in the following manner based on the first message, that the SRB3 cannot be set up: The processor determines, based on the second time information carried in the first message, that the processor cannot request, within a time range corresponding to the second time information, to set up the SRB3.

For technical effects of the sixteenth aspect or the possible implementations of the sixteenth aspect, refer to the descriptions of the effects of the fourth aspect or the possible implementations of the fourth aspect.

According to a seventeenth aspect, an eleventh type of communications apparatus is provided. For example, the communications apparatus is the fifth communications apparatus described above. The communications apparatus includes a processor and a transceiver. The processor and the transceiver are coupled to each other, and are configured to implement the method described in the fifth aspect or the possible designs of the fifth aspect. For example, the communications apparatus is a chip disposed in a communications device. For example, the communications device is a network device. For example, the network device is a first network device. For example, the transceiver is implemented by using an antenna, a feeder, and a codec that are in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The transceiver is configured to send a request message to a second network device, where the request message is used to request to set up an SRB3 used for communication between the communications apparatus and a terminal device, the terminal device is connected to at least two network devices, the communications apparatus is a secondary network device in the at least two network devices, and the second network device is a master network device in the at least two network devices.

The transceiver is further configured to receive a first message from the second network device.

The processor is configured to set up, based on the first message, the SRB3 used to communicate with the terminal device, or configure, based on the first message, the SRB3 used for communication between the terminal device and the first network device, or determine, based on the first message, that the SRB3 cannot be set up.

With reference to the seventeenth aspect, in a first possible implementation of the seventeenth aspect, the transceiver is further configured to receive capability information of the terminal device from the second network device, where the capability information of the terminal device includes first sub-capability information corresponding to the first network device and third sub-capability information corresponding to the first network device and the second network device, and the second network device is the master network device in the at least two network devices.

With reference to the seventeenth aspect or the first possible implementation of the seventeenth aspect, in a second possible implementation of the seventeenth aspect, the transceiver is further configured to: after the processor sets up, based on the first message, the SRB3 used to communicate with the terminal device, send first configuration information to the terminal device, where the first configuration information is used to indicate that the terminal device can send assistance information of the terminal device to the communications apparatus through the SRB3, and the assistance information is used to indicate a configuration expected by the terminal device or service information of the terminal device.

With reference to the second possible implementation of the seventeenth aspect, in a third possible implementation of the seventeenth aspect, the transceiver is further configured to: after sending the first configuration information to the terminal device, receive the assistance information from the terminal device through the SRB3.

With reference to the third possible implementation of the seventeenth aspect, in a fourth possible implementation of the seventeenth aspect, the assistance information includes information related to the first network device.

With reference to any one of the second possible implementation of the seventeenth aspect to the fourth possible implementation of the seventeenth aspect, in a fifth possible implementation of the seventeenth aspect, the first configuration information further includes information about at least one parameter corresponding to the assistance information, and the information is used to indicate the terminal device to send a value of the at least one parameter when sending the assistance information to the communications apparatus.

With reference to any one of the second possible implementation of the seventeenth aspect to the fifth possible implementation of the seventeenth aspect, in a sixth possible implementation of the seventeenth aspect, the first configuration information further includes first time information, used to indicate that the terminal device can send the assistance information to the communications apparatus through the SRB3 within a time range corresponding to the first time information; or used to indicate the terminal device not to send assistance information to the communications apparatus within the first time after sending the assistance information to the communications apparatus.

With reference to any one of the second possible implementation of the seventeenth aspect to the sixth possible implementation of the seventeenth aspect, in a seventh possible implementation of the seventeenth aspect, the assistance information includes one or any combination of the following:

a quantity of MIMO layers of the terminal device;
a quantity of secondary cells corresponding to the terminal device;
a quantity of antenna ports of the terminal device;
an aggregated bandwidth of a secondary cell group corresponding to the terminal device;
a bandwidth of each secondary cell corresponding to the terminal device;
a maximum bandwidth supported by the terminal device;
a C-DRX configuration or parameter expected by the terminal device;
a BWP configuration or parameter expected by the terminal device;

an application type of the terminal device;
a size of a data packet transmitted by the terminal device;
a scheduling mode expected by the terminal device;
a search space expected by the terminal device;
a scheduling format expected by the terminal device; or
a slot format expected by the terminal device.

With reference to the third possible implementation of the seventeenth aspect, in an eighth possible implementation of the seventeenth aspect, the processing module is further configured to: after the transceiver module receives the assistance information from the terminal device through the SRB3, determine adjustment information based on the assistance information, where the adjustment information is used to adjust an air interface parameter of the terminal device or the service information of the terminal device; and the transceiver module is further configured to send the adjustment information to the terminal device through the SRB3.

For technical effects of the seventeenth aspect or the possible implementations of the seventeenth aspect, refer to the descriptions of the effects of the fifth aspect or the possible implementations of the fifth aspect.

According to an eighteenth aspect, a twelfth type of communications apparatus is provided. For example, the communications apparatus is the sixth communications apparatus described above. The communications apparatus includes a processor and a transceiver. The processor and the transceiver are coupled to each other, and are configured to implement the method described in the sixth aspect or the possible designs of the sixth aspect. For example, the communications apparatus is a chip disposed in a communications device. For example, the communications device is a network device. For example, the network device is a second network device. For example, the transceiver is implemented by using an antenna, a feeder, and a codec that are in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component.

The transceiver is configured to receive a request message, where the request message is used to request to set up an SRB3 used for communication between the first network device and the terminal device.

The processor is configured to determine to set up the SRB3, or configure the SRB3, or reject setup of the SRB3.

The transceiver is further configured to send a first message, where the first message is used to set up the SRB3, or used to configure the SRB3, or used to indicate to reject setup of the SRB3.

With reference to the eighteenth aspect, in a first possible implementation of the eighteenth aspect, the transceiver is further configured to receive capability information of the terminal device from the terminal device, where the capability information includes first sub-capability information corresponding to the first network device, second sub-capability information corresponding to the second network device, and third sub-capability information corresponding to the first network device and the second network device.

With reference to the first possible implementation of the eighteenth aspect, in a second possible implementation of the eighteenth aspect, the transceiver is further configured to send the first sub-capability information to the first network device.

With reference to any one of the eighteenth aspect, or the first possible implementation of the eighteenth aspect and the second possible implementation of the eighteenth aspect, in a third possible implementation of the eighteenth aspect, the first message is used to set up the SRB3 or used to configure the SRB3. The transceiver is further configured to send first configuration information to the terminal device, where the first configuration information is used to indicate that the terminal device can send the assistance information to the first network device through the SRB3, and the assistance information is used to indicate a configuration expected by the terminal device or service information of the terminal device.

With reference to the third possible implementation of the eighteenth aspect, in a fourth possible implementation of the eighteenth aspect, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

With reference to the third possible implementation of the eighteenth aspect or the fourth possible implementation of the eighteenth aspect, in a fifth possible implementation of the eighteenth aspect, the first configuration information further includes information about at least one parameter corresponding to the assistance information, and the information is used to indicate the terminal device to specifically send a value of the at least one parameter when sending the assistance information to the first network device through the SRB3.

With reference to any one of the third possible implementation of the eighteenth aspect to the fifth possible implementation of the eighteenth aspect, in a sixth possible implementation of the eighteenth aspect, the transceiver is further configured to: after sending the first configuration information to the terminal device, receive the assistance information, where the assistance information is information related to the communications apparatus, or the assistance information includes information related to the first network device and the information related to the communications apparatus.

With reference to the sixth possible implementation of the eighteenth aspect, in a seventh possible implementation of the eighteenth aspect, the assistance information includes the information related to the first network device and the information related to the communications apparatus. The transceiver is further configured to send the information related to the first network device included in the assistance information to the first network device.

With reference to any one of the eighteenth aspect, or the first possible implementation of the eighteenth aspect to the seventh possible implementation of the eighteenth aspect, in an eighth possible implementation of the eighteenth aspect, the assistance information includes one or any combination of the following:
a quantity of MIMO layers of the terminal device;
a quantity of secondary cells corresponding to the terminal device;
a quantity of antenna ports of the terminal device;

an aggregated bandwidth of a secondary cell group corresponding to the terminal device;
a bandwidth of each secondary cell corresponding to the terminal device;
a maximum bandwidth supported by the terminal device;
a C-DRX configuration or parameter expected by the terminal device;
a BWP configuration or parameter expected by the terminal device;
an application type of the terminal device;
a size of a data packet transmitted by the terminal device;
a scheduling mode expected by the terminal device;
a search space expected by the terminal device;
a scheduling format expected by the terminal device; or
a slot format expected by the terminal device.

For technical effects of the eighteenth aspect or the possible implementations of the eighteenth aspect, refer to the descriptions of the effects of the sixth aspect or the possible implementations of the sixth aspect.

According to a nineteenth aspect, a thirteenth type of communications apparatus is provided. The communications apparatus may be the first communications apparatus in the foregoing method designs. For example, the communications apparatus is a chip disposed in a terminal device. The communications apparatus includes: a memory, configured to store computer-executable program code; and a processor, where the processor is coupled to the memory. The program code stored in the memory includes instructions. When the processor executes the instructions, the thirteenth type of communications apparatus is enabled to perform the method in any one of the first aspect or the possible implementations of the first aspect.

The thirteenth type of communications apparatus may further include a communications interface. The communications interface may be a transceiver in the terminal device, for example, implemented by using an antenna, a feeder, and a codec that are in the communications apparatus. Alternatively, if the thirteenth type of communications apparatus is the chip disposed in the terminal device, the communications interface may be an input/output interface in the chip, for example, an input/output pin.

According to a twentieth aspect, a fourteenth type of communications apparatus is provided. The communications apparatus may be the second communications apparatus in the foregoing method designs. For example, the communications apparatus is a chip disposed in a network device. For example, the network device is a first network device. The communications apparatus includes: a memory, configured to store computer-executable program code; and a processor, where the processor is coupled to the memory. The program code stored in the memory includes instructions. When the processor executes the instructions, the fourteenth type of communications apparatus is enabled to perform the method in any one of the second aspect or the possible implementations of the second aspect.

The fourteenth type of communications apparatus may further include a communications interface. The communications interface may be a transceiver in the first network device, for example, implemented by using an antenna, a feeder, and a codec that are in the communications apparatus. Alternatively, if the fourteenth type of communications apparatus is a chip disposed in the first network device, the communications interface may be an input/output interface in the chip, for example, an input/output pin.

According to a twenty-first aspect, a fifteenth type of communications apparatus is provided. The communications apparatus may be the third communications apparatus in the foregoing method designs. For example, the communications apparatus is a chip disposed in a network device. For example, the network device is a second network device. The communications apparatus includes: a memory, configured to store computer-executable program code; and a processor, where the processor is coupled to the memory. The program code stored in the memory includes instructions. When the processor executes the instructions, the fifteenth type of communications apparatus is enabled to perform the method in any one of the third aspect or the possible implementations of the third aspect.

The fifteenth type of communications apparatus may further include a communications interface. The communications interface may be a transceiver in the second network device, for example, implemented by using an antenna, a feeder, and a codec that are in the communications apparatus. Alternatively, if the fifteenth type of communications apparatus is a chip disposed in the second network device, the communications interface may be an input/output interface in the chip, for example, an input/output pin.

According to a twenty-second aspect, a sixteenth type of communications apparatus is provided. The communications apparatus may be the fourth communications apparatus in the foregoing method designs. For example, the communications apparatus is a chip disposed in a terminal device. The communications apparatus includes: a memory, configured to store computer-executable program code; and a processor, where the processor is coupled to the memory. The program code stored in the memory includes instructions. When the processor executes the instructions, the sixteenth type of communications apparatus is enabled to perform the method in any one of the fourth aspect or the possible implementations of the fourth aspect.

The sixteenth type of communications apparatus may further include a communications interface. The communications interface may be a transceiver in the terminal device, for example, implemented by using an antenna, a feeder, and a codec that are in the communications apparatus. Alternatively, if the sixteenth type of communications apparatus is the chip disposed in the terminal device, the communications interface may be an input/output interface in the chip, for example, an input/output pin.

According to a twenty-third aspect, a seventeenth type of communications apparatus is provided. The communications apparatus may be the fifth communications apparatus in the foregoing method designs. For example, the communications apparatus is a chip disposed in a network device. For example, the network device is a first network device. The communications apparatus includes: a memory, configured to store computer-executable program code; and a processor, where the processor is coupled to the memory. The program code stored in the memory includes instructions. When the processor executes the instructions, the seventeenth type of communications apparatus is enabled to perform the method in any one of the fifth aspect or the possible implementations of the fifth aspect.

The seventeenth type of communications apparatus may further include a communications interface. The communications interface may be a transceiver in the first network device, for example, implemented by using an antenna, a feeder, and a codec that are in the communications apparatus. Alternatively, if the seventeenth type of communications apparatus is a chip disposed in the first network device, the communications interface may be an input/output interface in the chip, for example, an input/output pin.

According to a twenty-fourth aspect, an eighteenth type of communications apparatus is provided. The communications apparatus may be the sixth communications apparatus in the foregoing method designs. For example, the communications apparatus is a chip disposed in a network device. For example, the network device is a second network device. The communications apparatus includes: a memory, configured to store computer-executable program code; and a processor, where the processor is coupled to the memory. The program code stored in the memory includes instructions. When the processor executes the instructions, the eighteenth type of communications apparatus is enabled to perform the method in any one of the sixth aspect or the possible implementations of the sixth aspect.

The eighteenth type of communications apparatus may further include a communications interface. The communications interface may be a transceiver in the second network device, for example, implemented by using an antenna, a feeder, and a codec that are in the communications apparatus. Alternatively, if the eighteenth type of communications apparatus is a chip disposed in the second network device, the communications interface may be an input/output interface in the chip, for example, an input/output pin.

According to a twenty-fifth aspect, a first communications system is provided. The communications system may include the first type of communications apparatus according to the seventh aspect, the seventh type of communications apparatus according to the thirteenth aspect, or the thirteenth type of communications apparatus according to the nineteenth aspect, include the second type of communications apparatus according to the eighth aspect, the eighth type of communications apparatus according to the fourteenth aspect, or the fourteenth type of communications apparatus according to the twentieth aspect, and include the third type of communications apparatus according to the ninth aspect, the ninth type of communications apparatus according to the fifteenth aspect, or the fifteenth type of communications apparatus according to the twenty-first aspect.

According to a twenty-sixth aspect, a second communications system is provided. The communications system may include the fourth type of communications apparatus according to the tenth aspect, the tenth type of communications apparatus according to the sixteenth aspect, or the sixteenth type of communications apparatus according to the twenty-first aspect, include the fifth type of communications apparatus according to the eleventh aspect, the eleventh type of communications apparatus according to the seventeenth aspect, or the seventeenth type of communications apparatus according to the twenty-second aspect, and include the sixth type of communications apparatus according to the twelfth aspect, the twelfth type of communications apparatus according to the eighteenth aspect, or the eighteenth type of communications apparatus according to the twenty-fourth aspect.

The first communications system and the second communications system may be a same communications system, or may be different communications systems.

According to a twenty-seventh aspect, a computer storage medium is provided. The computer-readable storage medium stores instructions. When the instructions are run on a computer, the computer is enabled to perform the method in any one of the first aspect or the possible designs of the first aspect.

According to a twenty-eighth aspect, a computer storage medium is provided. The computer-readable storage medium stores instructions. When the instructions are run on a computer, the computer is enabled to perform the method in any one of the second aspect or the possible designs of the second aspect.

According to a twenty-ninth aspect, a computer storage medium is provided. The computer-readable storage medium stores instructions. When the instructions are run on a computer, the computer is enabled to perform the method in any one of the third aspect or the possible designs of the third aspect.

According to a thirtieth aspect, a computer storage medium is provided. The computer-readable storage medium stores instructions. When the instructions are run on a computer, the computer is enabled to perform the method in any one of the fourth aspect or the possible designs of the fourth aspect.

According to a thirty-first aspect, a computer storage medium is provided. The computer-readable storage medium stores instructions. When the instructions are run on a computer, the computer is enabled to perform the method in any one of the fifth aspect or the possible designs of the fifth aspect.

According to a thirty-second aspect, a computer storage medium is provided. The computer-readable storage medium stores instructions. When the instructions are run on a computer, the computer is enabled to perform the method in any one of the sixth aspect or the possible designs of the sixth aspect.

According to a thirty-third aspect, a computer program product including instructions is provided. The computer program product stores the instructions. When the computer program product runs on a computer, the computer is enabled to perform the method in any one of the first aspect or the possible designs of the first aspect.

According to a thirty-fourth aspect, a computer program product including instructions is provided. The computer program product stores the instructions. When the computer program product runs on a computer, the computer is enabled to perform the method in any one of the second aspect or the possible designs of the second aspect.

According to a thirty-fifth aspect, a computer program product including instructions is provided. The computer program product stores the instructions. When the computer program product runs on a computer, the computer is enabled to perform the method in any one of the third aspect or the possible designs of the third aspect.

According to a thirty-sixth aspect, a computer program product including instructions is provided. The computer program product stores the instructions. When the computer program product runs on a computer, the computer is enabled to perform the method in any one of the fourth aspect or the possible designs of the fourth aspect.

According to a thirty-seventh aspect, a computer program product including instructions is provided. The computer program product stores the instructions. When the computer program product runs on a computer, the computer is enabled to perform the method in any one of the fifth aspect or the possible designs of the fifth aspect.

According to a thirty-eighth aspect, a computer program product including instructions is provided. The computer program product stores the instructions. When the computer program product runs on a computer, the computer is enabled to perform the method in any one of the sixth aspect or the possible designs of the sixth aspect.

In the embodiments of this application, the terminal device can send, through the SRB3, the assistance information of the terminal device to the first network device serving as the secondary network device, and the secondary network device can also obtain the assistance information of the terminal device, so that the secondary network device can perform corresponding configuration on the terminal device, and the terminal device does not need to release a connection between the terminal device and the secondary network device. This helps improve transmission performance of the terminal device.

DETAILED DESCRIPTION OF ILLUSTRATIVE EMBODIMENTS

Figure 1A:
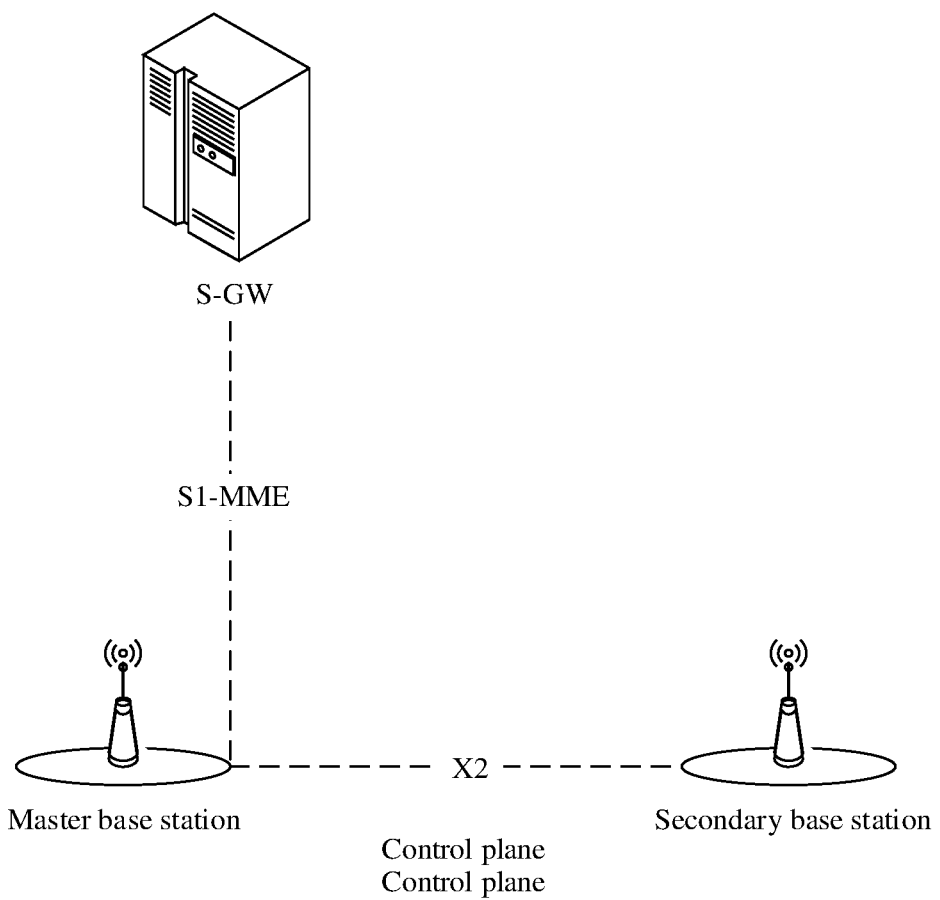
FIG. 1A is a schematic diagram of a control plane in a 3X architecture.

To make the objectives, the technical solutions, and advantages of the embodiments of this application clearer, the following further describes the embodiments of this application in detail with reference to the accompanying drawings.

In the following descriptions, some terms in the embodiments of this application are described, to help a person skilled in the art have a better understanding.

(1) A terminal device includes a device that provides a user with voice and/or data connectivity, for example, may include a handheld device having a wireless connection function, or a processing device connected to a wireless modem. The terminal device may communicate with a core network through a radio access network (radio access network, RAN), and exchange a voice and/or data with the RAN. The terminal device may include user equipment (user equipment, UE), a wireless terminal device, a mobile terminal device, a device-to-device (device-to-device, D2D) communication terminal device, a vehicle-to-everything (vehicle to everything, V2X) terminal device, a machine-to-machine/machine-type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus, or the like. For example, the terminal device is a device such as a personal communications service (personal communication service, PCS) phone, a cordless phone, a session initiation protocol (session initiation protocol, SIP) phone, a wireless local loop (wireless local loop, WLL) station, or a personal digital assistant (personal digital assistant, PDA). The terminal device further includes a limited device, for example, a device with low power consumption, a device with a limited storage capability, or a device with a limited computing capability. For example, the terminal device includes an information sensing device, for example, a barcode, radio frequency identification (radio frequency identification, RFID), a sensor, a global positioning system (global positioning system, GPS), or a laser scanner.

By way of example, and not limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn on a body or integrated into clothes or an accessory of a user. The wearable device is not only a hardware device, but implements powerful functions through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application functions and need to work with other devices such as smartphones.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (on-board unit, OBU).

(2) A network device includes, for example, an access network (access network, AN) device such as a base station (for example, an access point), and may be a device that communicates with a wireless terminal device over an air interface through one or more cells in an access network. Alternatively, for example, a network device in a V2X technology is a road side unit (road side unit, RSU). The base station may be configured to mutually convert a received over-the-air frame and a received Internet protocol (IP) packet, and serve as a router between the terminal device and other parts of the access network, where the other parts of the access network may include an IP network. An RSU may be a fixed infrastructure entity that supports a vehicle-to-everything (vehicle-to-everything, V2X) application, and may exchange a message with another entity that supports the V2X application. The access network device may further coordinate attribute management of an air interface. For example, the access network device may include an evolved NodeB (NodeB, eNB, or e-NodeB, evolutional NodeB) in an LTE system or a long term evolution-advanced (long term evolution-advanced, LTE-A) system, or may include a next generation NodeB (next generation node B, gNB) in a 5G NR system, or may include a centralized unit (centralized unit, CU) and a distributed unit (distributed unit, DU) in a cloud access network (cloud radio access network, Cloud RAN) system. This is not limited in the embodiments of this application.

Certainly, the network device may further include a core network device. However, the technical solutions provided in the embodiments of this application mainly relate to an access network device. Therefore, unless otherwise specified, "network device" described below is an access network device.

(3) Multi-radio dual connectivity (multi-radio dual connectivity, MR-DC)

In an LTE system, a terminal device can simultaneously access two network devices. This access manner is referred to as DC, where one network device is a master network device, and the other network device is a secondary network device. In a development and evolution process of a wireless communications system, an operator deploys both a 5G NR system and an LTE system, and a terminal device supports simultaneous access to an LTE network device and an NR network device. Because LTE is also referred to as evolved universal terrestrial radio access (evolved universal terrestrial radio access, E-UTRA), this access manner is referred to as EN-DC. In the EN-DC mode, an LTE network device is a master network device, and an NR network device is a secondary network device. Certainly, with evolution of a system, dual connectivity of new radio and evolved universal terrestrial radio access (NR E-UTRA dual connectivity, NE-DC) can also be supported in the future, that is, the NR network device is a master network device, and the LTE network device is a secondary network device. Two network devices in the NR system may form NR-NR DC. In other words, both the master network device and the secondary network device are NR network devices. The following DC modes are collectively called MR-DC: EN-DC (including EN-DC for connecting to a 4G core network and EN-DC for connecting to a 5G core network), NE-DC, and NR-NR DC.

(4) A capability of the terminal device may also be understood as an access capability of the terminal device, and may be reflected by using capability information of the terminal device. If the terminal device is implemented by using UE, the capability information of the terminal device may also be referred to as UE capability information, or may be referred to as a UE access capability (access capability). The capability information of the terminal device includes, for example, a packet data convergence protocol (packet data convergence protocol, PDCP) parameter, a physical-layer parameter, a radio frequency parameter, and a measurement parameter. A radio frequency capability may include a band combination (band combination) supported by the terminal device and a modulation scheme supported by the terminal device on a carrier of the band combination, a multiple-input multiple-output (multiple-input multiple-output, MIMO) capability, a bandwidth, a subcarrier spacing (SCS), and the like. The band combination is frequency bands on which the terminal device can simultaneously work and a carrier combination on the frequency bands. Certainly, the foregoing capability parameters or the foregoing pieces of capability information are examples. The capability information of the terminal device may include one or more of the foregoing capability parameters and one or more pieces of the foregoing capability information. Specific complete capability information is not described herein in this embodiment of this application.

In addition, the capability information sent by the terminal device to the network device may include capability information of a plurality of radio access technologies of the terminal device. If the terminal device supports a radio access technology, the terminal device has capability information corresponding to the radio access technology. The capability information is capability information of the radio access technology of the terminal device. Alternatively, capability information of a radio access technology of the terminal device is understood as capability information possessed by the terminal device when the terminal device works in a radio access technology. Alternatively, capability information of a radio access technology of the terminal device may be described as capability information of the terminal device in a radio access technology. The radio access technology includes, for example, at least one of NR, LTE, LTE-NR, a universal mobile telecommunications system terrestrial radio access (UMTS terrestrial radio access, UTRA) technology, an enhanced data rates for GSM evolution radio access network (GSM EDGE radio access network, GERAN) technology, and code division multiple access (code division multiple access, CDMA) 2000-1× RTT, and may further include another radio access technology. An LTE-NR capability includes a capability supported on the LTE side and a capability supported on the NR side when the terminal device works by using the LTE technology and the NR technology at the same time.

(5) "At least one" means one or more, and "a plurality of" means two or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one item (piece) of the following" or a similar expression thereof means any combination of these items, including a singular item (piece) or any combination of plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance degrees of the plurality of objects. For example, first information and second information are merely intended to distinguish between different signaling, but do not indicate a difference of the two types of information in content, priority, sending sequence, importance, or the like.

The foregoing describes some concepts in the embodiments of this application. The following describes technical features in the embodiments of this application.

Figure 1B:
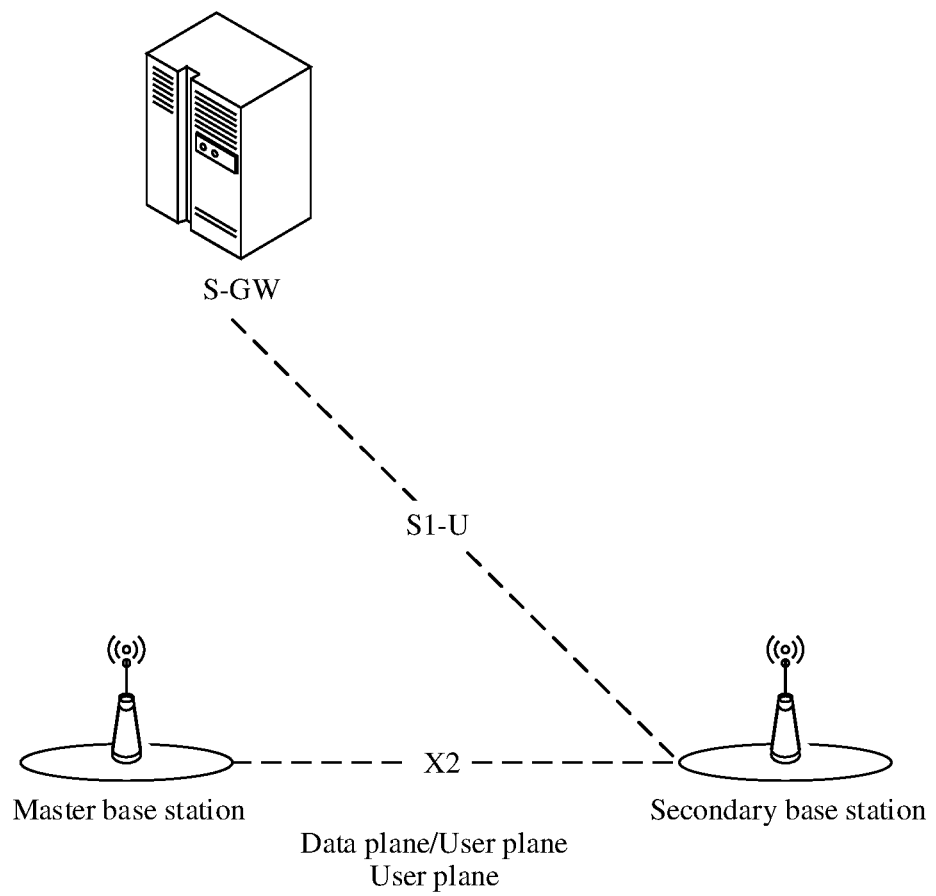
FIG. 1B is a schematic diagram of a data plane/user plane in a 3X architecture.

Currently, the LTE system provides good coverage. In a network upgrade and deployment process of an operator, a non-standalone (non-standalone, NSA) deployment manner may be used in an early stage. To be specific, some NR base stations are deployed, and a 3X architecture is used, so that the NR base station can provide a hotspot service on a data plane. In the 3X architecture, a connected core network is an evolved packet core (evolved packet core, EPC) network. FIG. 1A and FIG. 1B are schematic diagrams of the 3X architecture.

FIG. 1A shows a control plane structure in the 3X architecture. A mobility management entity (mobility management entity, MME) is a control unit in the core network. The MME transfers control signaling between the MME and a master node (master node, MN) through an S1-MME interface. For ease of understanding, the master node may be understood as a master base station. The master base station is a master eNB (master eNB, MeNB). Then, the MeNB transfers control signaling between the MeNB and a gNB serving as a secondary node (secondary node, SN) through an X2 interface. Likewise, for ease of understanding, the secondary node may be understood as a secondary base station.

FIG. 1B shows a data plane structure in the 3X architecture. A serving gateway (serving gateway, S-GW) is a gateway unit in the core network. Compared with an eNB, a gNB has a relatively powerful air interface capability. Therefore, on the data plane, the S-GW is directly connected to the gNB by using an S1-U interface, to send data to the gNB. The gNB is connected to the MeNB by using an X2 interface, so that the gNB can transmit data received from the S-GW to the MeNB.

In the NR system, dual connectivity between an NR base station and an NR base station is currently agreed to provide better coverage and a larger throughput for a terminal device. Such a dual-connectivity structure may be referred to as NR-NR DC. For both EN-DC and NR-NR DC, the control plane is under the master base station, and the secondary base station mainly works on the data plane. However, the master base station may configure an SRB3 for the secondary base station, so that the secondary base station may perform some corresponding configuration on the terminal device through the SRB3. Currently, the secondary base station may usually use the SRB3 to perform measurement configuration, media access control (media access control, MAC) layer configuration, radio link control (radio link control, RLC) layer configuration, physical (PHY) layer configuration, radio link failure (radio link failure, RLF) timer configuration, secondary cell group (secondary cell group, SCG) configuration, and the like for the terminal device. The RLF timer configuration means that if the terminal device considers that a radio link between the terminal device and the secondary base station fails (for example, the terminal device does not receive a data packet from the secondary base station when the timer expires), the terminal device may send failure information. Similarly, the terminal device may also send failure information (failure information), a measurement report, a radio resource control (radio resource control, RRC) reconfiguration complete message, or the like to the secondary base station through the SRB3. For example, if the terminal device fails in integrity verification for a data packet from the secondary base station, the terminal device may send failure information to the secondary base station through the SRB3.

Figure 2A:
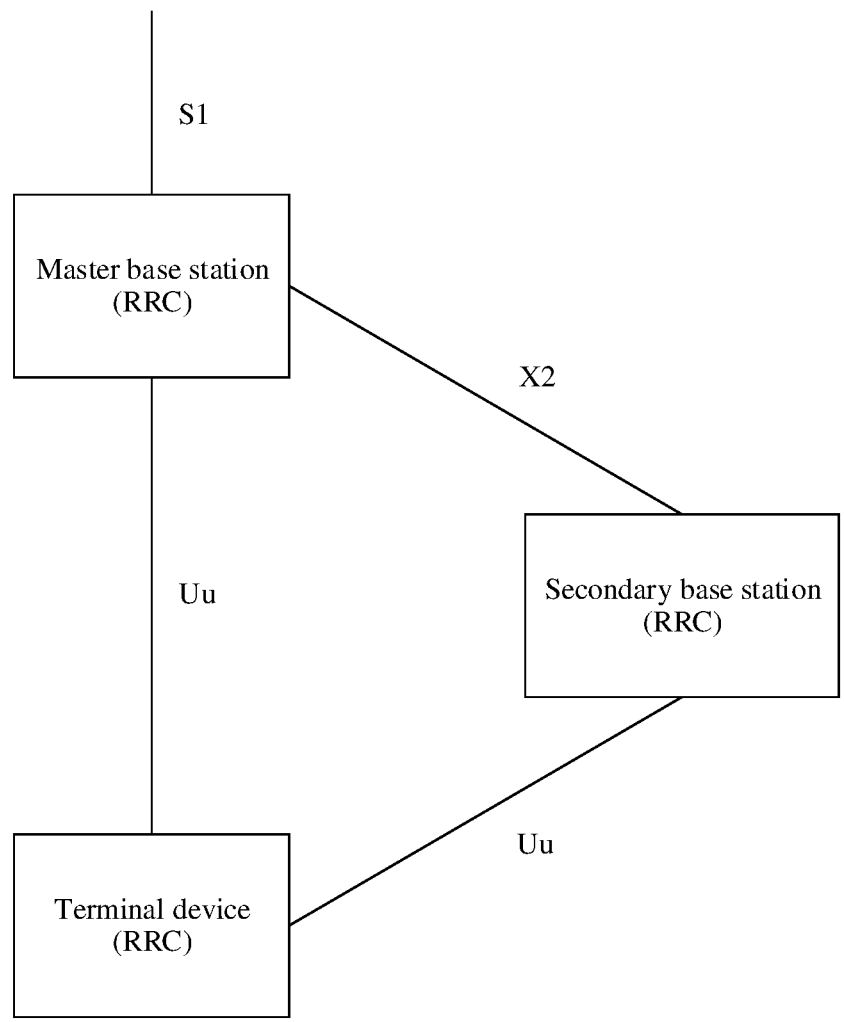
FIG. 2A is a schematic diagram in which, in an EN-DC architecture, a secondary base station can also send RRC signaling to a terminal device.

For example, refer to FIG. 2A. In an EN-DC architecture, an LTE eNB serving as a master base station may send an RRC message to a terminal device through a Uu interface. The master base station may interact with an NR gNB used as a secondary base station by using an X2 interface. For example, the master base station may set up an SRB3 for the secondary base station. In this way, the secondary base station can send an RRC message to the terminal device through a Uu interface. An interface between the master base station and a core network device is an S1 interface.

Figure 2B:
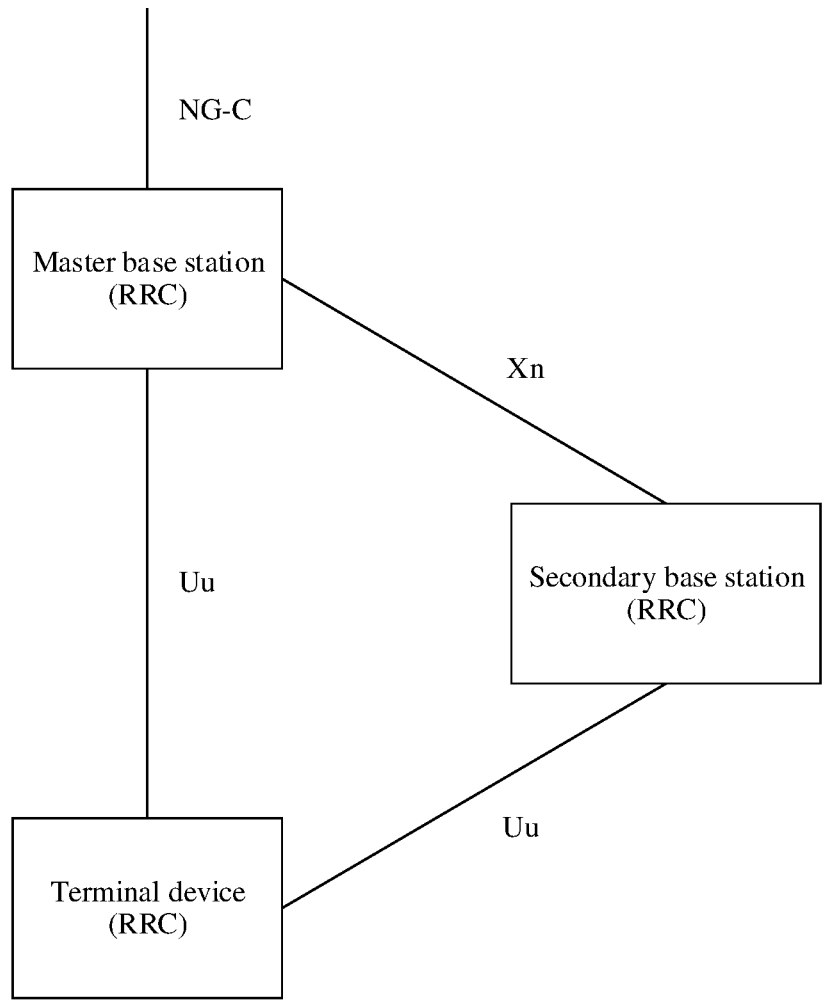
FIG. 2B is a schematic diagram in which, in an NR-NR DC architecture, a secondary base station can also send RRC signaling to a terminal device.

Refer to FIG. 2B. In an NR-NR DC architecture, an NR gNB serving as a master base station may send an RRC message to a terminal device through a Uu interface. The master base station may interact with another NR gNB used as a secondary base station by using an X2 interface. For example, the master base station may set up an SRB3 for the secondary base station. In this way, the secondary base station can send an RRC message to the terminal device through a Uu interface. An interface between the master base station and a core network device is an NG-C interface.

In the EN-DC architecture, the LTE eNB serving as the master base station may deliver a configuration to the terminal device by using an SRB1. For example, the LTE eNB configures the terminal device to report assistance information of the terminal device, to help the LTE eNB learn of a status of the terminal device based on the assistance information of the terminal device, thereby better scheduling the terminal device. The assistance information of the terminal device includes, for example, overheating information of the terminal device. The overheating information includes, for example, a quantity of uplink and downlink secondary cells of the terminal device that the terminal device tends to reduce, or an uplink and downlink capability set preferred by the terminal device. The terminal device sends the assistance information to the LTE eNB, so that the LTE eNB can indicate the terminal device to release some resources when an overheating problem occurs on the terminal device.

Currently, in the EN-DC architecture, the terminal device can send the assistance information of the terminal device to only the LTE eNB serving as the master base station, and the LTE eNB may make a decision after receiving the assistance information of the terminal device. For example, if the terminal device sends the overheating information to the LTE eNB, a decision that may be made by the LTE eNB is to indicate the terminal device to release a connection between the terminal device and an NR gNB used as a secondary base station, so that the terminal device changes to work in a single-connection structure. After working in the single-connection structure, the terminal device can receive data from only the LTE eNB, and cannot receive data from the NR gNB. This affects a throughput of the terminal device. In addition, it can be learned from the foregoing description that, in the 3X architecture, the NR gNB directly receives data from the core network. The NR gNB has a relatively large amount of data, and a relatively strong air interface capability. If there is a connection between the terminal device and the NR gNB, the terminal device may receive a large amount of data from the NR gNB. However, if the terminal device releases the NR gNB, the terminal device can receive only data from the LTE eNB. In this case, it is clear that transmission performance of the terminal device deteriorates significantly.

However, because the NR-NR DC architecture is a new architecture, how the terminal device sends assistance information to the network device has not been discussed.

In view of this, the technical solutions in the embodiments of this application are provided. In the embodiments of this application, the terminal device can send, through the SRB3, the assistance information of the terminal device to a first network device serving as a secondary network device. For example, the assistance information may include the overheating information of the terminal device. In this case, the secondary network device can also obtain the overheating information of the terminal device, so that the secondary network device can perform corresponding configuration on the terminal device, and the terminal device does not need to release a connection between the terminal device and the secondary network device. This helps improve transmission performance of the terminal device.

Figure 3:
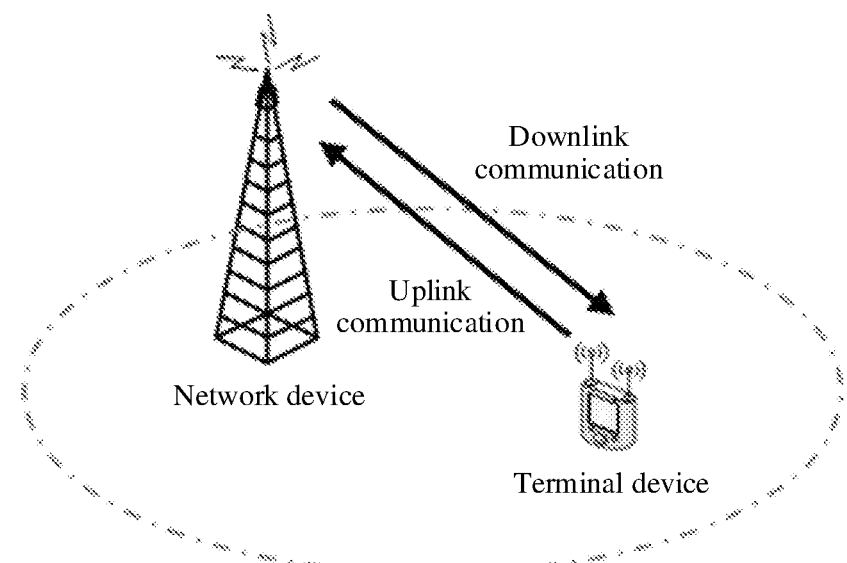
FIG. 3 to FIG. 6B are schematic diagrams of several application scenarios according to an embodiment of this application.
Figure 4A:
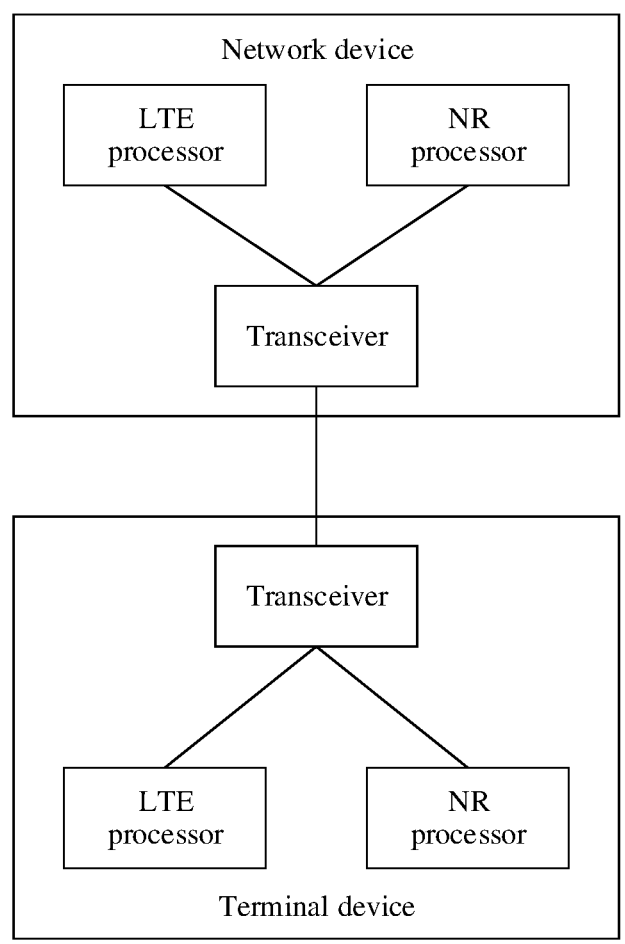
Figure 4B:
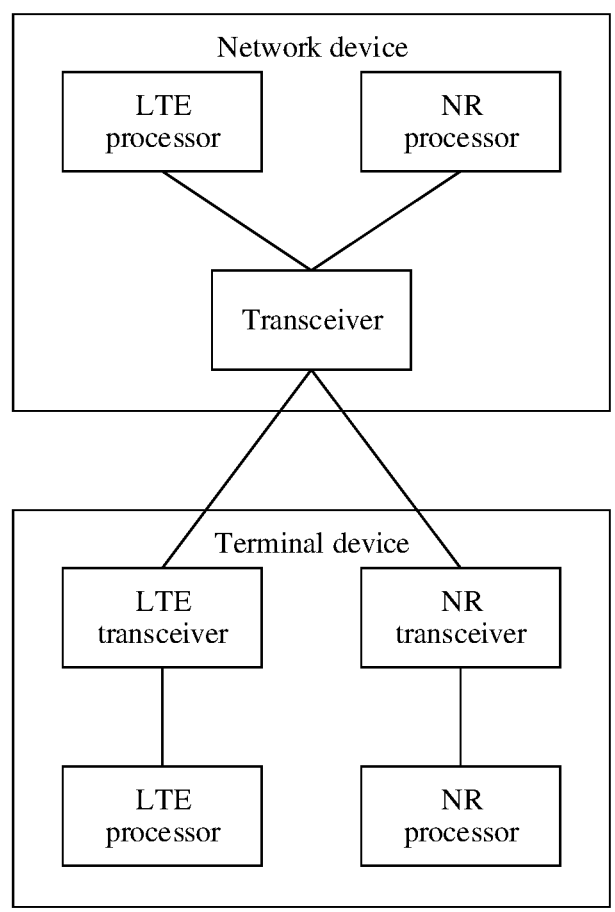
Figure 5:
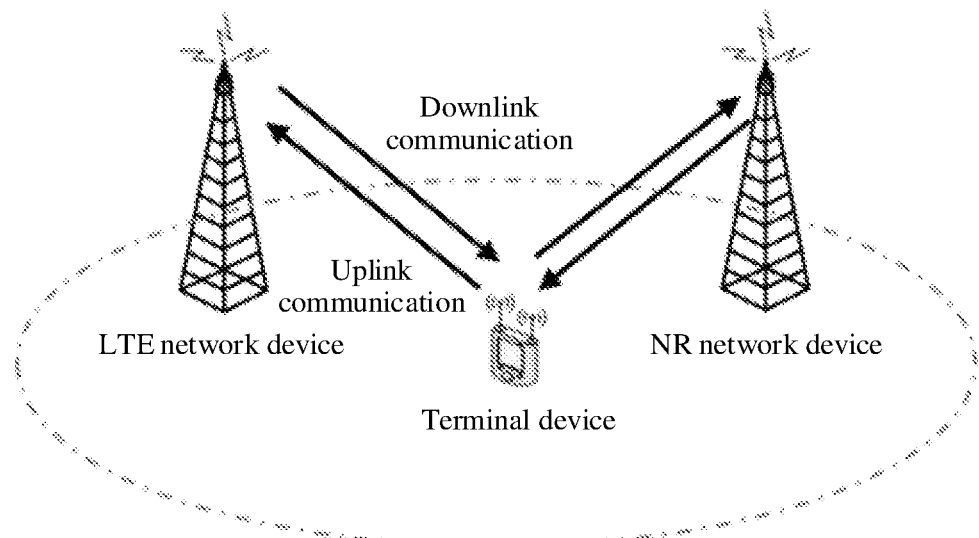
Figure 6A:
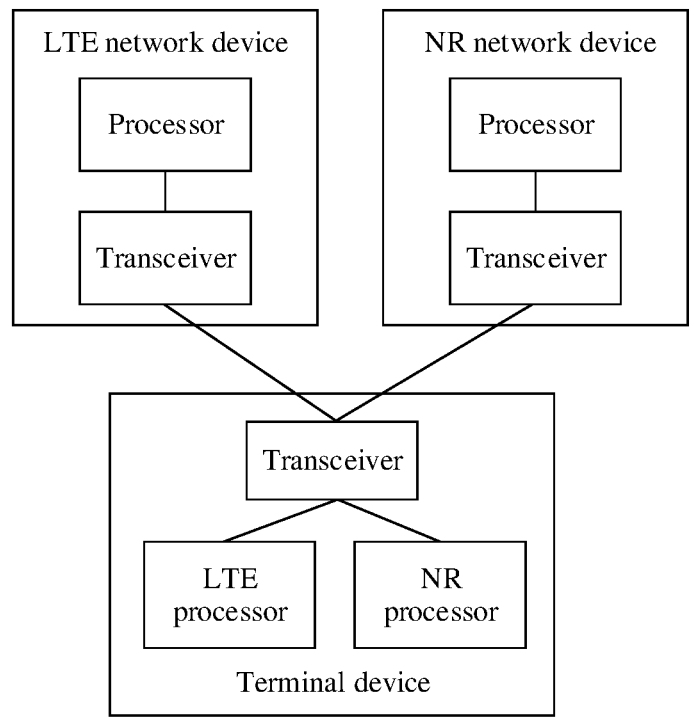
Figure 6B:
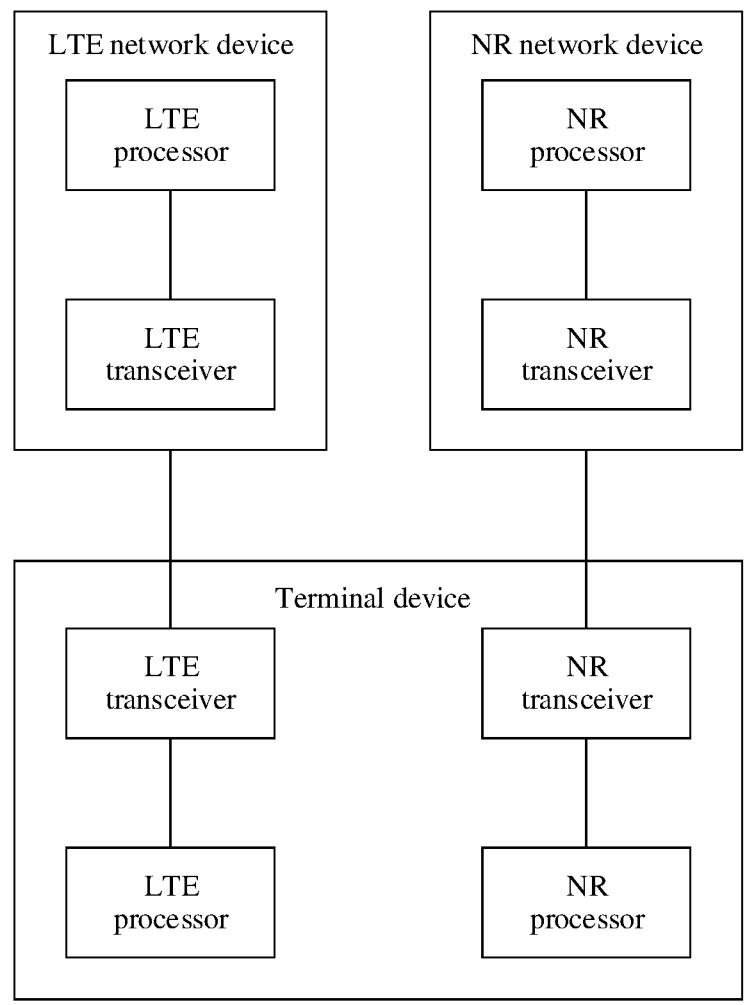

A scenario to which the embodiments of this application are applied is that the terminal device works in a dual-connectivity mode, for example, the EN-DC mode or the NR-NR DC mode. The terminal device accesses both the master network device and the secondary network device that are in the dual-connectivity mode. It should be noted that the master network device and the secondary network device may be deployed at a same site, as shown in FIG. 3, FIG. 4A, and FIG. 4B. FIG. 4A and FIG. 4B are schematic diagrams of hardware structures of a network device and a terminal device. A difference lies between FIG. 4A and FIG. 4B in whether the terminal device uses one transceiver or different transceivers for LTE and NR. Alternatively, the master network device and the secondary network device may be deployed at different sites, as shown in FIG. 5, FIG. 6A, and FIG. 6B. FIG. 5 is a schematic diagram of hardware structures of a network device and a terminal device. In addition, when the master network device and the secondary network device are deployed at a same site, the master network device and the secondary network device may share a same set of hardware devices. FIG. 4A or FIG. 4B is a schematic diagram in which the master network device and the secondary network device share some hardware devices. The master network device and the secondary network device may share a transceiver, as shown in FIG. 4A or FIG. 4B. Alternatively, when the master network device and the secondary network device are deployed at a same site, the master network device and the secondary network device may use different hardware devices.

The following describes the technical solutions provided in the embodiments of this application with reference to the accompanying drawings.

Figure 7:
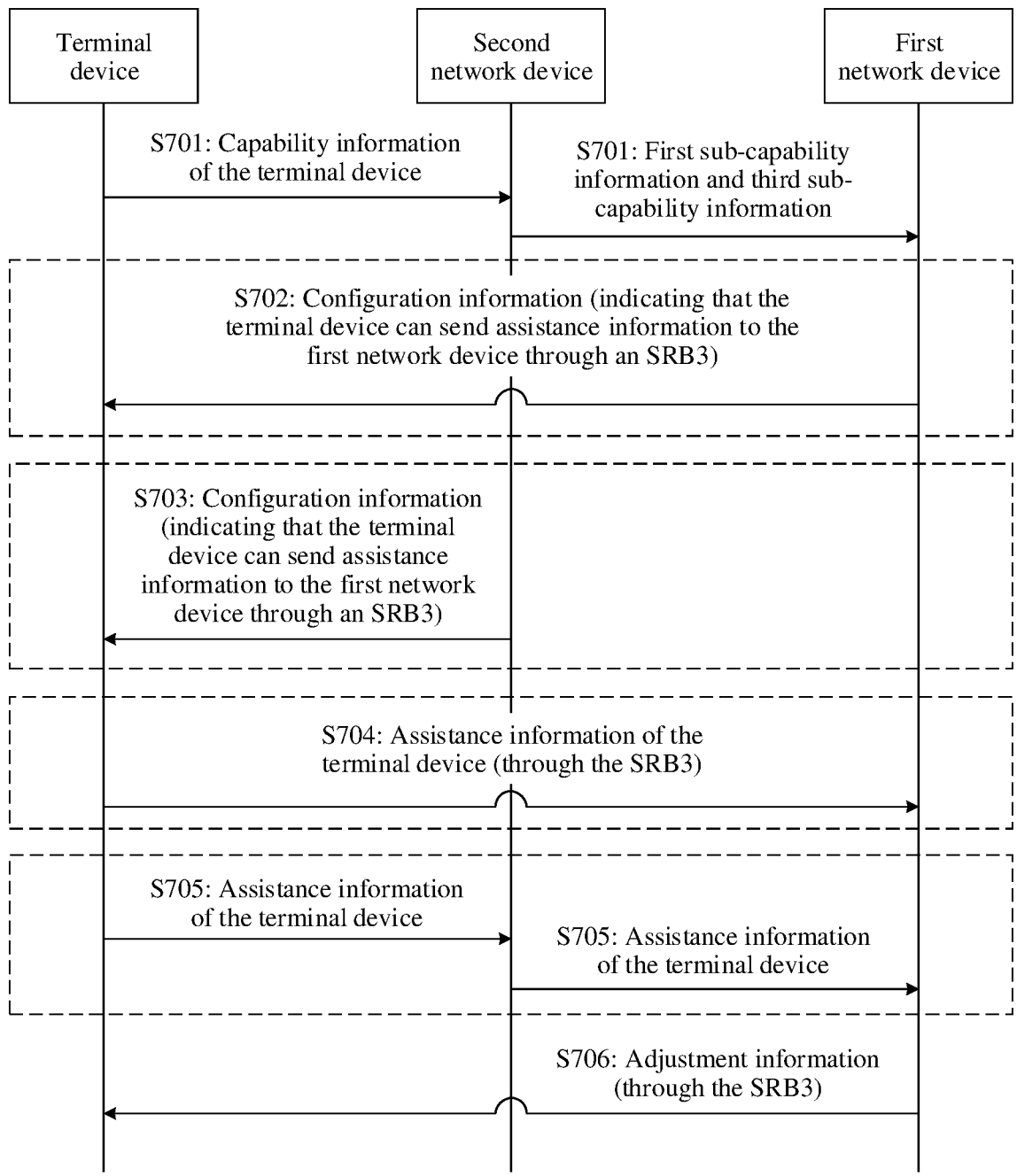
FIG. 7 is a flowchart of a first type of communications method according to an embodiment of this application.

An embodiment of this application provides a communications method. FIG. 7 is a flowchart of the method. In the following description process, an example in which the method is applied to the network architecture shown in any one of FIG. 3, FIG. 4A, FIG. 4B, FIG. 5, FIG. 6A, or FIG. 6B is used. In addition, the method may be performed by three communications apparatuses. The three communications apparatuses are, for example, a first communications apparatus, a second communications apparatus, and a third communications apparatus. The first communications apparatus may be a network device or a communications apparatus that can support a function required by the network device to implement the method. Alternatively, the first communications apparatus may be a terminal device or a communications apparatus that can support a function required by the terminal device to implement the method. Certainly, the first communications apparatus may be another communications apparatus, for example, a chip system. The second communications apparatus may be a network device or a communications apparatus that can support a function required by the network device to implement the method, or may be a terminal device or a communications apparatus that can support a function required by the terminal device to implement the method. Certainly, the second communications apparatus may alternatively be another communications apparatus, for example, a chip system. Similarly, the third communications apparatus may be a network device or a communications apparatus that can support a function required by the network device to implement the method, or may be a terminal device or a communications apparatus that can support a function required by the terminal device to implement the method. Certainly, the third communications apparatus may alternatively be another communications apparatus, for example, a chip system. In addition, implementations of the first communications apparatus, the second communications apparatus, and the third communications apparatus are not limited. For example, the first communications apparatus may be a network device, the second communications apparatus is a network device, and the third communications apparatus is a terminal device. Alternatively, the first communications apparatus, the second communications apparatus, and the third communications apparatus are all network devices. Alternatively, the first communications apparatus, the second communications apparatus, and the third communications apparatus are all terminal devices. Alternatively, the first communications apparatus is a network device, the second communications apparatus is a network device, and the third communications apparatus is a chip system that can support a function required by a terminal device to implement the method. For example, the network device is a base station.

For ease of description, the following uses an example in which the method is performed by network devices and a terminal device. In other words, the first communications apparatus is a network device (also referred to as a first network device in the following), the second communications apparatus is a network device (also referred to as a second network device in the following), and the third communications apparatus is a terminal device. In this embodiment, that the network architecture shown in any one of FIG. 3, FIG. 4A, FIG. 4B, FIG. 5, FIG. 6A, or FIG. 6B is applied is used as an example. Therefore, the terminal device described below may be the terminal device in the network architecture shown in any one of FIG. 3, FIG. 4A, FIG. 4B, FIG. 5, FIG. 6A, or FIG. 6B. In addition, the first network device described below may be the secondary network device in the network architecture shown in any one of FIG. 3, FIG. 4A, FIG. 4B, FIG. 5, FIG. 6A, or FIG. 6B, and the second network device described below may be the master network device in the network architecture shown in any one of FIG. 3, FIG. 4A, FIG. 4B, FIG. 5, FIG. 6A, or FIG. 6B. In addition, if the EN-DC architecture is used, the master network device is an LTE network device, and the secondary network device is an NR network device; or if the NR-NR DC architecture is used, both the master network device and the secondary network device are NR network devices.

S701: The terminal device sends capability information of the terminal device to the second network device, and the second network device receives the capability information of the terminal device from the terminal device.

The capability information of the terminal device may include first sub-capability information corresponding to the first network device, second sub-capability information corresponding to the second network device, and third sub-capability information corresponding to the first network device and the second network device. In an example of the EN-DC architecture, the first sub-capability information is NR capability information of the terminal device, the second sub-capability information is LTE capability information of the terminal device, and the third sub-capability information is EN-DC capability information of the terminal device. The EN-DC capability information of the terminal device may be a combination of capability information of the terminal device in EN-DC. The combination of capability information herein is used to express a combination of capabilities supported by the terminal device when the terminal device works in radio access technologies corresponding to the two network devices at the same time. For example, if the terminal device supports a frequency band combination 1 in a radio access technology corresponding to the first network device, and supports a frequency band combination 2 in a radio access technology corresponding to the second network device, a combination of capability information included in first capability information may be the frequency band combination 1 and the frequency band combination 2.

Compared with the LTE network device, the NR network device can support some new capabilities or features such as power saving (power saving). A version of the terminal device is also continuously evolving. For example, a terminal device of release (Rel) 16 can also support these new features. These features can take effect only when the terminal device cooperates with the NR network device. For example, an NR network may configure related information reporting for the new feature for the terminal device, and the terminal device may send related information of the new feature to the NR network device, so that the NR network device helps the terminal device save power. Information about these new features also belongs to assistance information of the terminal device. In the EN-DC architecture, the terminal device can send the assistance information to only the master network device, but cannot send the assistance information to the secondary network device. However, the master network device is the LTE network device, and because an LTE system does not support these new features, the LTE system does not provide a message used by the terminal device to send these new features to the LTE network device. Therefore, the terminal device cannot send the information about these new features to the LTE network device. Therefore, in the EN-DC architecture, the terminal device cannot send, to any network device connected to the terminal device, the information about new features of the terminal device. Consequently, the terminal device cannot use these new features. In the embodiments of this application, a new feature may also be referred to as a new capability.

In view of this, in this embodiment of this application, the terminal device may send the capability information of the terminal device to the second network device, and the capability information of the terminal device may include information about some new capabilities supported by the terminal device. For example, the terminal device sends the first sub-capability information, the second sub-capability information, and the third sub-capability information to the second network device. The first sub-capability information corresponds to the first network device, and the third sub-capability information is also related to the first network device. Therefore, the second network device may send the first sub-capability information and the third sub-capability information to the first network device. In this case, the first network device may receive the first sub-capability information and the third sub-capability information from the second network device. In this way, the first network device obtains the capability information of the terminal device. When the first network device and the second network device are in a same communications system, for example, in an NR-NR DC case, the first sub-capability information and the second sub-capability information are same capability information. In other words, the terminal device sends only the first sub-capability information and the third sub-capability information to the second network device, and then the second network device sends the first sub-capability information and the third sub-capability information to the first network device. S701 shown in FIG. 7 includes a process in which the terminal device sends the capability information to the second network device, and includes a process in which the second network device sends the first sub-capability information and the third sub-capability information to the first network device.

For example, in the EN-DC architecture, the second network device does not support the first sub-capability information, and therefore, the second network device probably cannot identify the first sub-capability information. In this embodiment of this application, the terminal device may add an identifier to the first sub-capability information. In this way, the second network device only needs to transparently transmit the first sub-capability information to the first network device, and does not need to identify the first sub-capability information. For example, the terminal device may add identifiers to the first sub-capability information and the third sub-capability information. The identifiers are used to indicate the first network device, so that after receiving the first sub-capability information, the second sub-capability information, and the third sub-capability information, the second network device may send the first sub-capability information and the third sub-capability information to the first network device. In this manner, the terminal device is enabled to report the capability information, and the first network device can also learn information about some new capabilities supported by the terminal device, so that the first network device can interact with the terminal device based on the new capabilities, and the terminal device can benefit from technical improvement brought by the new capabilities.

S702: The first network device sends configuration information to the terminal device, and the terminal device receives the configuration information from the first network device, where the configuration information is used to indicate that the terminal device can send the assistance information of the terminal device to the first network device through an SRB3.

As described in S701, after receiving the capability information of the terminal device, the second network device may send both the first sub-capability information and the third sub-capability information to the first network device. In this case, after receiving the first sub-capability information and the third sub-capability information, the first network device may determine capabilities of the terminal device. For example, if the first network device considers that the terminal device has some new capabilities supported by the first network device, the first network device may send the configuration information to the terminal device, to configure the terminal device to be capable of sending the assistance information to the first network device through the SRB3. For example, the first network device may send the configuration information to the terminal device through the SRB3, and the terminal device receives the configuration information from the first network device through the SRB3.

In the conventional technology, the SRB3 cannot be used to transmit the assistance information of the terminal device. However, in this embodiment of this application, the SRB3 is enabled to transmit the assistance information of the terminal device, so that the terminal device can send the assistance information to the first network device, and the first network device can perform corresponding configuration on the terminal device. For example, the terminal device may send overheating information to the first network device, so that the first network device may configure the terminal device to release a corresponding resource, and the terminal device does not need to release a connection between the terminal device and the first network device, thereby ensuring a throughput of the terminal device and improving transmission performance of the terminal device.

In an optional implementation, in addition to indicating that the terminal device can send the assistance information of the terminal device to the first network device through the SRB3, the configuration information may further include first time information. For example, the configuration information includes first information and the first time information, and the first information is used to indicate that the terminal device can send the assistance information of the terminal device to the first network device through the SRB3.

The first time information is, for example, information about a timer, information about a first moment, or information about first duration. The first time information may be used to indicate that the terminal device can send the assistance information to the first network device through the SRB3 within a time range indicated by the first time information. It means that the first time information implicitly indicates that the terminal device cannot send the assistance information to the first network device through the SRB3 beyond the time range indicated by the first time information. This is equivalent to adding a time limit for sending the assistance information by the terminal device through the SRB3, and the terminal device can send the assistance information to the first network device through the SRB3 only within a specified period of time. This manner is convenient for management performed by the second network device.

For example, the first time information is the information about the timer. In this case, after receiving the configuration information, the terminal device may start the timer. Before the timer expires, the terminal device can send the assistance information to the first network device through the SRB3. When the timer expires and after the timer expires, the terminal device cannot send the assistance information to the first network device through the SRB3. Alternatively, the first time information is the information about the first moment. In this case, the terminal device can send the assistance information to the first network device through the SRB3 within a period from a moment at which the terminal device receives the configuration information to the first moment, and after the first moment arrives, the terminal device cannot send the assistance information to the first network device through the SRB3. Alternatively, the first time information is the information about the first duration. In this case, the terminal device may start timing from a moment of receiving the configuration information, and can send the assistance information to the first network device through the SRB3 until an end moment of the first duration arrives. After the end moment of the first duration arrives, the terminal device cannot send the assistance information to the first network device through the SRB3.

Alternatively, the first time information may be used to indicate that after sending the assistance information to the first network device through the SRB3, the terminal device cannot send the assistance information to the first network device through the SRB3 within a time range indicated by the first time information. It means that the first time information implicitly indicates that after sending the assistance information to the first network device through the SRB3, the terminal device can send the assistance information to the first network device again through the SRB3 beyond the time range indicated by the first time information. In this manner, the terminal device can be prevented from frequently sending the assistance information to the first network device, and load of the first network device can be reduced.

For example, the first time information is the information about the timer. In this case, after sending the assistance information to the first network device through the SRB3, the terminal device may start the timer. Before the timer expires, the terminal device cannot send the assistance information to the first network device through the SRB3. When the timer expires and after the timer expires, the terminal device may send the assistance information to the first network device through the SRB3. Alternatively, the first time information is the information about the first moment. In this case, the terminal device cannot send the assistance information to the first network device through the SRB3 within a period from a moment at which the terminal device completes sending of the assistance information to the first network device through the SRB3 to the first moment. After the first moment arrives, the terminal device may send the assistance information to the first network device through the SRB3. Alternatively, the first time information is the information about the first duration. In this case, the terminal device may start timing after completing sending of the assistance information to the first network device through the SRB3, and cannot send the assistance information to the first network device through the SRB3 until an end moment of the first duration arrives. After the end moment of the first duration arrives, the terminal device may then send the assistance information to the first network device through the SRB3.

In an optional implementation, in addition to indicating that the terminal device can send the assistance information of the terminal device to the first network device through the SRB3, the configuration information may further include information about at least one parameter corresponding to the assistance information. For example, the configuration information includes the first information and the information about the at least one parameter, and the first information is used to indicate that the terminal device can send the assistance information of the terminal device to the first network device through the SRB3. The configuration information may indicate which parameter information in the assistance information is to be reported. For example, for a terminal device having a power saving feature and an overheating feature, the configuration information indicates to report only information about at least one parameter corresponding to assistance information related to power saving, or report only information about at least one parameter corresponding to assistance information related to overheating, or report information about at least one parameter corresponding to assistance information related to power saving and overheating. For example, the assistance information may be classified. For example, the assistance information includes a first type of information and a second type of information. The first type of information is, for example, information related to overheating, and the second type of information is, for example, information related to power saving. In this case, the configuration information may include a bitmap (bitmap), the bitmap includes, for example, two bits, and the two bits are in a one-to-one correspondence with the two types of information included in the assistance information. If a value of one bit is "1", it indicates that the at least one parameter includes a parameter corresponding to one type of information corresponding to the bit; or if a value of one bit is "0", it indicates that the at least one parameter does not include a parameter corresponding to one type of information corresponding to the bit. For example, the bitmap includes two bits, where a low-order bit is corresponding to the first type of information, and a high-order bit is corresponding to the second type of information. In this case, if a value of the two bits is "11", it indicates that the at least one parameter includes a parameter corresponding to the first type of information and a parameter corresponding to the second type of information. When sending the assistance information, the terminal device needs to send a value of the parameter corresponding to the first type of information and a value of the parameter corresponding to the second type of information. For a specific feature, for example, an overheating feature, the configuration information may indicate to report only some parameter information of the feature, or may indicate, in a form similar to bit mapping, which parameter information needs to be reported.

For example, the configuration information may include the first information, and may further include at least one of the first time information or the information about the at least one parameter. For example, the configuration information includes the first information, or the configuration information includes the first information and the first time information, or the configuration information includes the first information and the information about the at least one parameter, or the configuration information includes the first information, the first time information, and the information about the at least one parameter.

An example in which the first network device sends the configuration information to the terminal device is used in S702. Alternatively, the second network device may send configuration information to the terminal device, that is, S703 in the following.

S703: The second network device sends the configuration information to the terminal device, and the terminal device receives the configuration information from the second network device, where the configuration information is used to indicate that the terminal device can send the assistance information of the terminal device to the first network device through the SRB3.

Either S702 or S703 may be selected for execution. Which one is to be executed may be specified in a protocol.

For example, if the second network device can determine, based on the capability information of the terminal device, that the terminal device can send the assistance information of the terminal device to the first network device through the SRB3, the second network device may send the configuration information to the terminal device. Alternatively, the second network device may determine, based on another factor, that the terminal device can send the assistance information of the terminal device to the first network device through the SRB3. For example, the second network device may periodically configure the terminal device to send the assistance information of the terminal device to the first network device through the SRB3. A manner in which the second network device determines whether the terminal device can send the assistance information of the terminal device to the first network device through the SRB3 is not limited. Certainly, the configuration information sent by the second network device to the terminal device may further include some other configurations provided by the master network device for the terminal device. This is not specifically limited.

For description of the configuration information, refer to S702. Details are not described herein again.

S704: The terminal device sends the assistance information of the terminal device to the first network device through the SRB3, and the first network device receives the assistance information from the terminal device through the SRB3.

After receiving the configuration information, the terminal device may send the assistance information of the terminal device to the first network device through the SRB3. The assistance information of the terminal device includes, for example, a configuration expected by the terminal device, or includes service information of the terminal device, or includes a configuration expected by the terminal device and service information of the terminal device. The service information of the terminal device includes, for example, a parameter of a service that is being performed by the terminal device, for example, a type or required bandwidth of the service that is being performed by the terminal device. The configuration expected by the terminal device is, for example, an air interface configuration expected by the terminal device, for example, a slot format expected by the terminal device.

For example, the assistance information of the terminal device may include one or any combination of the following:

a quantity of multiple-input multiple-output (multiple-input multiple-output, MIMO) layers of the terminal device;

a quantity of secondary cells corresponding to the terminal device;

a quantity of antenna ports of the terminal device;

an aggregated bandwidth of a secondary cell (secondary serving cell, SCell) group corresponding to the terminal device;

a bandwidth of each secondary cell corresponding to the terminal device;

a maximum bandwidth supported by the terminal device;

a connected-discontinuous reception (connected-discontinuous reception, C-DRX) configuration or parameter expected by the terminal device;

a bandwidth part (bandwidth part, BWP) configuration or parameter expected by the terminal device;

an application type of the terminal device;

a size of a data packet transmitted by the terminal device;

a scheduling mode expected by the terminal device;

a search space expected by the terminal device;

a scheduling format expected by the terminal device; or a slot format expected by the terminal device.

The quantity of secondary cells corresponding to the terminal device, the quantity of antenna ports of the terminal device, the aggregated bandwidth of the secondary cell group corresponding to the terminal device, the bandwidth of each secondary cell corresponding to the terminal device, or the like may be used as overheating information of the terminal device.

Certainly, in addition to at least one of the foregoing items, the assistance information of the terminal device may further include other information. Alternatively, the assistance information of the terminal device may include none of the foregoing items, but include other information. This is not specifically limited.

If the configuration information further includes the first time information, and the first time information indicates that the terminal device can send the assistance information to the first network device through the SRB3 within a time range indicated by the first time information, the terminal device may send the assistance information to the first network device through the SRB3 within the time range indicated by the first time information, but the terminal device cannot send the assistance information to the first network device through the SRB3 beyond the time range indicated by the first time information. Alternatively, if the first time information indicates that the terminal device cannot send the assistance information to the first network device through the SRB3 within a time range indicated by the first time information after sending the assistance information to the first network device through the SRB3, after the terminal device performs S704, the terminal device cannot send the assistance information to the first network device through the SRB3 within the time range indicated by the first time information, but can send the assistance information to the first network device through the SRB3 beyond the time range indicated by the first time information.

If the configuration information further includes the information about the at least one parameter, the assistance information sent by the terminal device to the network device in S704 may be a value of the at least one parameter.

For example, the at least one parameter includes the quantity of MIMO layers of the terminal device, the quantity of secondary cells corresponding to the terminal device, the quantity of antenna ports of the terminal device, and the scheduling format expected by the terminal device. In this case, the assistance information sent by the terminal device to the network device in S704 includes the quantity of MIMO layers of the terminal device, the quantity of secondary cells corresponding to the terminal device, the quantity of antenna ports of the terminal device, and the scheduling format expected by the terminal device.

In this manner, the first network device can obtain required assistance information, so as to better configure the terminal device.

The assistance information sent by the terminal device to the first network device may include only information related to the first network device, and does not include information related to the second network device, or may include the information related to the first network device and the information related to the second network device. For example, the first network device may notify the terminal device in advance that the terminal device sends only the information related to the first network device to the first network device, or notify the terminal device that if the terminal device sends the information related to the second network device to the first network device, the first network device ignores the information; or notify the terminal device that if the terminal device sends the information related to the second network device to the first network device, the first network device waits to negotiate with the second network device. Alternatively, the first network device may notify the terminal device in advance to send the information related to the first network device and the information related to the second network device to the first network device. Alternatively, whether the terminal device sends the information related to the first network device to the first network device or sends the information related to the first network device and the information related to the second network device to the first network device may be specified in a protocol.

For example, in the conventional technology, if the terminal device needs to send, to a network device, a quantity of secondary cells corresponding to the terminal device, a sum of a quantity of secondary cells corresponding to the first network device and a quantity of secondary cells corresponding to the second network device is sent. For example, the quantity of secondary cells corresponding to the terminal device that is sent by the terminal device to the network device is 10. In this case, the 10 secondary cells may include a secondary cell corresponding to the first network device and a secondary cell corresponding to the second network device. If the terminal device sends such assistance information to the first network device, because the second network device is involved, the first network device may not have a scheduling decision right on the assistance information. Therefore, in this embodiment of this application, the terminal device may send only the information related to the first network device to the first network device. For example, the terminal device may send only the quantity of secondary cells corresponding to the first network device to the first network device, so that the first network device can make a decision.

In addition, if the terminal device sends the information related to the first network device and the information related to the second network device to the first network device through the SRB3, after receiving the information related to the first network device and the information related to the second network device, the first network device may send the information related to the second network device to the second network device. In this case, the second network device may receive the information related to the second network device from the first network device. In this way, the terminal device no longer needs to send the information related to the second network device to the second network device, thereby reducing interaction between the terminal device and the network device.

In S704, that the terminal device sends the assistance information of the terminal device to the first network device through the SRB3 is used as an example. Alternatively, it is possible that the terminal device may send the assistance information to the second network device. Refer to S705.

S705: The terminal device sends the assistance information of the terminal device to the second network device, and the second network device receives the assistance information from the terminal device.

Either S704 or S705 may be selected for execution. Which one is to be executed may be specified in a protocol. For example, S704 may be executed when the SRB3 exists, and S705 may be executed when the SRB3 does not exist.

For example, if S703 is performed, S704 or S705 may be performed; or if S702 is performed, either S704 or S705 may be performed.

For example, the terminal device may send the assistance information to the second network device by using an SRB1. The assistance information sent by the terminal device to the second network device may include only the information related to the second network device, and does not include the information related to the first network device, or may include the information related to the first network device and the information related to the second network device.

If the assistance information includes the information related to the first network device (or assistance information corresponding to the first network device) and the information related to the second network device (or assistance information corresponding to the second network device), after the second network device receives the assistance information, the second network device may further send the information related to the first network device to the first network device, and the first network device may receive the information related to the first network device from the second network device, so that the first network device may obtain the assistance information of the terminal device. S705 in FIG. 7 includes a process in which the terminal device sends the assistance information to the second network device, and further includes a process in which the second network device sends assistance information to the first network device. The assistance information sent by the second network device to the first network device may be the assistance information corresponding to the first network device.

It may be understood that the terminal device may send the information related to the second network device to the second network device, and may send the information related to the first network device to the first network device through the SRB3. This is equivalent to that the terminal device may send assistance information related to different network devices to corresponding network devices, and the assistance information does not need to be forwarded between the network devices. Alternatively, the terminal device may send the assistance information to the first network device, where the assistance information includes the information related to the first network device and the information related to the second network device, and then the first network device sends the information related to the second network device to the second network device. Alternatively, the terminal device may send the assistance information to the second network device, where the assistance information includes the information related to the first network device and the information related to the second network device, and then the second network device sends the information related to the first network device to the first network device. In the last two manners, the terminal device only needs to interact with one network device, thereby reducing an interaction process between the terminal device and the network device.

S706: The first network device sends adjustment information to the terminal device through the SRB3, and the terminal device receives the adjustment information from the first network device through the SRB3.

After obtaining the assistance information of the terminal device, the first network device may determine, based on the assistance information, how to adjust the configuration of the terminal device. For example, if the assistance information includes the slot format expected by the terminal device, the first network device may configure the slot format for the terminal device. How the first network device determines the adjustment information based on the assistance information is not limited in this embodiment of this application. Alternatively, the first network device may determine the adjustment information based on another factor. This is not specifically limited.

The first network device may send the adjustment information to the terminal device. After receiving the adjustment information, the terminal device may adjust the configuration of the terminal device.

In the foregoing description of this embodiment of this application, it is assumed that the SRB3 has been set up between the first network device and the terminal device. The SRB3 between the first network device and the terminal device may be actively set up by the second network device. Alternatively, the terminal device or the first network device may actively request to set up the SRB3.

For example, if the first network device determines that the first network device may interact with the terminal device through the SRB3, for example, the first network device determines, based on the capability information (for example, the first sub-capability information and the third sub-capability information) of the terminal device or another factor, that the first network device may interact with the terminal device through the SRB3, the first network device may send a request message to the second network device, where the request message is used to request to set up the SRB3 used for communication between the first network device and the terminal device. After receiving the request message, the second network device may determine whether to set up the SRB3 for the first network device and the terminal device. Then, the second network device may send a first message to the first network device, and the first network device receives the first message from the second network device. For example, the first message may be used to set up the SRB3, or the first message may be used to configure the SRB3, or the first message may indicate that the SRB3 cannot be set up. In this case, if the first message is used to set up the SRB3, the first network device may set up the SRB3 based on the first message. Alternatively, if the first message is used to configure the SRB3, the first network device may configure the SRB3 based on the first message. "Set up the SRB3" and "configure the SRB3" can be understood as a same meaning. After the SRB3 is set up, the foregoing S702 to S705 may be performed. Alternatively, if the first message is used to indicate that the SRB3 cannot be set up, the first network device may determine that the SRB3 cannot be set up, and S702 to S705 cannot be performed.

Alternatively, the operation of requesting to set up the SRB3 may be performed by the terminal device. For example, before sending the capability information to the second network device, or after sending the capability information to the second network device, the terminal device may send a request message to the second network device, to request to set up the SRB3 between the terminal device and the first network device. For example, if the terminal device determines, based on the capability information of the terminal device, that the terminal device can exchange some new capability information with the first network device, the terminal device may send a request message to the second network device, to request to set up the SRB3 between the terminal device and the first network device. Similarly, after receiving the request message, the second network device may determine whether to set up the SRB3 for the first network device and the terminal device. Then, the second network device may send a first message to the terminal device, and the terminal device receives the first message from the second network device. For example, the first message may be used to set up the SRB3, or the first message may be used to configure the SRB3, or the first message may indicate that the SRB3 cannot be set up. In this case, if the first message is used to set up the SRB3, the terminal device may set up the SRB3 based on the first message. Alternatively, if the first message is used to configure the SRB3, the terminal device may configure the SRB3 based on the first message. "Set up the SRB3" and "configure the SRB3" can be understood as a same meaning. After the SRB3 is set up, the foregoing S702 to S705 may be performed. Alternatively, if the first message is used to indicate that the SRB3 cannot be set up, the terminal device may determine that the SRB3 cannot be set up, and S702 to S705 cannot be performed.

Regardless of whether the first network device initiates the request or the terminal device initiates the request, in an optional manner, if the first message is used to indicate that the SRB3 cannot be set up, the first message may further carry second time information, and the second time information may indicate that it is forbidden to request to set up the SRB3 within a time range indicated by the second time information. It is equivalent to that the second network device indicates, by using the second time information, the first network device not to request to set up the SRB3 within the time range indicated by the second time information. In this manner, the first network device can be prevented from frequently initiating a request to the second network device, so that load of the second network device can be reduced.

For example, the second time information is information about a timer. In this case, after receiving the first message, the terminal device may start the timer. Before the timer expires, the terminal device cannot send the assistance information to the first network device through the SRB3. When the timer expires and after the timer expires, the terminal device can send the assistance information to the first network device through the SRB3.

Alternatively, the first time information is information about the first moment. In this case, the terminal device cannot send the assistance information to the first network device through the SRB3 within a period from a moment at which the terminal device receives the first message to the first moment, and after the first moment arrives, the terminal device can send the assistance information to the first network device through the SRB3.

Alternatively, the first time information is information about the first duration. In this case, the terminal device may start timing from a moment of receiving the first message, and cannot send the assistance information to the first network device through the SRB3 until an end moment of the first duration arrives. After the end moment of the first duration arrives, the terminal device can send the assistance information to the first network device through the SRB3.

In addition, in this embodiment of this application, before S701, if the first network device and the second network device have not formed a dual-connectivity structure, if the second network device considers that the first network device may be used as a secondary network device, the second network device may send a request message to the first network device, and the first network device may receive the request message from the second network device, where the request message is used to request the first network device to serve as the secondary network device of the second network device. After receiving the request message, the first network device may send a response message to the second network device. The second network device may receive the response message from the first network device. The response message is used to indicate that the first network device agrees to serve as the secondary network device of the second network device, or is used to indicate that the first network device does not agree to serve as the secondary network device of the second network device. In this case, if the response message is used to indicate that the first network device agrees to serve as the secondary network device of the second network device, the second network device may send second configuration information to the first network device, to configure the first network device as the secondary network device of the second network device, so that the first network device and the second network device may form a dual-connectivity structure.

In this embodiment of this application, the terminal device may send, through the SRB3, the assistance information of the terminal device to the first network device serving as the secondary network device. For example, the assistance information may include the overheating information of the terminal device. In this case, the secondary network device can also obtain the overheating information of the terminal device, so that the secondary network device can perform corresponding configuration on the terminal device, and the terminal device does not need to release a connection between the terminal device and the secondary network device. This helps improve transmission performance of the terminal device.

In the embodiment shown in FIG. 7, it is considered that the SRB3 has been set up between the first network device and the terminal device. However, it is still possible that the SRB3 has not been set up between the first network device and the terminal device, and currently, the only way is to wait for the second network device to actively set up the SRB3 for the first network device and the terminal device. In this case, when there is information that needs to be transmitted between the first network device and the terminal device, if the SRB3 has not been set up, the information cannot be transmitted.

Figure 8A:
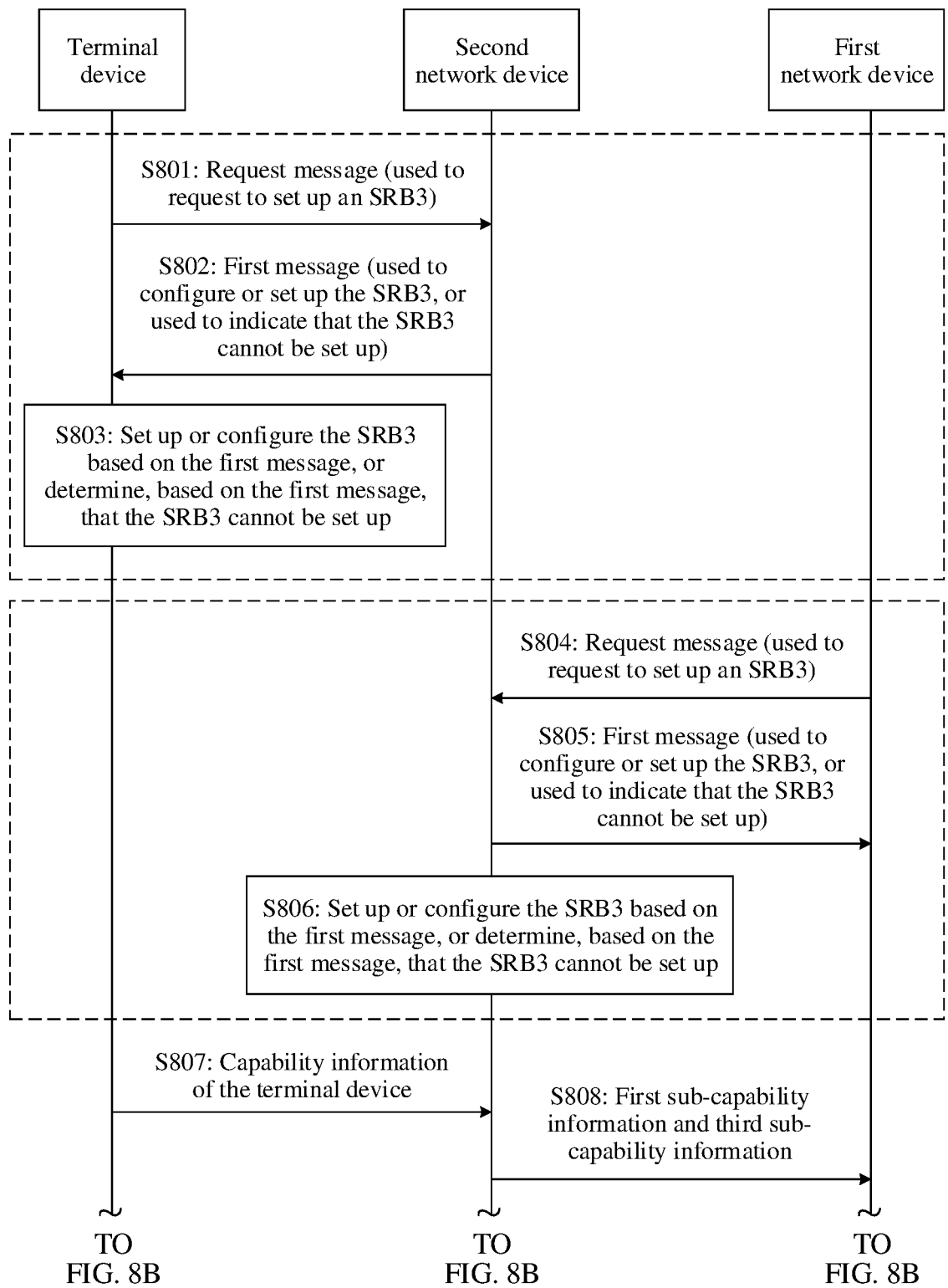
FIG. 8A and FIG. 8B are a flowchart of a second type of communications method according to an embodiment of this application.
Figure 8B:
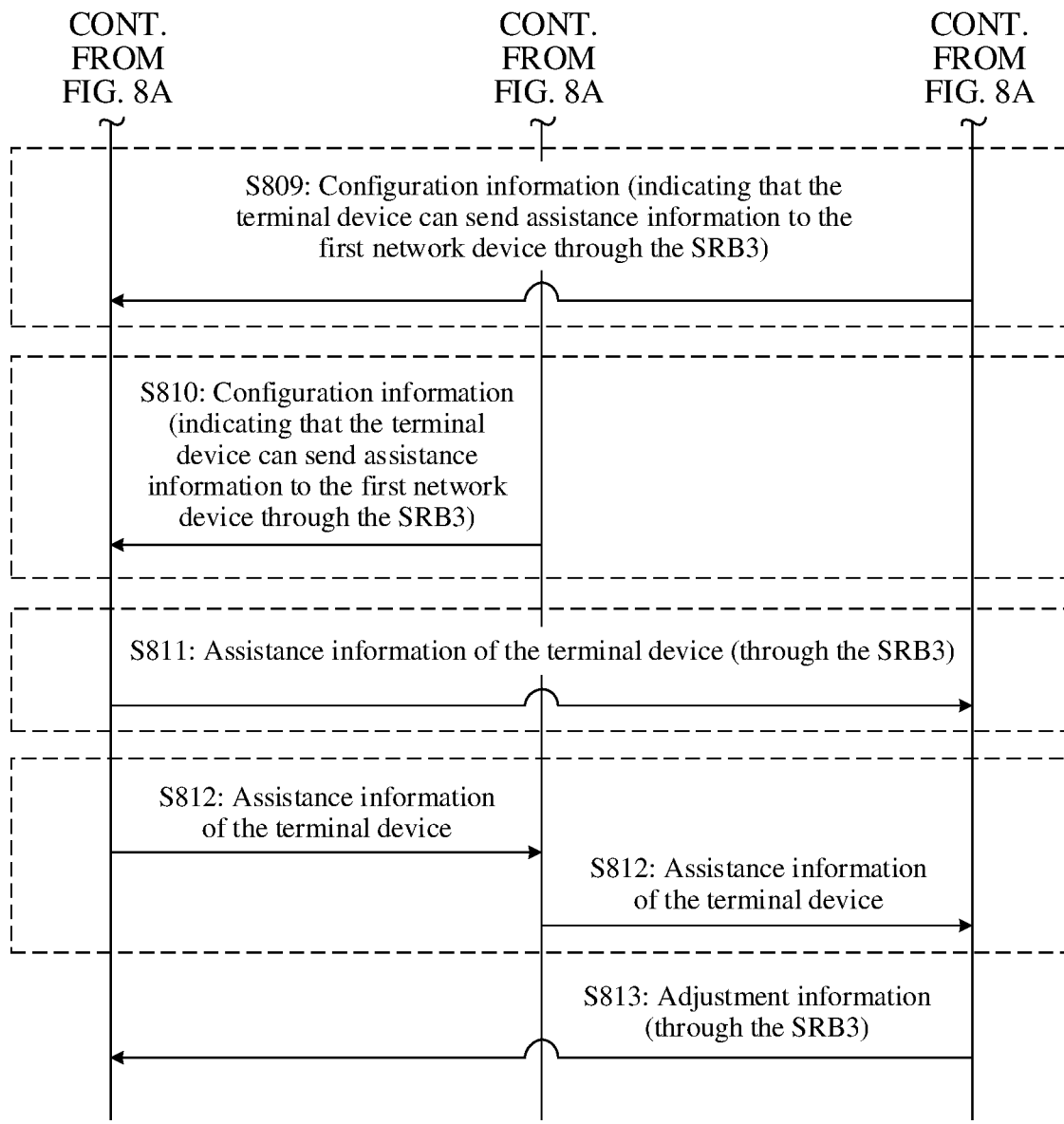

In view of this, an embodiment of this application provides a second communications method. In this method, the first network device or the terminal device can actively request to set up the SRB3. FIG. 8A and FIG. 8B are a flowchart of the method. In the following description process, an example in which the method is applied to the network architecture shown in any one of FIG. 3, FIG. 4A, FIG. 4B, FIG. 5, FIG. 6A, or FIG. 6B is used. In addition, the method may be performed by three communications apparatuses. The two communications apparatuses are, for example, a fourth communications apparatus, a fifth communications apparatus, and a sixth communications apparatus. The fourth communications apparatus may be a network device or a communications apparatus that can support a function required by the network device to implement the method. Alternatively, the fourth communications apparatus may be a terminal device or a communications apparatus that can support a function required by the terminal device to implement the method. Certainly, the fourth communications apparatus may be another communications apparatus, for example, a chip system. The fifth communications apparatus may be a network device or a communications apparatus that can support a function required by the network device to implement the method, or may be a terminal device or a communications apparatus that can support a function required by the terminal device to implement the method. Certainly, the fifth communications apparatus may alternatively be another communications apparatus, for example, a chip system. Similarly, the sixth communications apparatus may be a network device or a communications apparatus that can support a function required by the network device to implement the method, or may be a terminal device or a communications apparatus that can support a function required by the terminal device to implement the method. Certainly, the sixth communications apparatus may alternatively be another communications apparatus, for example, a chip system. In addition, implementations of the fourth communications apparatus, the fifth communications apparatus, and the sixth communications apparatus are not limited. For example, the fourth communications apparatus may be a network device, the fifth communications apparatus is a network device, and the sixth communications apparatus is a terminal device. Alternatively, the fourth communications apparatus, the fifth communications apparatus, and the sixth communications apparatus are all network devices. Alternatively, the fourth communications apparatus, the fifth communications apparatus, and the sixth communications apparatus are all terminal devices. Alternatively, the fourth communications apparatus is a chip system that can support a function required by a network device to implement the method, the fifth communications apparatus is a network device, and the sixth communications apparatus is a terminal device. For example, the network device is a base station.

For ease of description, the following uses an example in which the method is performed by network devices and a terminal device. In other words, the fourth communications apparatus is a network device (also referred to as a first network device in the following), the fifth communications apparatus is a network device (also referred to as a second network device in the following), and the sixth communications apparatus is a terminal device. In this embodiment, that the network architecture shown in any one of FIG. 3, FIG. 4A, FIG. 4B, FIG. 5, FIG. 6A, or FIG. 6B is applied is used as an example. Therefore, the terminal device described below may be the terminal device in the network architecture shown in any one of FIG. 3, FIG. 4A, FIG. 4B, FIG. 5, FIG. 6A, or FIG. 6B. In addition, the first network device described below may be the secondary network device in the network architecture shown in any one of FIG. 3, FIG. 4A, FIG. 4B, FIG. 5, FIG. 6A, or FIG. 6B, and the second network device described below may be the master network device in the network architecture shown in any one of FIG. 3, FIG. 4A, FIG. 4B, FIG. 5, FIG. 6A, or FIG. 6B. In addition, if the EN-DC architecture is used, the master network device is an LTE network device, and the secondary network device is an NR network device; or if the NR-NR DC architecture is used, both the master network device and the secondary network device are NR network devices.

S801: The terminal device sends a request message to the second network device, and the second network device receives the request message from the terminal device, where the request message is used to request to set up an SRB3 used for communication between the terminal device and the first network device.

For example, if the terminal device determines, based on capability information of the terminal device, that the terminal device can exchange some new capability information with the first network device, the terminal device may send the request message to the second network device, to request to set up the SRB3 between the terminal device and the first network device.

S802: The second network device sends a first message to the terminal device, and the terminal device receives the first message from the second network device, where the first message is used to set up the SRB3, or used to configure the SRB3, or used to indicate that the SRB3 cannot be set up.

After receiving the request message from the terminal device, the second network device may determine whether to set up the SRB3 for the first network device and the terminal device. Then, the second network device may send the first message to the terminal device, and the terminal device receives the first message from the second network device. For example, the first message may be used to set up the SRB3, or the first message may be used to configure the SRB3, or the first message may indicate that the SRB3 cannot be set up.

In an optional manner, if the first message is used to indicate that the SRB3 cannot be set up, the first message may further carry second time information, and the second time information may indicate that it is forbidden to request to set up the SRB3 within a time range indicated by the second time information. It is equivalent to that the second network device indicates, by using the second time information, the terminal device not to request to set up the SRB3 within the time range indicated by the second time information. In this manner, the terminal device can be prevented from frequently initiating a request to the second network device, so that load of the second network device can be reduced.

S803: The terminal device sets up, based on the first message, the SRB3 used to communicate with the first network device, or configures, based on the first message, the SRB3 used to communicate with the first network device, or determines, based on the first message, that the SRB3 cannot be set up.

If the first message is used to set up the SRB3, the terminal device may set up the SRB3 based on the first message. Alternatively, if the first message is used to configure the SRB3, the terminal device may configure the SRB3 based on the first message. "Set up the SRB3" and "configure the SRB3" can be understood as a same meaning. Alternatively, if the first message is used to indicate that the SRB3 cannot be set up, the terminal device may determine that the SRB3 cannot be set up.

In addition, if the first message further carries the second time information, the terminal device may determine that the terminal device cannot request to set up the SRB3 within the time range indicated by the second time information, and the terminal device no longer requests the second network device to set up the SRB3 within the time range indicated by the second time information.

For example, the second time information is information about a timer. In this case, after receiving the first message, the terminal device may start the timer. Before the timer expires, the terminal device cannot send the assistance information to the first network device through the SRB3. When the timer expires and after the timer expires, the terminal device can send the assistance information to the first network device through the SRB3.

Alternatively, the first time information is information about a first moment. In this case, the terminal device cannot send the assistance information to the first network device through the SRB3 within a period from a moment at which the terminal device receives the first message to the first moment, and after the first moment arrives, the terminal device can send the assistance information to the first network device through the SRB3.

Alternatively, the first time information is information about first duration. In this case, the terminal device may start timing from a moment of receiving the first message, and cannot send the assistance information to the first network device through the SRB3 until an end moment of the first duration arrives. After the end moment of the first duration arrives, the terminal device can send the assistance information to the first network device through the SRB3.

In S801 to S803, an example in which the terminal device requests to set up the SRB3 is used. In addition, it is possible that the first network device requests to set up the SRB3.

S804: The first network device sends a request message to the second network device, and the second network device receives the request message from the terminal device, where the request message is used to request to set up the SRB3 used for communication between the terminal device and the first network device.

For example, the first network device may obtain the capability information of the terminal device, to determine, based on the capability information of the terminal device, that the terminal device can exchange some new capability information with the first network device. In this case, the first network device may send the request message to the second network device, to request to set up the SRB3 between the terminal device and the first network device.

S805: The second network device sends a first message to the first network device, and the first network device receives the first message from the second network device, where the first message is used to set up the SRB3, or used to configure the SRB3, or used to indicate that the SRB3 cannot be set up.

After receiving the request message from the first network device, the second network device may determine whether to set up the SRB3 for the first network device and the terminal device. Then, the second network device may send a first message to the first network device, and the first network device receives the first message from the second network device. For example, the first message may be used to set up the SRB3, or the first message may be used to configure the SRB3, or the first message may indicate that the SRB3 cannot be set up.

In an optional manner, if the first message is used to indicate that the SRB3 cannot be set up, the first message may further carry second time information, and the second time information may indicate that it is forbidden to request to set up the SRB3 within a time range indicated by the second time information. It is equivalent to that the second network device indicates, by using the second time information, the first network device not to request to set up the SRB3 within the time range indicated by the second time information. In this manner, the first network device can be prevented from frequently initiating a request to the second network device, so that load of the second network device can be reduced.

S806: The first network device sets up, based on the first message, the SRB3 used for communication between the terminal device and the first network device, or configures, based on the first message, the SRB3 used for communication between the terminal device and the first network device, or determines, based on the first message, that the SRB3 cannot be set up.

If the first message is used to set up the SRB3, the first network device may set up the SRB3 based on the first message. Alternatively, if the first message is used to configure the SRB3, the first network device may configure the SRB3 based on the first message. "Set up the SRB3" and "configure the SRB3" can be understood as a same meaning.

Alternatively, if the first message is used to indicate that the SRB3 cannot be set up, the first network device may determine that the SRB3 cannot be set up.

In addition, if the first message further carries the second time information, the first network device may determine that the first network device cannot request to set up the SRB3 within the time range indicated by the second time information, and the first network device no longer requests the second network device to set up the SRB3 within the time range indicated by the second time information.

For example, the second time information is information about a timer. After receiving the first message, the first network device may start the timer. Before the timer expires, the first network device cannot send the assistance information to the first network device through the SRB3. When the timer expires and after the timer expires, the first network device can send the assistance information to the first network device through the SRB3.

Alternatively, the first time information is information about a first moment. In this case, the first network device cannot send the assistance information to the first network device through the SRB3 within a period from a moment at which the first network device receives the first message to the first moment, and after the first moment arrives, the first network device can send the assistance information to the first network device through the SRB3.

Alternatively, the first time information is information about first duration. In this case, the first network device may start timing from a moment of receiving the first message, and cannot send the assistance information to the first network device through the SRB3 until an end moment of the first duration arrives. After the end moment of the first duration arrives, the first network device can send the assistance information to the first network device through the SRB3.

S801 to S803 and S804 to S806 may be parallel solutions. Which solution is to be performed may be specified in a protocol, may be configured by the second network device, or the like. Alternatively, both S801 to S803 and S804 to S806 may be performed.

In this embodiment of this application, the terminal device or the first network device can actively request to set up the SRB3, so as to set up the SRB3 when corresponding information needs to be transmitted, instead of passively waiting for the second network device to actively set up the SRB3.

S807: The terminal device sends the capability information of the terminal device to the second network device, and the second network device receives the capability information of the terminal device from the terminal device.

For S807, refer to S701 in the embodiment shown in FIG. 7. S807 shown in FIG. 8A also includes a process in which the terminal device sends the capability information to the second network device, and includes a process in which the second network device sends first sub-capability information and third sub-capability information to the first network device.

If S801 to S803 are performed, S801 may be performed before S807, or may be performed after S807. Alternatively, if S804 to S806 are performed, S804 may be performed before S807, or may be performed after S807. For example, after obtaining the first sub-capability information and the third sub-capability information, the second network device determines that the terminal device can exchange some new capability information with the first network device. In this case, the first network device may send the request message to the second network device, to request to set up the SRB3 between the first network device and the terminal device. In this case, S804 is performed after S807.

S808: The first network device sends configuration information to the terminal device, and the terminal device receives the configuration information from the first network device, where the configuration information is used to indicate that the terminal device can send the assistance information of the terminal device to the first network device through the SRB3.

After the SRB3 is set up, the first network device may send the configuration information to the terminal device through the SRB3. For example, after receiving the first sub-capability information and the third sub-capability information, the first network device may determine a capability of the terminal device. For example, if the first network device considers that the terminal device has some new capabilities (or referred to as new features) supported by the first network device, the first network device may send the configuration information to the terminal device, to configure the terminal device to be capable of sending the assistance information to the first network device through the SRB3.

In the conventional technology, the SRB3 cannot be used to transmit the assistance information of the terminal device. However, in this embodiment of this application, the SRB3 is enabled to transmit the assistance information of the terminal device, so that the terminal device can send the assistance information to the first network device, and the first network device can perform corresponding configuration on the terminal device. For example, the terminal device may send overheating information to the first network device, so that the first network device may configure the terminal device to release a corresponding resource, and the terminal device does not need to release a connection between the terminal device and the first network device, thereby ensuring a throughput of the terminal device and improving transmission performance of the terminal device.

In an optional implementation, in addition to indicating that the terminal device can send the assistance information of the terminal device to the first network device through the SRB3, the configuration information may further include first time information. For example, the configuration information includes first information and the first time information, and the first information is used to indicate that the terminal device can send the assistance information of the terminal device to the first network device through the SRB3.

In an optional implementation, in addition to indicating that the terminal device can send the assistance information of the terminal device to the first network device through the SRB3, the configuration information may further include information about at least one parameter corresponding to the assistance information. For example, the configuration information includes first information and the information about the at least one parameter, and the first information is used to indicate that the terminal device can send the assistance information of the terminal device to the first network device through the SRB3.

For example, the configuration information may include the first information, and may further include at least one of the first time information or the information about the at least one parameter. For example, the configuration information includes the first information, or the configuration information includes the first information and the first time information, or the configuration information includes the first information and the information about the at least one parameter, or the configuration information includes the first information, the first time information, and the information about the at least one parameter.

Specifically, for corresponding content related to S808, refer to the description of S702 in the embodiment shown in FIG. 7.

An example in which the first network device sends the configuration information to the terminal device is used in S809. Alternatively, the second network device may send configuration information to the terminal device, that is, S810 in the following.

S810: The second network device sends the configuration information to the terminal device, and the terminal device receives the configuration information from the second network device, where the configuration information is used to indicate that the terminal device can send the assistance information of the terminal device to the first network device through the SRB3.

Either S809 or S810 may be selected for execution. Which one is to be executed may be specified in a protocol.

Specifically, for corresponding content related to S810, refer to the description of S703 in the embodiment shown in FIG. 7.

S811: The terminal device sends the assistance information of the terminal device to the first network device through the SRB3, and the first network device receives the assistance information from the terminal device through the SRB3.

For description of content of S811, for example, description of the assistance information, refer to S704 in the embodiment shown in FIG. 7.

In S811, that the terminal device sends the assistance information of the terminal device to the first network device through the SRB3 is used as an example. Alternatively, it is possible that the terminal device may send the assistance information to the second network device. Refer to S812.

S812: The terminal device sends the assistance information of the terminal device to the second network device, and the second network device receives the assistance information from the terminal device.

Either S811 or S812 may be selected for execution. Which one is to be executed may be specified in a protocol. For example, S811 is executed when the SRB3 exists, and S812 is executed when the SRB3 does not exist.

For example, if S809 is performed, either S811 or S812 may be performed; or if S810 is performed, either S811 or S812 may be performed.

For description of content of S812, for example, description of the assistance information, refer to S705 in the embodiment shown in FIG. 7. S812 shown in FIG. 8B also includes a process in which the terminal device sends the assistance information to the second network device and a process in which the second network device sends assistance information to the first network device. The assistance information sent by the second network device to the first network device may be assistance information corresponding to the first network device.

S813: The first network device sends adjustment information to the terminal device through the SRB3, and the terminal device receives the adjustment information from the first network device through the SRB3.

After obtaining the assistance information of the terminal device, the first network device may determine, based on the assistance information, how to adjust a configuration of the terminal device. For example, if the assistance information includes a slot format expected by the terminal device, the first network device may configure the slot format for the terminal device. How the first network device determines the adjustment information based on the assistance information is not limited in this embodiment of this application. Alternatively, the first network device may determine the adjustment information based on another factor. This is not specifically limited.

The first network device may send the adjustment information to the terminal device. After receiving the adjustment information, the terminal device may adjust the configuration of the terminal device.

In addition, in this embodiment of this application, before S801, if the first network device and the second network device have not formed a dual-connectivity structure, if the second network device considers that the first network device may be used as a secondary network device, the second network device may send a request message to the first network device, and the first network device may receive the request message from the second network device, where the request message is used to request the first network device to serve as the secondary network device of the second network device. After receiving the request message, the first network device may send a response message to the second network device. The second network device may receive the response message from the first network device. The response message is used to indicate that the first network device agrees to serve as the secondary network device of the second network device, or is used to indicate that the first network device does not agree to serve as the secondary network device of the second network device. In this case, if the response message is used to indicate that the first network device agrees to serve as the secondary network device of the second network device, the second network device may send second configuration information to the first network device, to configure the first network device as the secondary network device of the second network device, so that the first network device and the second network device may form a dual-connectivity structure.

In this embodiment of this application, the terminal device or the first network device can actively request to set up the SRB3, so as to set up the SRB3 when corresponding information needs to be transmitted, instead of passively waiting for the second network device to actively set up the SRB3. After the SRB3 is set up, the terminal device and the first network device may transmit corresponding control information through the SRB3. For example, the terminal device may send the assistance information of the terminal device to the first network device through the SRB3, so that the first network device can obtain the assistance information of the terminal device, to perform corresponding configuration on the terminal device. In this way, the configuration of the terminal device can meet requirements of the terminal device and the first network device. For example, the assistance information sent by the terminal device may include the overheating information of the terminal device. In this case, the first network device can also obtain the overheating information of the terminal device, so that the first network device can perform corresponding configuration on the terminal device, and the terminal device does not need to release a connection between the terminal device and the secondary network device. This helps improve transmission performance of the terminal device.

The following describes, with reference to the accompanying drawings, apparatuses configured to implement the foregoing method in the embodiments of this application. Therefore, all the foregoing content may be used in subsequent embodiments, and repeated content is not described again.

Figure 9:
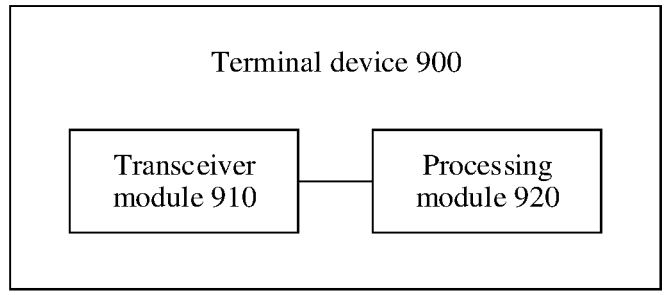
FIG. 9 is a schematic block diagram of a first type of terminal device according to an embodiment of this application.

FIG. 9 is a schematic block diagram of a communications device 900 according to an embodiment of this application. For example, the communications device 900 is a terminal device 900. The terminal device 900 includes a processing module 910 and a transceiver module 920. The processing module 910 may be configured to perform all operations performed by the terminal device in the embodiment shown in FIG. 7 except receiving and sending operations, for example, an operation of determining capability information of the terminal device by the terminal device, an operation of determining assistance information of the terminal device, and an operation of adjusting a configuration or service information of the terminal device based on the adjustment information, and/or configured to support another process of the technology described in this specification. The transceiver module 920 may be configured to perform all receiving and sending operations performed by the terminal device in the embodiment shown in FIG. 7, for example, S701, S703, S704, S705, and S706 in the embodiment shown in FIG. 7, and/or configured to support another process of the technology described in this specification.

The processing module 910 is configured to determine that assistance information of the terminal device can be sent to a first network device through an SRB3, where the terminal device is connected to at least two network devices, and the first network device is a secondary network device in the at least two network devices.

The transceiver module 920 is configured to send the assistance information to the first network device through the SRB3, where the assistance information is used to indicate a configuration expected by the terminal device or service information of the terminal device.

In an optional implementation, that the terminal device determines that the assistance information of the terminal device 900 can be sent to the first network device through the SRB3 includes:

the transceiver module 920 is further configured to receive first configuration information from the first network device or the second network device; and
the processing module 910 is further configured to determine, based on the first configuration information, that the terminal device can send the assistance information to the first network device through the SRB3, where the second network device is a master network device in the at least two network devices.

In an optional implementation, the first configuration information further includes first time information, and the processing module 910 is further configured to:
determine, based on the first time information, that the terminal device 900 can send the assistance information to the first network device through the SRB3 within a time range corresponding to the first time information; or
determine, based on the first time information, that the terminal device 900 no longer sends assistance information to the first network device within the first time after sending the assistance information to the first network device.

In an optional implementation, the first configuration information further includes information about at least one parameter corresponding to the assistance information, and the processing module 910 is further configured to determine that a value of the at least one parameter can be sent to the first network device through the SRB3.

In an optional implementation, the assistance information is information related to the first network device, or the assistance information includes the information related to the first network device and information related to the second network device.

In an optional implementation, the transceiver module 920 is further configured to: after sending the assistance information to the first network device through the SRB3, receive adjustment information from the first network device through the SRB3, where the adjustment information is used to adjust a configuration of the terminal device 900.

In an optional implementation, the assistance information includes one or any combination of the following:
- a quantity of MIMO layers of the terminal device 900;
- a quantity of secondary cells corresponding to the terminal device 900;
- a quantity of antenna ports of the terminal device 900;
- an aggregated bandwidth of a secondary cell group corresponding to the terminal device 900;
- a bandwidth of each secondary cell corresponding to the terminal device 900;
- a maximum bandwidth supported by the terminal device 900;
- a C-DRX configuration or parameter expected by the terminal device 900;
- a bandwidth part BWP configuration or parameter expected by the terminal device 900;
- an application type of the terminal device 900;
- a size of a data packet transmitted by the terminal device 900;
- a scheduling mode expected by the terminal device 900;
- a search space expected by the terminal device 900;
- a scheduling format expected by the terminal device 900; or
- a slot format expected by the terminal device 900.

In an optional implementation, the transceiver module 920 is further configured to send capability information of the terminal device 900 to the second network device, where the capability information includes first sub-capability information corresponding to the first network device, the first sub-capability information is transparently transmitted to the first network device by using the second network device, the capability information further includes second sub-capability information corresponding to the second network device and third sub-capability information corresponding to the first network device and the second network device, and the second network device is the master network device in the at least two network devices.

In an optional implementation, the transceiver module 920 is further configured to:
- send a request message to the second network device, where the request message is used to request to set up the SRB3 used for communication between the terminal device 900 and the first network device, and the second network device is the master network device in the at least two network devices; and
- receive a first message from the second network device, where the first message is used to set up the SRB3 for the terminal device 900 or used to configure the SRB3 for the terminal device.

It should be understood that the processing module 910 in this embodiment of this application may be implemented by a processor or a processor-related circuit component, and the transceiver module 920 may be implemented by a transceiver or a transceiver-related circuit component.

Figure 10:
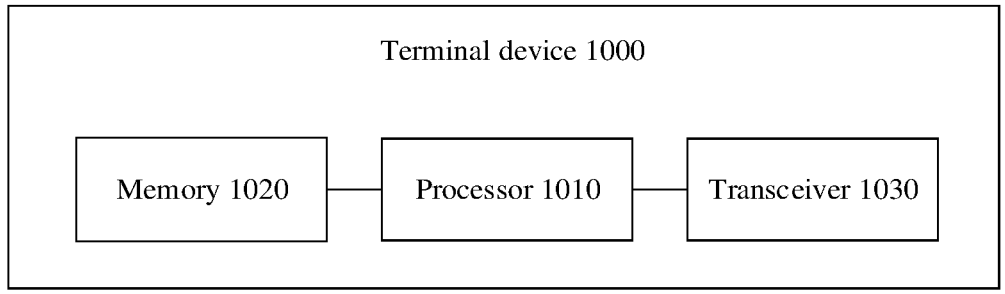
FIG. 10 is another schematic block diagram of a first type of terminal device according to an embodiment of this application.

As shown in FIG. 10, an embodiment of this application further provides a communications device woo. For example, the communications device moo is a terminal device moo. The terminal device moo includes a processor 1010, a memory 1020, and a transceiver 1030. The memory 1020 stores instructions or programs. The processor 1010 is configured to execute the instructions or the programs stored in the memory 1020. When the instructions or the programs stored in the memory 1020 are executed, the processor low is configured to perform the operations performed by the processing module 910 in the foregoing embodiment, and the transceiver 1030 is configured to perform the operations performed by the transceiver module 920 in the foregoing embodiment.

It should be understood that the terminal device 900 or the terminal device moo in the embodiments of this application may correspond to the terminal device in the embodiment shown in FIG. 7, and operations and/or functions of the modules in the terminal device 900 or the terminal device woo are intended to implement corresponding procedures in the embodiment shown in FIG. 7. For brevity, details are not described herein again.

Figure 11:
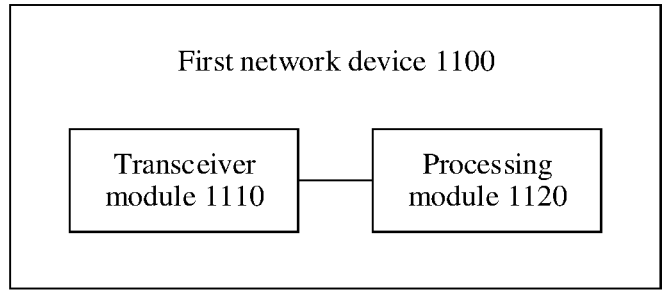
FIG. 11 is a schematic block diagram of a first type of first network device according to an embodiment of this application.

FIG. 11 is a schematic block diagram of a communications device 1100 according to an embodiment of this application. For example, the communications device 1100 is a first network device 1100. The first network device 1100 includes a processing module 1110 and a transceiver module 1120. The processing module 1110 may be configured to perform all operations performed by the first network device in the embodiment shown in FIG. 7 except receiving and sending operations, for example, an operation of determining first configuration information and an operation of determining adjustment information, and/or configured to support another process of the technology described in this specification. The transceiver module 1120 may be configured to perform all receiving and sending operations performed by the first network device in the embodiment shown in FIG. 7, for example, S701, S702, S704, S705, and S706 in the embodiment shown in FIG. 7, and/or configured to support another process of the technology described in this specification.

The transceiver module 1120 is configured to receive assistance information of a terminal device, where the assistance information is used to indicate a configuration expected by the terminal device or service information of the terminal device, the terminal device is connected to at least two network devices, and the first network device 1100 is a secondary network device in the at least two network devices.

In an optional implementation,
- the processing module 1110 is configured to determine adjustment information based on the assistance information; and
- the transceiver module 1120 is configured to send the adjustment information to the terminal device through an SRB3, where the adjustment information is used to adjust a configuration of the terminal device or the service information of the terminal device.

In an optional implementation, the transceiver module 1120 is configured to receive the assistance information of the terminal device in the following manner:
- receiving the assistance information from the terminal device through the SRB3; or
- receiving the assistance information from a second network device, where the second network device is a master network device in the at least two network devices.

In an optional implementation, the transceiver module 1120 is further configured to send first configuration information to the terminal device, where the first configuration information is used to indicate that the terminal device can send the assistance information of the terminal device to the first network device 1100 through the SRB3.

In an optional implementation, the assistance information is information related to the first network device 1100, or the assistance information includes the information related to the first network device 1100 and information related to the second network device.

In an optional implementation, the assistance information includes the information related to the first network device 1100 and the information related to the second network device, and the transceiver module 1120 is further configured to send the information related to the second network device included in the assistance information to the second network device.

In an optional implementation, the first configuration information further includes first time information, used to indicate that the terminal device can send the assistance information to the first network device 1100 through the SRB3 within a time range corresponding to the first time information; or used to indicate the terminal device not to send assistance information to the first network device 1100 within the first time after sending the assistance information to the first network device 1100.

In an optional implementation, the first configuration information further includes information about at least one parameter corresponding to the assistance information, and the information is used to indicate the terminal device to send a value of the at least one parameter when sending the assistance information of the terminal device to the first network device 1100.

In an optional implementation, the assistance information includes one or any combination of the following:
a quantity of MIMO layers of the terminal device;
a quantity of secondary cells corresponding to the terminal device;
a quantity of antenna ports of the terminal device;
an aggregated bandwidth of a secondary cell group corresponding to the terminal device;
a bandwidth of each secondary cell corresponding to the terminal device;
a maximum bandwidth supported by the terminal device;
a C-DRX configuration or parameter expected by the terminal device;
a bandwidth part BWP configuration or parameter expected by the terminal device;
an application type of the terminal device;
a size of a data packet transmitted by the terminal device;
a scheduling mode expected by the terminal device;
a search space expected by the terminal device;
a scheduling format expected by the terminal device; or
a slot format expected by the terminal device.

In an optional implementation, the transceiver module 1120 is further configured to receive capability information of the terminal device from the second network device, where the capability information of the terminal device includes first sub-capability information corresponding to the first network device 1100 and third sub-capability information corresponding to the first network device 1100 and the second network device, and the second network device is the master network device in the at least two network devices.

In an optional implementation, the transceiver module 1120 is further configured to:
send a request message to the second network device, where the request message is used to request to set up the SRB3 used for communication between the first network device 1100 and the terminal device; and
receive a first message from the second network device, where the first message is used to set up the SRB3 for the first network device 1100.

In an optional implementation, the transceiver module 1120 is further configured to:
receive a request message from the second network device, where the request message is used to request the first network device 1100 to serve as a secondary network device of the second network device, and the second network device is the master network device in the at least two network devices;
send a response message to the second network device, where the response message is used to indicate that the first network device 1100 agrees that the first network device 1100 serves as the secondary network device of the second network device; and
receive second configuration information from the second network device, where the second configuration information is used to configure the first network device 1100 as the secondary network device of the second network device.

It should be understood that the processing module 1110 in this embodiment of this application may be implemented by a processor or a processor-related circuit component, and the transceiver module 1120 may be implemented by a transceiver or a transceiver-related circuit component.

Figure 12:
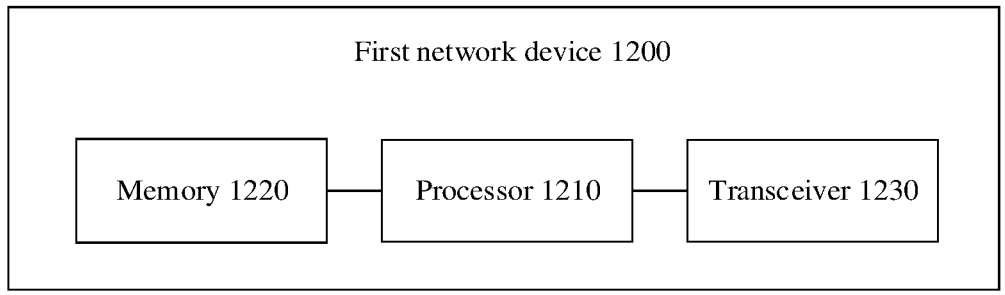
FIG. 12 is another schematic block diagram of a first type of first network device according to an embodiment of this application.

As shown in FIG. 12, an embodiment of this application further provides a communications device 1200. For example, the communications device 1200 is a first network device 1200. The first network device 1200 includes a processor 1210, a memory 1220, and a transceiver 1230. The memory 1220 stores instructions or programs. The processor 1210 is configured to execute the instructions or the programs stored in the memory 1220. When the instructions or the programs stored in the memory 1220 are executed, the processor 1210 is configured to perform the operations performed by the processing module 1110 in the foregoing embodiment, and the transceiver 1230 is configured to perform the operations performed by the transceiver module 1120 in the foregoing embodiment.

It should be understood that the first network device 1100 or the first network device 1200 in the embodiments of this application may correspond to the first network device in the embodiment shown in FIG. 7, and operations and/or functions of the modules in the first network device 1100 or the first network device 1200 are intended to implement corresponding procedures in the embodiment shown in FIG. 7. For brevity, details are not described herein again.

Figure 13:
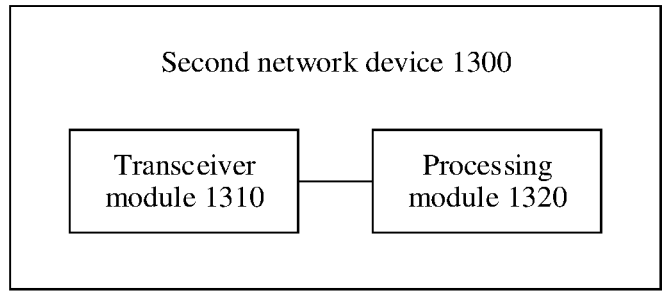
FIG. 13 is a schematic block diagram of a first type of second network device according to an embodiment of this application.

FIG. 13 is a schematic block diagram of a communications device 1300 according to an embodiment of this application. For example, the communications device 1300 is a second network device 1300. The second network device 1300 includes a processing module 1310 and a transceiver module 1320. The processing module 1310 may be configured to perform all operations performed by the second network device in the embodiment shown in FIG. 7 except receiving and sending operations, for example, an operation of determining first configuration information, and/or configured to support another process of the technology described in this specification. The transceiver module 1320 may be configured to perform all receiving and sending operations performed by the second network device in the embodiment shown in FIG. 7, for example, S701, S703, and S705 in the embodiment shown in FIG. 7, and/or configured to support another process of the technology described in this specification.

The processing module 1310 is configured to determine that a terminal device can send assistance information of the terminal device to a first network device through an SRB3, where the terminal device is connected to at least two network devices, the first network device is a secondary network device in the at least two network devices, and the second network device 1300 is a master network device in the at least two network devices.

The transceiver module 1320 is configured to send first configuration information to the terminal device, where the first configuration information is used to indicate that the terminal device can send the assistance information to the first network device through the SRB3.

In an optional implementation, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

In an optional implementation, the first configuration information further includes information about at least one parameter corresponding to the assistance information, and the information is used to indicate the terminal device to specifically send a value of the at least one parameter when sending the assistance information to the first network device through the SRB3.

In an optional implementation, the transceiver module 1320 is further configured to: after sending the first configuration information to the terminal device, receive the assistance information, where the assistance information is information related to the second network device, or the assistance information includes information related to the first network device and the information related to the second network device.

In an optional implementation, the assistance information includes the information related to the first network device and the information related to the second network device, and the transceiver module 1320 is further configured to send the information related to the first network device included in the assistance information to the first network device.

In an optional implementation, the assistance information includes one or any combination of the following:
 a quantity of MIMO layers of the terminal device;
 a quantity of secondary cells corresponding to the terminal device;
 a quantity of antenna ports of the terminal device;
 an aggregated bandwidth of a secondary cell group corresponding to the terminal device;
 a bandwidth of each secondary cell corresponding to the terminal device;
 a maximum bandwidth supported by the terminal device;
 a C-DRX configuration or parameter expected by the terminal device;
 a bandwidth part BWP configuration or parameter expected by the terminal device;
 an application type of the terminal device;
 a size of a data packet transmitted by the terminal device;
 a scheduling mode expected by the terminal device;
 a search space expected by the terminal device;
 a scheduling format expected by the terminal device; or
 a slot format expected by the terminal device.

In an optional implementation, the transceiver module 1320 is further configured to:
 receive a request message, where the request message is used to request to set up the SRB3 used for communication between the first network device and the terminal device; and
 send a first message, where the first message is used to set up the SRB3, or is used to indicate to reject setup of the SRB3.

In an optional implementation, the transceiver module 1320 is further configured to: before the processing module 1310 determines that the terminal device can send the assistance information of the terminal device to the first network device through the SRB3, receive capability information of the terminal device from the terminal device, where the capability information includes first sub-capability information corresponding to the first network device, second sub-capability information corresponding to the second network device 1300, and third sub-capability information corresponding to the first network device and the second network device 1300.

In an optional implementation, the processing module 1310 is configured to determine, in the following manner, that the terminal device can send the assistance information of the terminal device to the first network device through the SRB3:
 determining, based on the capability information, that the terminal device can send the assistance information of the terminal device to the first network device through the SRB3.

It should be understood that the processing module 1310 in this embodiment of this application may be implemented by a processor or a processor-related circuit component, and the transceiver module 1320 may be implemented by a transceiver or a transceiver-related circuit component.

Figure 14:
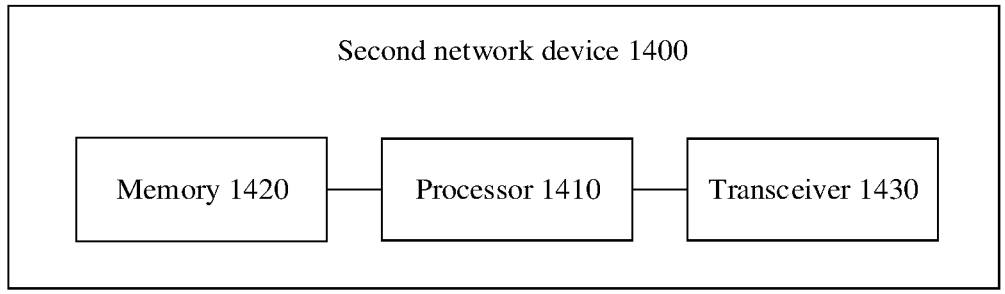
FIG. 14 is another schematic block diagram of a first type of second network device according to an embodiment of this application.

As shown in FIG. 14, an embodiment of this application further provides a communications device 1400. For example, the communications device 1400 is a second network device 1400. The second network device 1400 includes a processor 1410, a memory 1420, and a transceiver 1430. The memory 1420 stores instructions or programs. The processor 1410 is configured to execute the instructions or the programs stored in the memory 1420. When the instructions or the programs stored in the memory 1420 are executed, the processor 1410 is configured to perform the operations performed by the processing module 1310 in the foregoing embodiment, and the transceiver 1430 is configured to perform the operations performed by the transceiver module 1320 in the foregoing embodiment.

It should be understood that the second network device 1300 or the second network device 1400 in the embodiments of this application may correspond to the second network device in the embodiment shown in FIG. 7, and operations and/or functions of the modules in the second network device 1300 or the second network device 1400 are intended to implement corresponding procedures in the embodiment shown in FIG. 7. For brevity, details are not described herein again.

Figure 15:
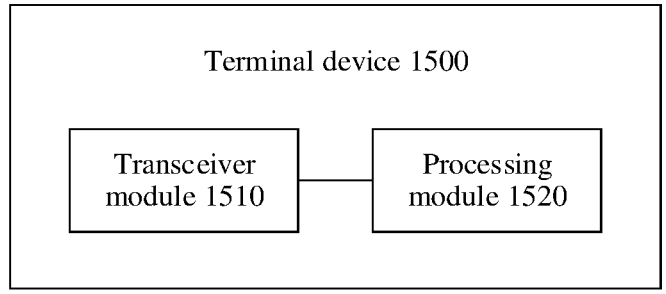
FIG. 15 is a schematic block diagram of a second type of terminal device according to an embodiment of this application.

FIG. 15 is a schematic block diagram of a communications device 1500 according to an embodiment of this application. For example, the communications device 1500 is a terminal device 1500. The terminal device 1500 includes a processing module 1510 and a transceiver module 1520. The processing module 1510 may be configured to perform all operations performed by the terminal device in the embodiment shown in FIG. 8A and FIG. 8B except receiving and sending operations, for example, S803, and/or configured to support another process of the technology described in this specification. The transceiver module 1520 may be configured to perform all receiving and sending operations performed by the terminal device in the embodiment shown in FIG. 8A and FIG. 8B, for example, S801, S802, S807, S809, S810, S811, S812, and S813 in the embodiment shown in FIG. 8A and FIG. 8B, and/or configured to support another process of the technology described in this specification.

The transceiver module 1520 is configured to send a request message to a second network device, where the request message is used to request to set up an SRB3 used for communication between the terminal device 1500 and a first network device, the terminal device 1500 is connected to at least two network devices, the first network device is a secondary network device in the at least two network devices, and the second network device is a master network device in the at least two network devices.

The transceiver module 1520 is further configured to receive a first message from the second network device.

The processing module 1510 is configured to set up, based on the first message, the SRB3 used to communicate with the first network device, or configure, based on the first message, the SRB3 used to communicate with the first network device, or determine, based on the first message, that the SRB3 cannot be set up.

In an optional implementation, the transceiver module 1520 is further configured to send capability information of the terminal device 1500 to the second network device, where the capability information includes first sub-capability information corresponding to the first network device, the first sub-capability information is transparently transmitted to the first network device by using the second network device, the capability information further includes second sub-capability information corresponding to the second network device and third sub-capability information corresponding to the first network device and the second network device.

In an optional implementation, after the processing module 1510 sets up, based on the first message, the SRB3 used to communicate with the first network device, the transceiver module 1520 is further configured to:
  receive first configuration information from the first network device or the second network device; and
  determine, based on the first configuration information, that the terminal device 1500 can send assistance information of the terminal device 1500 to the first network device through the SRB3, where the assistance information is used to indicate a configuration expected by the terminal device 1500 or service information of the terminal device 1500.

In an optional implementation, after the processing module 1510 determines, based on the first configuration information, that the terminal device 1500 can send the assistance information of the terminal device 1500 to the first network device through the SRB3, the transceiver module 1520 is further configured to:
  send the assistance information to the first network device through the SRB3; or
  send the assistance information to the second network device, where the assistance information includes information corresponding to the first network device, and the information corresponding to the first network device is transparently transmitted to the first network device by using the second network device.

In an optional implementation, the assistance information is information related to the first network device, or the assistance information includes the information related to the first network device and information related to the second network device.

In an optional implementation, after the processing module 1510 determines, based on the first configuration information, that the terminal device 1500 can send the assistance information of the terminal device 1500 to the first network device through the SRB3, the transceiver module 1520 is further configured to:
  send the information related to the second network device in the assistance information to the second network device; or
  send the information related to the first network device in the assistance information to the first network device through the SRB3; or
  send the information related to the second network device in the assistance information to the second network device, and send the information related to the first network device in the assistance information to the first network device through the SRB3.

In an optional implementation, the first configuration information further includes information about at least one parameter corresponding to the assistance information, and the information is used to indicate the terminal device 1500 to send a value of the at least one parameter when sending the assistance information to the first network device.

In an optional implementation, the first configuration information further carries first time information, used to indicate that the terminal device 1500 can send the assistance information to the first network device through the SRB3 within a time range corresponding to the first time information; or used to indicate the terminal device 1500 not to send assistance information to the first network device within the first time after sending the assistance information to the first network device.

In an optional implementation, the assistance information includes one or any combination of the following:
  a quantity of MIMO layers of the terminal device 1500;
  a quantity of secondary cells corresponding to the terminal device 1500;
  a quantity of antenna ports of the terminal device 1500;
  an aggregated bandwidth of a secondary cell group corresponding to the terminal device 1500;
  a bandwidth of each secondary cell corresponding to the terminal device 1500;
  a maximum bandwidth supported by the terminal device 1500;
  a C-DRX configuration or parameter expected by the terminal device 1500;
  a BWP configuration or parameter expected by the terminal device 1500;
  an application type of the terminal device 1500;
  a size of a data packet transmitted by the terminal device 1500;
  a scheduling mode expected by the terminal device 1500;
  a search space expected by the terminal device 1500;
  a scheduling format expected by the terminal device 1500; or
  a slot format expected by the terminal device 1500.

In an optional implementation, the transceiver module 1520 is further configured to: after sending the assistance information to the first network device through the SRB3, receive adjustment information from the first network device through the SRB3, where the adjustment information is used to adjust a configuration of the terminal device 1500.

In an optional implementation, the first message further carries second time information. The processing module 1510 is configured to determine, based on the first message, that the SRB3 cannot be set up. The processing module 1510 is further configured to determine, based on the second time information carried in the first message, that the processing module 1510 cannot request, within a time range corresponding to the second time information, to set up the SRB3.

It should be understood that the processing module 1510 in this embodiment of this application may be implemented by a processor or a processor-related circuit component, and the transceiver module 1520 may be implemented by a transceiver or a transceiver-related circuit component.

Figure 16:
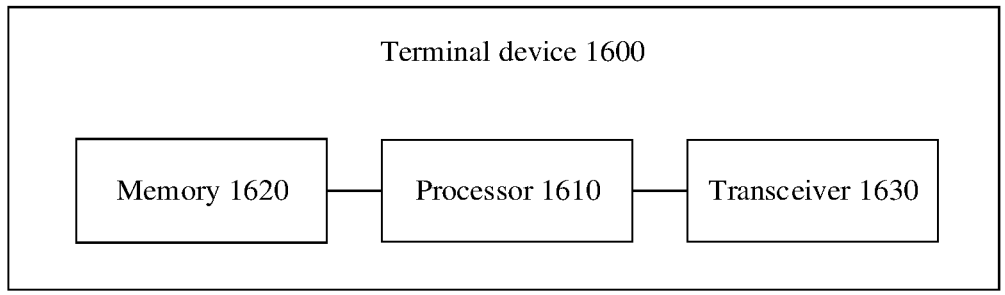
FIG. 16 is another schematic block diagram of a second type of terminal device according to an embodiment of this application.

As shown in FIG. 16, an embodiment of this application further provides a communications device 1600. For example, the communications device 1600 is a terminal device 1600. The terminal device 1600 includes a processor 1610, a memory 1620, and a transceiver 1630. The memory 1620 stores instructions or programs. The processor 1610 is configured to execute the instructions or the programs stored in the memory 1620. When the instructions or the programs stored in the memory 1620 are executed, the processor 1610 is configured to perform the operations performed by the processing module 1510 in the foregoing embodiment, and the transceiver 1630 is configured to perform the operations performed by the transceiver module 1520 in the foregoing embodiment.

It should be understood that the terminal device 1500 or the terminal device 1600 in the embodiments of this application may correspond to the second network device in the embodiment shown in FIG. 8A and FIG. 8B, and operations and/or functions of the modules in the terminal device 1500 or the terminal device 1600 are intended to implement corresponding procedures in the embodiment shown in FIG. 8A and FIG. 8B. For brevity, details are not described herein again.

Figure 17:
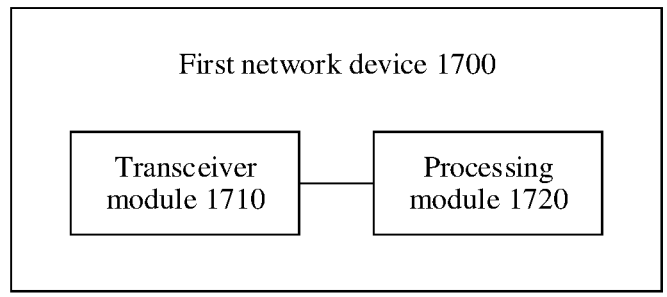
FIG. 17 is a schematic block diagram of a second type of first network device according to an embodiment of this application.

FIG. 17 is a schematic block diagram of a communications device 1700 according to an embodiment of this application. For example, the communications device 1700 is a first network device 1700. The first network device 1700 includes a processing module 1710 and a transceiver module 1720. The processing module 1710 may be configured to perform all operations performed by the first network device in the embodiment shown in FIG. 8A and FIG. 8B except receiving and sending operations, for example, determining first configuration information and determining adjustment information, and/or configured to support another process of the technology described in this specification. The transceiver module 1720 may be configured to perform all receiving and sending operations performed by the first network device in the embodiment shown in FIG. 8A and FIG. 8B, for example, S801, S802, S807, S809, S810, S811, S812, and S813 in the embodiment shown in FIG. 8A and FIG. 8B, and/or configured to support another process of the technology described in this specification.

The transceiver module 1720 is configured to send a request message to a second network device, where the request message is used to request to set up an SRB3 used for communication between the first network device 1700 and a terminal device, the terminal device is connected to at least two network devices, the first network device 1700 is a secondary network device in the at least two network devices, and the second network device is a master network device in the at least two network devices.

The transceiver module 1720 is further configured to receive a first message from the second network device.

The processing module 1710 is configured to set up, based on the first message, the SRB3 used to communicate with the terminal device, or configure, based on the first message, the SRB3 used for communication between the terminal device and the first network device 1700, or determine, based on the first message, that the SRB3 cannot be set up.

In an optional implementation, the transceiver module 1720 is further configured to receive capability information of the terminal device from the second network device, where the capability information of the terminal device includes first sub-capability information corresponding to the first network device 1700 and third sub-capability information corresponding to the first network device 1700 and the second network device, and the second network device is the master network device in the at least two network devices.

In an optional implementation, the transceiver module 1720 is further configured to: after the processing module 1710 sets up, based on the first message, the SRB3 used to communicate with the terminal device, send first configuration information to the terminal device, the first configuration information is used to indicate that the terminal device can send assistance information of the terminal device to the first network device 1700 through the SRB3, and the assistance information is used to indicate a configuration expected by the terminal device or service information of the terminal device.

In an optional implementation, the transceiver module 1720 is further configured to: after sending the first configuration information to the terminal device, receive the assistance information from the terminal device through the SRB3.

In an optional implementation, the assistance information includes information related to the first network device 1700.

In an optional implementation, the first configuration information further includes information about at least one parameter corresponding to the assistance information, and the information is used to indicate the terminal device to send a value of the at least one parameter when sending the assistance information to the first network device 1700.

In an optional implementation, the first configuration information further carries first time information, used to indicate that the terminal device can send the assistance information to the first network device 1700 through the SRB3 within a time range corresponding to the first time information; or used to indicate the terminal device not to send assistance information to the first network device 1700 within the first time after sending the assistance information to the first network device 1700.

In an optional implementation, the assistance information includes one or any combination of the following:
  a quantity of MIMO layers of the terminal device;
  a quantity of secondary cells corresponding to the terminal device;
  a quantity of antenna ports of the terminal device;
  an aggregated bandwidth of a secondary cell group corresponding to the terminal device;
  a bandwidth of each secondary cell corresponding to the terminal device;
  a maximum bandwidth supported by the terminal device;
  a C-DRX configuration or parameter expected by the terminal device;
  a BWP configuration or parameter expected by the terminal device;
  an application type of the terminal device;
  a size of a data packet transmitted by the terminal device;
  a scheduling mode expected by the terminal device;

a search space expected by the terminal device;
a scheduling format expected by the terminal device; or
a slot format expected by the terminal device.

In an optional implementation, the transceiver module 1720 is further configured to:
after receiving the assistance information from the terminal device through the SRB3, determine adjustment information based on the assistance information, where the adjustment information is used to adjust an air interface parameter of the terminal device or service information of the terminal device; and
send the adjustment information to the terminal device through the SRB3.

It should be understood that the processing module 1710 in this embodiment of this application may be implemented by a processor or a processor-related circuit component, and the transceiver module 1720 may be implemented by a transceiver or a transceiver-related circuit component.

Figure 18:
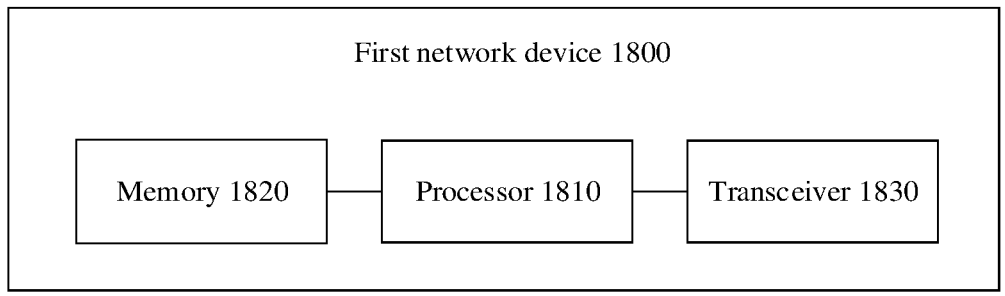
FIG. 18 is another schematic block diagram of a second type of first network device according to an embodiment of this application.

As shown in FIG. 18, an embodiment of this application further provides a communications device 1800. For example, the communications device 1800 is a first network device 1800. The first network device 1800 includes a processor 1810, a memory 1820, and a transceiver 1830. The memory 1820 stores instructions or programs. The processor 1810 is configured to execute the instructions or the programs stored in the memory 1820. When the instructions or the programs stored in the memory 180 are executed, the processor 1810 is configured to perform the operations performed by the processing module 1710 in the foregoing embodiment, and the transceiver 1830 is configured to perform the operations performed by the transceiver module 1720 in the foregoing embodiment.

It should be understood that the first network device 1700 or the first network device 1800 in the embodiments of this application may correspond to the first network device in the embodiment shown in FIG. 8A and FIG. 8B, and operations and/or functions of the modules in the first network device 1700 or the first network device 1800 are intended to implement corresponding procedures in the embodiment shown in FIG. 8A and FIG. 8B. For brevity, details are not described herein again.

Figure 19:
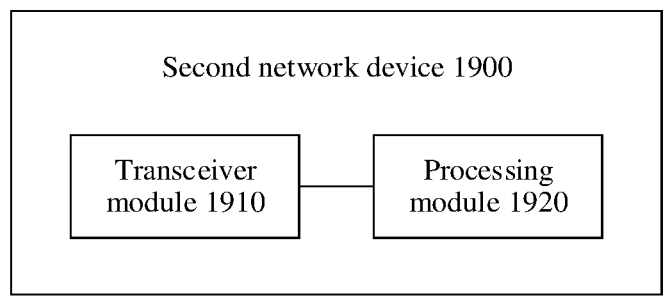
FIG. 19 is a schematic block diagram of a second type of second network device according to an embodiment of this application.

FIG. 19 is a schematic block diagram of a communications device 1900 according to an embodiment of this application. For example, the communications device 1900 is a second network device 1900. The second network device 1900 includes a processing module 1910 and a transceiver module 1920. The processing module 1910 may be configured to perform all operations performed by the second network device in the embodiment shown in FIG. 8A and FIG. 8B except receiving and sending operations, for example, S806, and/or configured to support another process of the technology described in this specification. The transceiver module 1920 may be configured to perform all receiving and sending operations performed by the second network device in the embodiment shown in FIG. 8A and FIG. 8B, for example, S801, S802, S804, S805, S807, S808, S810, and S812 in the embodiment shown in FIG. 8A and FIG. 8B, and/or configured to support another process of the technology described in this specification.

The transceiver module 1920 is configured to receive a request message, where the request message is used to request to set up an SRB3 used for communication between the first network device and the terminal device.

The transceiver module 1920 is further configured to send a first message, where the first message is used to set up the SRB3, or used to configure the SRB3, or used to indicate to reject setup of the SRB3.

In an optional implementation, the transceiver module 1920 is further configured to receive capability information of the terminal device from the terminal device, where the capability information includes first sub-capability information corresponding to the first network device, second sub-capability information corresponding to the second network device 2000, and third sub-capability information corresponding to the first network device and the second network device 2000.

In an optional implementation, the transceiver module 1920 is further configured to send the first sub-capability information to the first network device.

In an optional implementation, the first message is used to set up the SRB3 or used to configure the SRB3. The transceiver module 1920 is further configured to send first configuration information to the terminal device, where the first configuration information is used to indicate that the terminal device can send assistance information to the first network device through the SRB3, and the assistance information is used to indicate a configuration expected by the terminal device or service information of the terminal device.

In an optional implementation, the first configuration information further includes first time information, used to indicate that the terminal device can send the assistance information to the first network device through the SRB3 within a time range corresponding to the first time information; or used to indicate the terminal device not to send assistance information to the first network device within the first time after sending the assistance information to the first network device.

In an optional implementation, the first configuration information further includes information about at least one parameter corresponding to the assistance information, and the information is used to indicate the terminal device to specifically send a value of the at least one parameter when sending the assistance information to the first network device through the SRB3.

In an optional implementation, the transceiver module 1920 is further configured to: after sending the first configuration information to the terminal device, receive the assistance information, where the assistance information is information related to the second network device 2000, or the assistance information includes information related to the first network device and the information related to the second network device 2000.

In an optional implementation, the assistance information includes the information related to the first network device and the information related to the second network device 2000, and the transceiver module 1920 is further configured to send the information related to the first network device included in the assistance information to the first network device.

In an optional implementation, the assistance information includes one or any combination of the following:
a quantity of MIMO layers of the terminal device;
a quantity of secondary cells corresponding to the terminal device;
a quantity of antenna ports of the terminal device;
an aggregated bandwidth of a secondary cell group corresponding to the terminal device;
a bandwidth of each secondary cell corresponding to the terminal device;
a maximum bandwidth supported by the terminal device;
a C-DRX configuration or parameter expected by the terminal device;

a BWP configuration or parameter expected by the terminal device;
an application type of the terminal device;
a size of a data packet transmitted by the terminal device;
a scheduling mode expected by the terminal device;
a search space expected by the terminal device;
a scheduling format expected by the terminal device; or
a slot format expected by the terminal device.

It should be understood that the processing module 1910 in this embodiment of this application may be implemented by a processor or a processor-related circuit component, and the transceiver module 1920 may be implemented by a transceiver or a transceiver-related circuit component.

Figure 20:
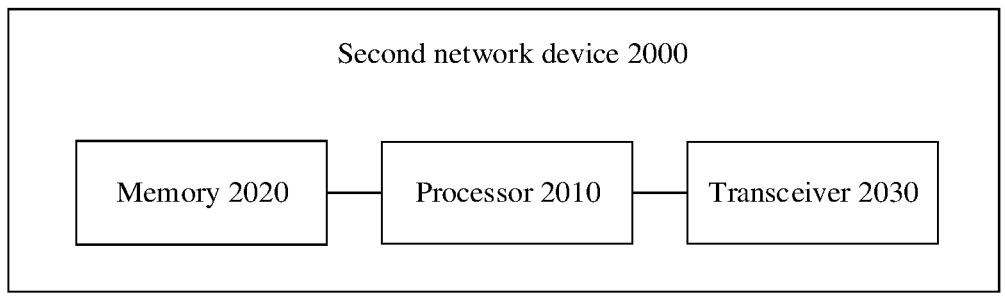
FIG. 20 is another schematic block diagram of a second type of second network device according to an embodiment of this application.

As shown in FIG. 20, an embodiment of this application further provides a communications device 2000. For example, the communications device 2000 is a second network device 2000. The second network device 2000 includes a processor 2010, a memory 2020, and a transceiver 2030. The memory 2020 stores instructions or programs. The processor 2010 is configured to execute the instructions or the programs stored in the memory 2020. When the instructions or the programs stored in the memory 2020 are executed, the processor 2010 is configured to perform the operations performed by the processing module 1910 in the foregoing embodiment, and the transceiver 2030 is configured to perform the operations performed by the transceiver module 1920 in the foregoing embodiment.

It should be understood that the second network device 1900 or the second network device 2000 in the embodiments of this application may correspond to the second network device in the embodiment shown in FIG. 8A and FIG. 8B, and operations and/or functions of the modules in the second network device 1900 or the second network device 2000 are intended to implement corresponding procedures in the embodiment shown in FIG. 8A and FIG. 8B. For brevity, details are not described herein again.

An embodiment of this application further provides a communications apparatus, and the communications apparatus may be a terminal device or a circuit. The communications apparatus may be configured to perform actions performed by the terminal device in the method embodiment shown in FIG. 7 or the method embodiment shown in FIG. 8A and FIG. 8B.

Figure 21:
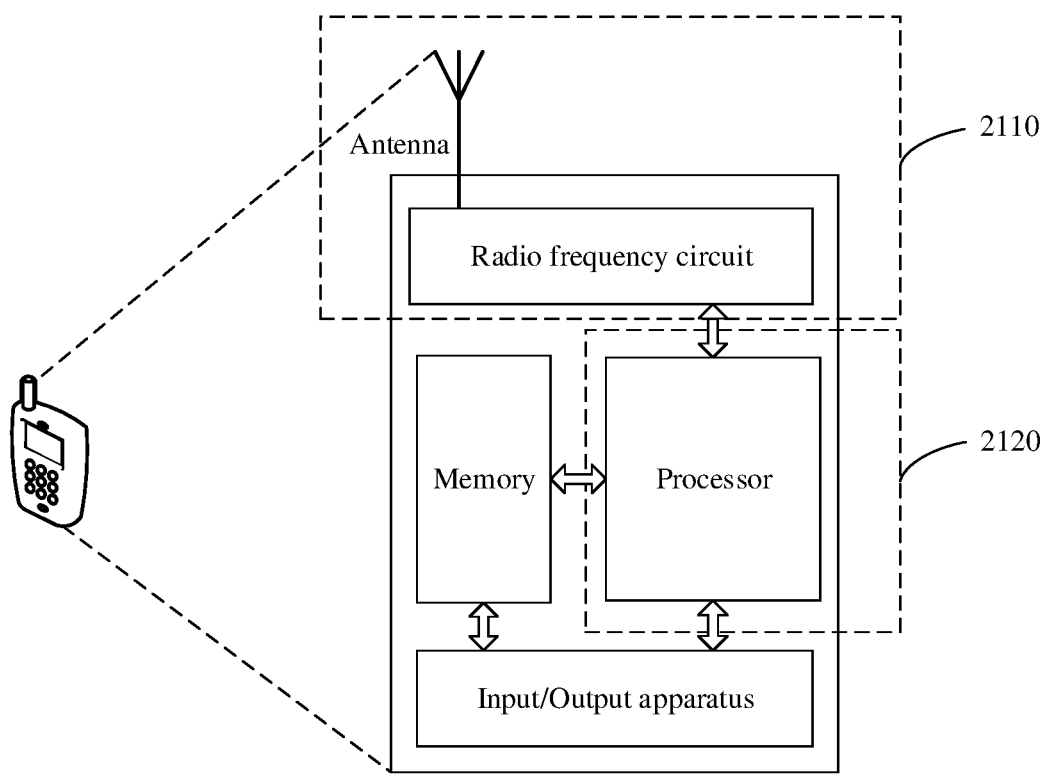
FIG. 21 is a schematic block diagram of a communications apparatus according to an embodiment of this application.

It is assumed that the communications apparatus is a terminal device. FIG. 21 is a simplified schematic structural diagram of the terminal device. For ease of understanding and illustration, an example in which the terminal device is a mobile phone is used in FIG. 21. As shown in FIG. 21, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive the radio frequency signal in a form of an electromagnetic wave. The input/output apparatus such as a touchscreen, a display, or a keyboard is mainly configured to receive data input by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends the radio frequency signal in the form of the electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 21 shows only one memory and one processor. In an actual terminal device product, there may be one or more processors and one or more memories. The memory may also be referred to as a storage medium, a storage device, or the like. The memory may be disposed independent of the processor, or may be integrated into the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 21, the terminal device includes a transceiver unit 2110 and a processing unit 2120. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 2110 and that is configured to implement a receiving function may be considered as a receiving unit, and a component that is in the transceiver unit 2110 and that is configured to implement a sending function may be considered as a sending unit. In other words, the transceiver unit 2110 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 2110 is configured to perform a sending operation and a receiving operation on a terminal device side in the foregoing method embodiment shown in FIG. 7, and the processing unit 2120 is configured to perform other operations excluding the receiving operation and the sending operation on the terminal device side in the foregoing method embodiment shown in FIG. 7.

For example, in an implementation, the transceiver unit 2110 is configured to perform receiving and sending steps on the terminal device side in the embodiment shown in FIG. 7, for example, S701, S703, S704, S705, and S706. The processing unit 2120 is configured to perform operations, other than the receiving and sending operations, on the terminal device side in the embodiment shown in FIG. 7, for example, an operation of determining capability information of the terminal device by the terminal device, an operation of determining assistance information of the terminal device, and an operation of adjusting a configuration or service information of the terminal device based on adjustment information, and/or configured to support another process of the technology described in this specification.

Alternatively, the transceiver unit 2110 is configured to perform a sending operation and a receiving operation on a terminal device side in the foregoing method embodiment shown in FIG. 8A and FIG. 8B, and the processing unit 2120 is configured to perform other operations excluding the receiving operation and the sending operation on the terminal device side in the foregoing method embodiment shown in FIG. 8A and FIG. 8B.

For example, in an implementation, the transceiver unit 2110 is configured to perform the receiving and sending steps on the terminal device side in the embodiment shown in FIG. 8A and FIG. 8B, for example, S801, S802, S807, S809, S810, S811, S812, and S813. The processing unit 2120 is configured to perform operations other than the receiving and sending operations on the terminal device side in the embodiment shown in FIG. 8A and FIG. 8B, for example, S803.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 22:
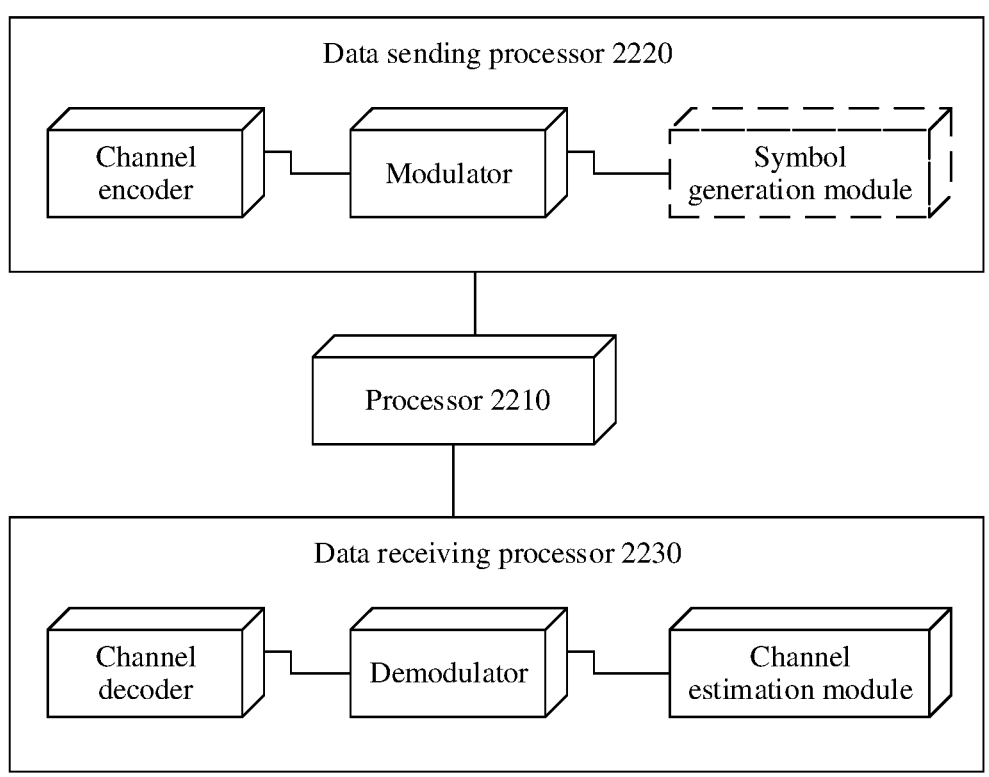
FIG. 22 is another schematic block diagram of a communications apparatus according to an embodiment of this application.

When the communications apparatus in this embodiment of this application is a terminal device, refer to a device shown in FIG. 22. In an example, the device can implement a function similar to a function of a processor 2210 in FIG. 22. In FIG. 22, the device includes the processor 2210, a data sending processor 2220, and a data receiving processor 2230. The processing module 910 in the foregoing embodiment may be the processor 2210 in FIG. 22, and completes a corresponding function. The transceiver module 920 in the foregoing embodiment may be the data sending processor 2220 and/or the data receiving processor 2230 in FIG. 22. Alternatively, the processing module 1510 in the foregoing embodiment may be the processor 2210 in FIG. 22, and completes a corresponding function. The transceiver module 1520 in the foregoing embodiment may be the data sending processor 2220 and/or the data receiving processor 2230 in FIG. 22.

Although FIG. 22 shows a channel encoder and a channel decoder, it may be understood that these modules do not constitute a limitation on this embodiment and are merely examples.

Figure 23:
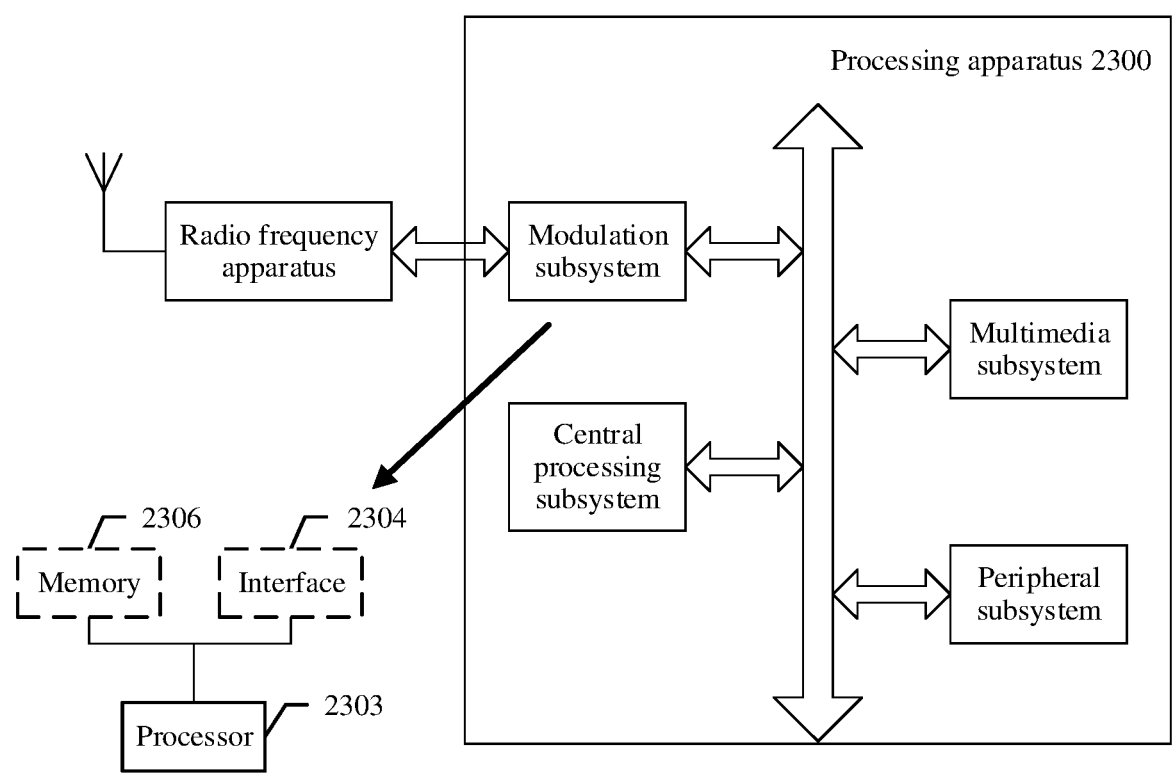
FIG. 23 is still another schematic block diagram of a communications apparatus according to an embodiment of this application.

FIG. 23 shows another form of this embodiment. A processing apparatus 2300 includes modules such as a modulation subsystem, a central processing subsystem, and a peripheral subsystem. The communications apparatus in the embodiments may be used as the modulation subsystem in the processing apparatus. Specifically, the modulation subsystem may include a processor 2303 and an interface 2304. The processor 2303 implements a function of the processing module 910, and the interface 2304 implements a function of the transceiver module 920. Alternatively, the processor 2303 implements a function of the processing module 1510, and the interface 2304 implements a function of the transceiver module 1520. In another variation, the modulation subsystem includes a memory 2306, a processor 2303, and a program that is stored in the memory 2306 and that can be run on the processor. When executing the program, the processor 2303 implements the method on the terminal device side in the method embodiment shown in FIG. 7 or FIG. 8A and FIG. 8B. It should be noted that the memory 2306 may be nonvolatile or volatile. The memory 2306 may be located in the modulation subsystem, or may be located in the processing apparatus 2300, provided that the memory 2306 can be connected to the processor 2303.

An embodiment of this application further provides a computer-readable storage medium. The computer-readable storage medium stores a computer program. When the program is executed by a processor, a procedure related to the terminal device in the embodiment shown in FIG. 7 provided in the foregoing method embodiments may be implemented.

An embodiment of this application further provides a computer-readable storage medium. The computer-readable storage medium stores a computer program. When the program is executed by a processor, a procedure related to the first network device in the embodiment shown in FIG. 7 provided in the foregoing method embodiments may be implemented.

An embodiment of this application further provides a computer-readable storage medium. The computer-readable storage medium stores a computer program. When the program is executed by a processor, a procedure related to the second network device in the embodiment shown in FIG. 7 provided in the foregoing method embodiments may be implemented.

An embodiment of this application further provides a computer-readable storage medium. The computer-readable storage medium stores a computer program. When the program is executed by a processor, a procedure related to the terminal device in the embodiment shown in FIG. 8A and FIG. 8B provided in the foregoing method embodiments may be implemented.

An embodiment of this application further provides a computer-readable storage medium. The computer-readable storage medium stores a computer program. When the program is executed by a processor, a procedure related to the first network device in the embodiment shown in FIG. 8A and FIG. 8B provided in the foregoing method embodiments may be implemented.

An embodiment of this application further provides a computer-readable storage medium. The computer-readable storage medium stores a computer program. When the program is executed by a processor, a procedure related to the second network device in the embodiment shown in FIG. 8A and FIG. 8B provided in the foregoing method embodiments may be implemented.

An embodiment of this application further provides a computer program product including instructions. When the instructions are executed, the method on a terminal device side in the method embodiment shown in FIG. 7 is performed.

An embodiment of this application further provides a computer program product including instructions. When the instructions are executed, the method on a first network device side in the method embodiment shown in FIG. 7 is performed.

An embodiment of this application further provides a computer program product including instructions. When the instructions are executed, the method on a second network device side in the method embodiment shown in FIG. 7 is performed.

An embodiment of this application further provides a computer program product including instructions. When the instructions are executed, the method on a terminal device side in the method embodiment shown in FIG. 8A and FIG. 8B is performed.

An embodiment of this application further provides a computer program product including instructions. When the instructions are executed, the method on a first network device side in the method embodiment shown in FIG. 8A and FIG. 8B is performed.

An embodiment of this application further provides a computer program product including instructions. When the instructions are executed, the method on a second network device side in the method embodiment shown in FIG. 8A and FIG. 8B is performed.

It should be understood that, the processor mentioned in the embodiments of this application may be a central processing unit (central processing unit, CPU), the processor may further be another general purpose processor, a digital signal processor (digital signal processor, DSP), an application-specific integrated circuit (application specific integrated circuit, ASIC), a field programmable gate array (field programmable gate array, FPGA), or another programmable logical device, discrete gate or transistor logical device, discrete hardware component, or the like. The general-purpose processor may be a microprocessor, or the processor may be any conventional processor, or the like.

It may be understood that the memory mentioned in this embodiment of this application may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely an example. For example, the unit division is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A method, applied for a terminal device, comprising:
   receiving first configuration information from a first network device or a second network device, wherein the first configuration information comprises first time information;
   determining based on the first configuration information that the terminal device is allowed to send assistance information of the terminal device to the first network device through a signaling radio bearer 3 (SRB3) within a time range corresponding to the first time information, wherein the terminal device is connected to at least two network devices, and the first network device is a secondary network device in the at least two network devices, the second network device is a master network device in the at least two network devices; and sending the assistance information to the first network device through the SRB3, wherein the assistance information indicates a configuration expected by the terminal device or service information of the terminal device, wherein the assistance information comprises one or any combination of the following:
- a quantity of secondary cells corresponding to the terminal device;
- a quantity of antenna ports of the terminal device;
- a bandwidth of each secondary cell corresponding to the terminal device;
- a connected-discontinuous reception (C-DRX) configuration or parameter expected by the terminal device;
- an application type of the terminal device;
- a size of a data packet transmitted by the terminal device;
- a scheduling mode expected by the terminal device;
- a search space expected by the terminal device;
- a scheduling format expected by the terminal device; or
- a slot format expected by the terminal device.

2. The method according to claim 1, wherein the method further comprises:
determining, by the terminal device based on the first time information, that the terminal device is not allowed to send any further assistance information to the first network device within a time range corresponding to the first time information after sending the assistance information to the first network device.

3. The method according to claim 2, wherein the first configuration information further comprises information about at least one parameter corresponding to the assistance information, and the method further comprises:
determining that a value of the at least one parameter is allowed to be sent to the first network device through the SRB3.

4. The method according to claim 2, wherein the assistance information is information related to the first network device.

5. The method according to claim 4, further comprising:
sending capability information of the terminal device to the second network device, wherein the capability information comprises:
first sub-capability information corresponding to the first network device, wherein the first sub-capability information is transparently transmitted to the first network device using the second network device;
second sub-capability information corresponding to the second network device; and
third sub-capability information corresponding to the first network device and the second network device.

6. A method applied for a first network device, comprising:
sending first configuration information to a terminal device, wherein the first configuration information comprises first time information, the first configuration information indicates that the terminal device is allowed to send assistance information of the terminal device to the first network device through a signaling radio bearer 3 (SRB3) within a time range corresponding to the first time information; and
receiving the assistance information of the terminal device, wherein the assistance information indicates a configuration expected by the terminal device or service information of the terminal device, the terminal device is connected to at least two network devices, and the first network device is a secondary network device in the at least two network devices, wherein the assistance information comprises one or any combination of the following:
- a quantity of secondary cells corresponding to the terminal device;
- a quantity of antenna ports of the terminal device;
- a bandwidth of each secondary cell corresponding to the terminal device;
- a connected-discontinuous reception (C-DRX) configuration or parameter expected by the terminal device;
- an application type of the terminal device;
- a size of a data packet transmitted by the terminal device;
- a scheduling mode expected by the terminal device;
- a search space expected by the terminal device;
- a scheduling format expected by the terminal device; or
- a slot format expected by the terminal device.

7. The method according to claim 6, wherein receiving the assistance information of the terminal device comprises:
receiving the assistance information from the terminal device through the SRB3; or
receiving the assistance information from a second network device, wherein the second network device is a master network device in the at least two network devices.

8. The method according to claim 7, wherein the assistance information is information related to the first network device.

9. The method according to claim 8, wherein the first configuration information further indicates that:
the terminal device is not allowed to send any further assistance information to the first network device within the first time after sending the assistance information to the first network device.

10. The method according to claim 9, wherein the first configuration information further comprises information about at least one parameter corresponding to the assistance information, and the information about the at least one parameter indicates to the terminal device to send a value of the at least one parameter when sending the assistance information of the terminal device to the first network device.

11. The method according to claim 10, further comprising:
receiving capability information of the terminal device from the second network device, wherein the second network device is the master network device in the at least two network devices, and the capability information of the terminal device comprises:
first sub-capability information corresponding to the first network device; and
third sub-capability information corresponding to the first network device and the second network device.

12. The method according to claim 10, further comprising:
receiving a request message from the second network device, wherein the request message requests the first network device to serve as a secondary network device of the second network device, and the second network device is the master network device in the at least two network devices;

sending a response message to the second network device, wherein the response message indicates that the first network device agrees that the first network device will serve as the secondary network device of the second network device; and receiving second configuration information from the second network device, wherein the second configuration information configures the first network device as the secondary network device of the second network device.

13. The method according to claim 6, wherein the assistance information is power saving assistance information, and the power saving assistance information indicates terminal device power saving.

14. A terminal device, comprising:
at least one processor; and
a memory coupled to the at least one processor and configured to store programming instructions that, when executed by the at least one processor, cause the terminal device to:
receiving first configuration information from a first network device or a second network device, wherein the first configuration information comprises first time information;
determine that assistance information of the terminal device is allowed to be sent to the first network device through a signaling radio bearer 3 (SRB3) within a time range corresponding to the first time information, wherein the terminal device is connected to at least two network devices, and the first network device is a secondary network device in the at least two network devices, the second network device is a master network device in the at least two network devices; and
send the assistance information to the first network device through the SRB3, wherein the assistance information indicates a configuration expected by the terminal device or service information of the terminal device, wherein the assistance information comprises one or any combination of the following:
a quantity of secondary cells corresponding to the terminal device;
a quantity of antenna ports of the terminal device;
a bandwidth of each secondary cell corresponding to the terminal device;
a connected-discontinuous reception (C-DRX) configuration or parameter expected by the terminal device;
an application type of the terminal device;
a size of a data packet transmitted by the terminal device;
a scheduling mode expected by the terminal device;
a search space expected by the terminal device;
a scheduling format expected by the terminal device; or
a slot format expected by the terminal device.

15. The terminal device according to claim 14, wherein determining that assistance information of the terminal device is allowed to be sent to the first network device through the SRB3 comprises:
receiving the first configuration information from the first network device or a second network device; and
determining that the terminal device is allowed to send the assistance information to the first network device through the SRB3 based on the first configuration information, wherein the second network device is the master network device in the at least two network devices.

16. The terminal device according to claim 15, wherein the first configuration information further comprises first time information, and the programming instructions, when executed by the at least one processor, further cause the terminal device to:
determine that the terminal device is not allowed to send any further assistance information to the first network device within a time range corresponding to the first time information after sending the assistance information to the first network device based on the first time information.

17. The terminal device according to claim 16, wherein the first configuration information further comprises information about at least one parameter corresponding to the assistance information, and the programming instructions, when executed by the at least one processor, further cause the terminal device to:
determine that a value of the at least one parameter is allowed to be sent to the first network device through the SRB3.

* * * * *